US008683378B2

(12) United States Patent
Bull et al.

(10) Patent No.: US 8,683,378 B2
(45) Date of Patent: Mar. 25, 2014

(54) SCROLLING TECHNIQUES FOR USER INTERFACES

(75) Inventors: William Bull, Campbell, CA (US); Kourtny Minh Hicks, Sunnyvale, CA (US); Policarpo Wood, Cupertino, CA (US); Eric James Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 12/008,322

(22) Filed: Jan. 9, 2008

(65) Prior Publication Data
US 2009/0064031 A1 Mar. 5, 2009

Related U.S. Application Data

(60) Provisional application No. 60/967,457, filed on Sep. 4, 2007.

(51) Int. Cl.
*G06F 3/14* (2006.01)
(52) U.S. Cl.
USPC ............ 715/786; 715/713; 345/156; 345/158; 345/184; 345/661; 345/771; 725/34; 725/109; 705/26.1; 707/100; 707/500; 707/831; 701/209; 463/39
(58) Field of Classification Search
USPC .......... 715/200–277, 700–867; 700/701–866; 709/201–229; 705/50–79, 26.1; 345/30–111, 158, 184, 771, 661; 725/109, 34; 463/39; 707/831
See application file for complete search history.

(56) References Cited

U.S. PATENT DOCUMENTS

| 1,061,578 A | 5/1913 | Wischhusen et al. |
| 2,063,276 A | 12/1936 | Thomas |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |

(Continued)

FOREIGN PATENT DOCUMENTS

| CN | 1139235 | 1/1997 |
| CN | 1455615 | 11/2003 |

(Continued)

OTHER PUBLICATIONS

"About Quicktip.RTM." www.logicad3d.com/docs/qt.html, downloaded Apr. 8, 2002.

(Continued)

*Primary Examiner* — Ruay Ho
(74) *Attorney, Agent, or Firm* — Kilpatrick Townsend & Stockton LLP

(57) ABSTRACT

Systems and methods for improving the scrolling of user interfaces of electronic devices are provided. For example, a user interface may provide various visual, aural, and tactile enhancements for increasing the ease and speed with which a user may scroll through a list of listings to highlight a particular listing. Each listing may be associated with a particular entry in a media library. Moreover, each listing may be associated with one of multiple sublists in the list of listings, and each sublist may be defined based on a characteristic of a first piece of metadata associated with each entry in the media library. The various visual, aural, and tactile enhancements may be provided based on a relationship between a previously highlighted listing and a currently highlighted listing.

28 Claims, 16 Drawing Sheets

(56) References Cited

U.S. PATENT DOCUMENTS

| | | |
|---|---|---|
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper, Jr. |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGourty |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | Ocallaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Teres |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |

(56) References Cited

U.S. PATENT DOCUMENTS

| | | |
|---|---|---|
| 5,894,117 A | 4/1999 | Kamishima |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| 6,229,456 B1 | 5/2001 | Engholm et al. |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| 6,323,846 B1 | 11/2001 | Westerman et al. |
| D452,250 S | 12/2001 | Chan |
| 6,340,800 B1 | 1/2002 | Zhai et al. |
| 6,347,290 B1 | 2/2002 | Bartlet |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerpheide |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,734,883 B1 | 5/2004 | Wynn et al. |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,847,351 B2 | 1/2005 | Noguera |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto et al. |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimaki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |

(56) References Cited

U.S. PATENT DOCUMENTS

| | | |
|---|---|---|
| 7,113,196 B2 | 9/2006 | Kerr |
| 7,117,136 B1 | 10/2006 | Rosedale |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,325,195 B1 | 1/2008 | Arant |
| 7,333,092 B2 | 2/2008 | Zadesky et al. |
| 7,348,898 B2 | 3/2008 | Ono |
| 7,365,737 B2 | 4/2008 | Marvit et al. |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,689,466 B1* | 3/2010 | Benbrahim et al. .......... 705/26.1 |
| 7,708,051 B2 | 5/2010 | Katsumi et al. |
| 7,710,393 B2* | 5/2010 | Tsuk et al. ................... 345/156 |
| 7,716,582 B2* | 5/2010 | Mueller ........................ 715/713 |
| 7,769,794 B2* | 8/2010 | Moore et al. ................ 707/831 |
| 7,772,507 B2 | 8/2010 | Orr et al. |
| 2001/0000537 A1* | 4/2001 | Inala et al. ................... 707/500 |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0059584 A1* | 5/2002 | Ferman et al. ................ 725/34 |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109028 A1* | 6/2004 | Stern et al. ................... 345/771 |
| 2004/0109357 A1 | 6/2004 | Cernea et al. |
| 2004/0145613 A1 | 7/2004 | Stavely et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender et al. |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0125147 A1* | 6/2005 | Mueller ........................ 701/209 |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 | 7/2005 | Watanachote |
| 2005/0204309 A1 | 9/2005 | Szeto |
| 2005/0212760 A1 | 9/2005 | Marvit et al. |
| 2005/0237308 A1 | 10/2005 | Autio et al. |
| 2006/0017692 A1 | 1/2006 | Wehrenberg et al. |
| 2006/0026521 A1 | 2/2006 | Hotelling et al. |
| 2006/0032680 A1 | 2/2006 | Elias et al. |
| 2006/0038791 A1 | 2/2006 | Mackey |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0044036 A1 | 2/2007 | Ishimura et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |

(56) References Cited

U.S. PATENT DOCUMENTS

| | | |
|---|---|---|
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0125852 A1 | 6/2007 | Rosenberg |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0180409 A1 | 8/2007 | Sohn et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0001770 A1 | 1/2008 | Ito et al. |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0062141 A1 | 3/2008 | Chandhri |
| 2008/0066016 A1 | 3/2008 | Dowdy et al. |
| 2008/0069412 A1 | 3/2008 | Champagne et al. |
| 2008/0071810 A1* | 3/2008 | Casto et al. .............. 707/100 |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0165144 A1 | 7/2008 | Forstall et al. |
| 2008/0165158 A1 | 7/2008 | Hotelling et al. |
| 2008/0166968 A1 | 7/2008 | Tang et al. |
| 2008/0196945 A1 | 8/2008 | Konstas |
| 2008/0201751 A1* | 8/2008 | Ahmed et al. ............. 725/109 |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2008/0300055 A1* | 12/2008 | Lutnick et al. ............. 463/39 |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0166098 A1 | 7/2009 | Sunder |
| 2009/0167508 A1 | 7/2009 | Fadell et al. |
| 2009/0167542 A1 | 7/2009 | Culbert et al. |
| 2009/0167704 A1 | 7/2009 | Terlizzi et al. |
| 2009/0170532 A1 | 7/2009 | Lee et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2009/0303204 A1* | 12/2009 | Nasiri et al. ............... 345/184 |
| 2009/0307633 A1 | 12/2009 | Haughay et al. |
| 2010/0045705 A1* | 2/2010 | Vertegaal et al. ........... 345/661 |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0214216 A1* | 8/2010 | Nasiri et al. ............... 345/158 |
| 2010/0289759 A1 | 11/2010 | Fisher et al. |
| 2010/0313409 A1 | 12/2010 | Weber et al. |
| 2011/0005845 A1 | 1/2011 | Hotelling et al. |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 | 2/2001 |
| DE | 102004043663 | 4/2006 |
| EP | 0178157 | 4/1986 |
| EP | 0419145 | 3/1991 |
| EP | 0498540 | 8/1992 |
| EP | 0521683 | 1/1993 |
| EP | 0674288 | 9/1995 |
| EP | 0731407 | 9/1996 |
| EP | 0551778 | 1/1997 |
| EP | 0880091 | 11/1998 |
| EP | 1026713 | 8/2000 |
| EP | 1081922 | 3/2001 |
| EP | 1098241 | 5/2001 |
| EP | 1133057 | 9/2001 |
| EP | 1162826 | 12/2001 |
| EP | 1168396 | 1/2002 |
| EP | 1205836 | 5/2002 |
| EP | 1244053 | 9/2002 |
| EP | 1251455 | 10/2002 |
| EP | 1263193 | 12/2002 |
| EP | 1347481 | 9/2003 |
| EP | 1376326 | 1/2004 |
| EP | 1467392 | 10/2004 |
| EP | 1482401 | 12/2004 |
| EP | 1496467 | 1/2005 |
| EP | 1517228 | 3/2005 |
| EP | 1542437 | 6/2005 |
| EP | 1589407 | 10/2005 |
| EP | 1784058 | 5/2007 |
| EP | 1841188 | 10/2007 |
| EP | 1850218 | 10/2007 |
| EP | 1876711 | 1/2008 |
| FR | 2686440 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2402105 | 12/2004 |
| JP | 5795722 | 6/1982 |
| JP | 57097626 | 6/1982 |
| JP | 05233141 | 9/1983 |
| JP | 61117619 | 6/1986 |
| JP | 61124009 | 6/1986 |
| JP | 63020411 | 1/1988 |
| JP | 10063467 | 3/1988 |
| JP | 63106826 | 5/1988 |
| JP | 63181022 | 7/1988 |
| JP | 63298518 | 12/1988 |
| JP | 0357617 | 6/1991 |
| JP | 03192418 | 8/1991 |
| JP | 0432920 | 2/1992 |
| JP | 4205408 | 7/1992 |

(56) References Cited

FOREIGN PATENT DOCUMENTS

| | | |
|---|---|---|
| JP | 05041135 | 2/1993 |
| JP | 05080938 | 4/1993 |
| JP | 05101741 | 4/1993 |
| JP | 0536623 | 5/1993 |
| JP | 05189110 | 7/1993 |
| JP | 05205565 | 8/1993 |
| JP | 05211021 | 8/1993 |
| JP | 05217464 | 8/1993 |
| JP | 05262276 | 10/1993 |
| JP | 05265656 | 10/1993 |
| JP | 05274956 | 10/1993 |
| JP | 05289811 | 11/1993 |
| JP | 05298955 | 11/1993 |
| JP | 05325723 | 12/1993 |
| JP | 0620570 | 1/1994 |
| JP | 06208433 | 2/1994 |
| JP | 06084428 | 3/1994 |
| JP | 06089636 | 3/1994 |
| JP | 06096639 | 4/1994 |
| JP | 06111685 | 4/1994 |
| JP | 06111695 | 4/1994 |
| JP | 06139879 | 5/1994 |
| JP | 06187078 | 7/1994 |
| JP | 06267382 | 9/1994 |
| JP | 06283993 | 10/1994 |
| JP | 06333459 | 12/1994 |
| JP | 07107574 | 4/1995 |
| JP | 0741882 | 7/1995 |
| JP | 07201249 | 8/1995 |
| JP | 07201256 | 8/1995 |
| JP | 07253838 | 10/1995 |
| JP | 07261899 | 10/1995 |
| JP | 07261922 | 10/1995 |
| JP | 07296670 | 11/1995 |
| JP | 07319001 | 12/1995 |
| JP | 08016292 | 1/1996 |
| JP | 08115158 | 5/1996 |
| JP | 08203387 | 8/1996 |
| JP | 08293226 | 11/1996 |
| JP | 08298045 | 11/1996 |
| JP | 08299541 | 11/1996 |
| JP | 08316664 | 11/1996 |
| JP | 09044289 | 2/1997 |
| JP | 09069023 | 3/1997 |
| JP | 09128148 | 5/1997 |
| JP | 09134248 | 5/1997 |
| JP | 09218747 | 8/1997 |
| JP | 09230993 | 9/1997 |
| JP | 09231858 | 9/1997 |
| JP | 09233161 | 9/1997 |
| JP | 09251347 | 9/1997 |
| JP | 09258895 | 10/1997 |
| JP | 09288926 | 11/1997 |
| JP | 09512979 | 12/1997 |
| JP | 10074127 | 3/1998 |
| JP | 10074429 | 3/1998 |
| JP | 10198507 | 7/1998 |
| JP | 10227878 | 8/1998 |
| JP | 10240693 | 9/1998 |
| JP | 10320322 | 12/1998 |
| JP | 10326149 | 12/1998 |
| JP | 1124834 | 1/1999 |
| JP | 1124835 | 1/1999 |
| JP | 1168685 | 3/1999 |
| JP | 11184607 | 7/1999 |
| JP | 11194863 | 7/1999 |
| JP | 11194872 | 7/1999 |
| JP | 11194882 | 7/1999 |
| JP | 11194883 | 7/1999 |
| JP | 11194891 | 7/1999 |
| JP | 11195353 | 7/1999 |
| JP | 11203045 | 7/1999 |
| JP | 11212725 | 8/1999 |
| JP | 11272378 | 10/1999 |
| JP | 11338628 | 12/1999 |
| JP | 2000200147 | 7/2000 |
| JP | 2000215549 | 8/2000 |
| JP | 2000267777 | 9/2000 |
| JP | 2000267786 | 9/2000 |
| JP | 2000267797 | 9/2000 |
| JP | 2000353045 | 12/2000 |
| JP | 2001011769 | 1/2001 |
| JP | 2001022508 | 1/2001 |
| JP | 2001160850 | 6/2001 |
| JP | 2001184158 | 7/2001 |
| JP | 3085481 | 2/2002 |
| JP | 2002215311 | 8/2002 |
| JP | 2003015796 | 1/2003 |
| JP | 2003060754 | 2/2003 |
| JP | 2003099198 | 4/2003 |
| JP | 2003150303 | 5/2003 |
| JP | 2003517674 | 5/2003 |
| JP | 2003280799 | 10/2003 |
| JP | 2003280807 | 10/2003 |
| JP | 2004362097 | 12/2004 |
| JP | 2005251218 | 9/2005 |
| JP | 2005293606 | 10/2005 |
| JP | 2006004453 | 1/2006 |
| JP | 2006178962 | 7/2006 |
| JP | 3852854 | 12/2006 |
| JP | 2007123473 | 5/2007 |
| KR | 19980071394 | 10/1998 |
| KR | 19990050198 | 7/1999 |
| KR | 20000008579 | 2/2000 |
| KR | 20010052016 | 6/2001 |
| KR | 20010108361 | 12/2001 |
| KR | 20020065059 | 8/2002 |
| KR | 20060021678 | 3/2006 |
| TW | 431607 | 4/2001 |
| TW | 00470193 | 12/2001 |
| TW | 547716 | 8/2003 |
| TW | I220491 | 8/2004 |
| WO | 9814863 | 4/1988 |
| WO | 9417494 | 8/1994 |
| WO | 9500897 | 1/1995 |
| WO | 9627968 | 9/1996 |
| WO | 9949443 | 9/1999 |
| WO | 0079772 | 12/2000 |
| WO | 0102949 | 1/2001 |
| WO | 0144912 | 6/2001 |
| WO | 0208881 | 1/2002 |
| WO | 03036457 | 5/2003 |
| WO | 03044645 | 5/2003 |
| WO | 03044956 | 5/2003 |
| WO | 03025960 | 9/2003 |
| WO | 03088176 | 10/2003 |
| WO | 03090008 | 10/2003 |
| WO | 2004001573 | 12/2003 |
| WO | 2004040606 | 5/2004 |
| WO | 2004091956 | 10/2004 |
| WO | 2005055620 | 6/2005 |
| WO | 2005076117 | 8/2005 |
| WO | 2005114369 | 12/2005 |
| WO | 2005124526 | 12/2005 |
| WO | 2006020305 | 2/2006 |
| WO | 2006021211 | 3/2006 |
| WO | 2006037545 | 4/2006 |
| WO | 2006104745 | 10/2006 |
| WO | 2006135127 | 12/2006 |
| WO | 2007025858 | 3/2007 |
| WO | 2007078477 | 7/2007 |
| WO | 2007084467 | 7/2007 |
| WO | 2007089766 | 8/2007 |
| WO | 2008007372 | 1/2008 |
| WO | 2008045414 | 4/2008 |
| WO | 2008045833 | 4/2008 |

OTHER PUBLICATIONS

"Alps Electric introduces the GlidePoint Wave Keyboard; combines a gently curved design with Alps' advanced GlidePoint Technology", Business Wire, Oct. 21, 1996.

(56) References Cited

OTHER PUBLICATIONS

"Alps Electric Ships GlidePoint Keyboard for the Macintosh; Includes a GlidePoint Touchpad, Erase-Eaze Backspace Key and Countoured Wrist Rest", Business Wire, Jul. 1, 1996.

"APS Show Guide to Exhibitors", Physics Today, vol. 49, No. 3, Mar. 1996.

"Atari VCS/2600 Peripherals", www.classicgaming.com/gamingmuseum/2600p.html, downloaded Feb. 28, 2007, pp. 1-15.

"Der Klangmeister," Connect Magazine, Aug. 1998.

"Design News: Literature Plus", Design News, vol. 51, No. 24, Dec. 18, 1995.

"Diamond Multimedia Announces Rio PMP300 Portable MP3 Music Player," located at http://news.harmony-central.com/Newp/1998/Rio-PMP300.html visited on May 5, 2008, 4 pages.

"Manufactures", Laser Focus World, Buyers Guide '96, vol. 31, No. 12, Dec. 1995.

"National Design Engineering Show", Design News, vol. 52, No. 5, Mar. 4, 1996.

"Neuros MP3 Digital Audio Computer", www.neurosaudio.com., downloaded Apr. 9, 2003.

"OEM Touchpad Modules" website www.glidepoint.com/sales/modules.index.shtml, downloaded Feb. 13, 2002.

"Preview of exhibitor booths at the Philadelphia show", The News Air Conditioning Heating & Refridgeration, vol. 200, No. 2, Jan. 13, 1997.

"Product news", Design News, vol. 53, No. 11, Jun. 9, 1997.

"Product news", Design News, vol. 53, No. 9, May 5, 1997.

"Product Overview—ErgoCommander.RTM.", www.logicad3d.com/products/ErgoCommander.htm, downloaded Apr. 8, 2002.

"Product Overview—SpaceMouse.RTM. Classic", www.logicad3d.com/products/Classic.htm, downloaded Apr. 8, 2002.

"System Service and Troubleshooting Manual," www.dsplib.com/intv/Master, downloaded Dec. 11, 2002.

"Triax Custom Controllers due; Video Game Controllers", HFD—The Weekly Home Furnishing Newspaper, vol. 67, No. 1, Jan. 4, 1993.

Acer Information Co. Ltd., "Touchpad," Notebook PC Manual, Feb. 16, 2005, 3 pages.

Ahl, David H., "Controller Update", Creative Computing, vol. 9, No. 12, Dec. 1983.

Ahmad, Subutai, "A Usable Real-Time 3D Hand Tracker," Proceedings of the 28th Asilomar Conference on Signals, Systems and Computers—Part 2 (of 2) vol. 2, Oct. 1994.

Apple Inc., "Apple Presents iPod: Ultra-Portable MP3 Music Player Puts 1,000 Songs in Your Pocket", Press Release, Oct. 23, 2001, 3 pages.

Apple Inc., "Apple Unveils Optical Mouse and New Pro Keyboard," Press Release, Jul. 19, 2000.

Baig, E.C., "Your PC Just Might Need a Mouse", U.S. News & World Report, vol. 108, No. 22, Jun. 4, 1990.

Bang & Olufsen Telecom, "BeoCom 6000 User Guide 2000".

Bang & Olufsen Telecom, "BeoCom 6000, Sales Training Brochure", date unknown.

Bartimo, Jim, "The Portables: Traveling Quickly", Computerworld, Nov. 14, 1983.

Boling, Douglas, "Programming Microsoft Windows CE.NET," Microsoft, Third Edition, 1993, p. 109.

Bray, Kevin, "Phosphors help switch on xenon," Physics in Action, pp. 1-3, Apr. 1999.

Brink et al., "Pumped-up portables", U.S. News & World Report, vol. 116, No. 21, May 30, 1994.

Brown, Ed et al., "Windows on Tablets as a Means of Achieving Virtual Input Devices", Human-Computer Interaction—Interact '90, 1990.

Buxton, William et al., "Issues and Techniques in Touch-Sensitive Tablet Input", Computer Graphics, 19(3), Proceedings of SIGGRAPH '85, 1985.

Chapweske, Adam, "PS/2 Mouse/Keyboard Protocol", 1999, http://panda.cs.ndsu.nodak.edu/.about.achapwes/PICmicro/PS2/ps2.htm.

Chen, Michael et al., "A Study in Interactive 3-D Rotation Using 2-D Control Devices", Computer Graphics, vol. 22, No. 4, Aug. 1988.

De Meyer, Kevin "Crystal Optical Mouse," Feb. 14, 2002, Heatseekerz, Web-Article 19.

EBV Elektronik, "TSOP6238 IR Receiver Modules for Infrared Remote Control Systems", Jan. 2004, 1 page.

Evans, Kenneth et al., "Tablet-based Valuators that Provide One, Two, or Three Degrees of Freedom", Computer Graphics, vol. 15, No. 3, Aug. 1981.

Fiore, Andrew, "Zen Touchpad", Cornell University, May 2000.

Gadgetboy, "Point and click with the latest mice", CNETAsia Product Review, www.asia.cnet.com/reviews...are/gadgetboy/0,39001770,38023590,00.- htm, downloaded Dec. 5, 2001.

Gfroerer, Thomas H., "Photoluminescence in Analysis of Surfaces and Interfaces," Encyclopedia of Analytical Chemistry, 2000, pp. 1-23.

Intelink Electronics, VersaPad: Integration Guide, 1998, pp. 1-35.

Jesitus John, "Broken promises?", Industry Week/IW, vol. 246, No. 20, Nov. 3, 1997.

Kobayashi, Minoru et al., "Dynamic Soundscape: Mapping Time to Space for Audio Browsing," Computer Human Interaction, 1997, pp. 194-201.

Kobayashi, Minoru, "Design of Dynamic Soundscape: Mapping Time to Space for Audio Browsing with Simultaneous Listening", thesis submitted to Program in Media Arts and Sciences at the Massachusetts Institute of Technology, 1996, 58 pages.

Kobayashi, Shinji et al. "Development of the Touch Switches with the Click Response," Koukuu Denshi Gihou, Japan Aviation Electronics Industry, Ltd., No. 17, 1994, pp. 44-48 (Translation of Summary).

Letter re: Bang & Olufsen A/S, by David Safran, Nixon Peabody, LLP, May 21, 2004.

Luna Technologies International, Inc., LUNA Photoluminescent Safety Products, "Photoluminescence—What is Photoluminescence?" Dec. 27, 2005, available at http://www.lunaplast.com/photoluminescence.com.

Mims, Forrest M., III, "A Few Quick Pointers; Mouses, Touch Screens, Touch Pads, Light Pads, and the Like Can Make Your System Easier to Use", Computers & Electronics, vol. 22, May 1984.

Nass, Richard, "Touchpad input device goes digital to give portable systems a desktop "mouse-like" feel", Electronic Design, vol. 44, No. 18, Sep. 3, 1996.

Perenson, Melissa, "New & Improved: Touchpad Redux", PC Magazine, Sepember 10, 1996.

Petersen, Marty, "Koala Pad Touch Tablet & Micro Illustrator Software", InfoWorld, Oct. 10, 1983.

Petruzzellis, T.L., "Force-Sensing Resistors", Electronics Now, vol. 64, No. 3, Mar. 1993.

Photographs of Innovations 2000 Best of Show award presented at the 2000 International CES Innovations 2000 Design & Engineering Showcase, 1 pg.

Robbin, U.S. Appl. No. 60/346,237 entitled, "Method and System for List Scrolling," filed Oct. 22, 2001; 12 pages.

SanDisk Sansa Connect User Guide, 2007, 29 pages.

Schramm, Mike, "Playing with the iPhone's accelerometer", The Unofficial Apple Weblog, Aug. 29, 2007, 5 pages. Available at http://www.tuaw.com/2007/08/29/playing-with-the-iphones-accelerometer/.

Soderholm, Lars G., "Sensing Systems for 'Touch and Feel'", Design News, May 8, 1989, pp. 72-76.

Sony, "Sony presents 'Choice Without Compromise'", IBC '97 M2 Presswire, Jul. 24, 1997.

Spiwak, Marc, "A Great New Wireless Keyboard", Popular Electronics, vol. 14, No. 12, Dec. 1997.

Spiwak, Marc, "A Pair of Unusual Controllers", Popular Electronics, vol. 14, No. 4, Apr. 1997.

Suzuki, K., "Full Loading of Usable Online Software! Strongest Palm Series Packs 1000", Ascii Co., Ltd., pp. 126-129.

Sylvania, "Intellivision™ Intelligent Television Master Component Service Manual", pp. 1, 2 and 8, 1979.

(56) References Cited

OTHER PUBLICATIONS

Synaptics, Inc., "Synaptics TouchPad Interfacing Guide" Second Edition, Mar. 25, 1998, San Jose, CA, pp. 1 to 90.
Tessler, Franklin et al. "Touchpads: Three new input devices", website www.macworld.com/1996/02/review/1806.html, downloaded Feb. 13, 2002.
Tessler, Franklin, "Point Pad", Macworld, vol. 12, No. 10, Oct. 1995.
Tessler, Franklin, "Smart Input: How to Chose from the New Generation of Innovative Input Devices", Macworld, vol. 13, No. 5, May 1996.
Tessler, Franklin, "Touchpads", Macworld, vol. 13, No. 2, Feb. 1996.
Translation of Trekstor's Defense Statement to the District Court Mannheim of May 23, 2008; 37 pages.

* cited by examiner

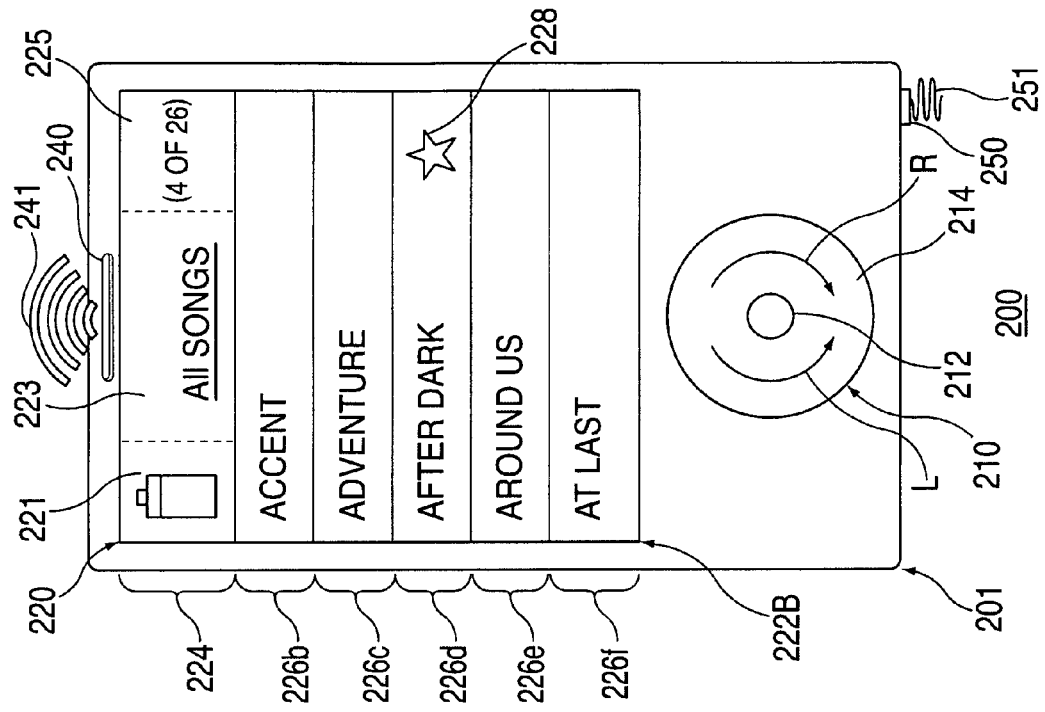
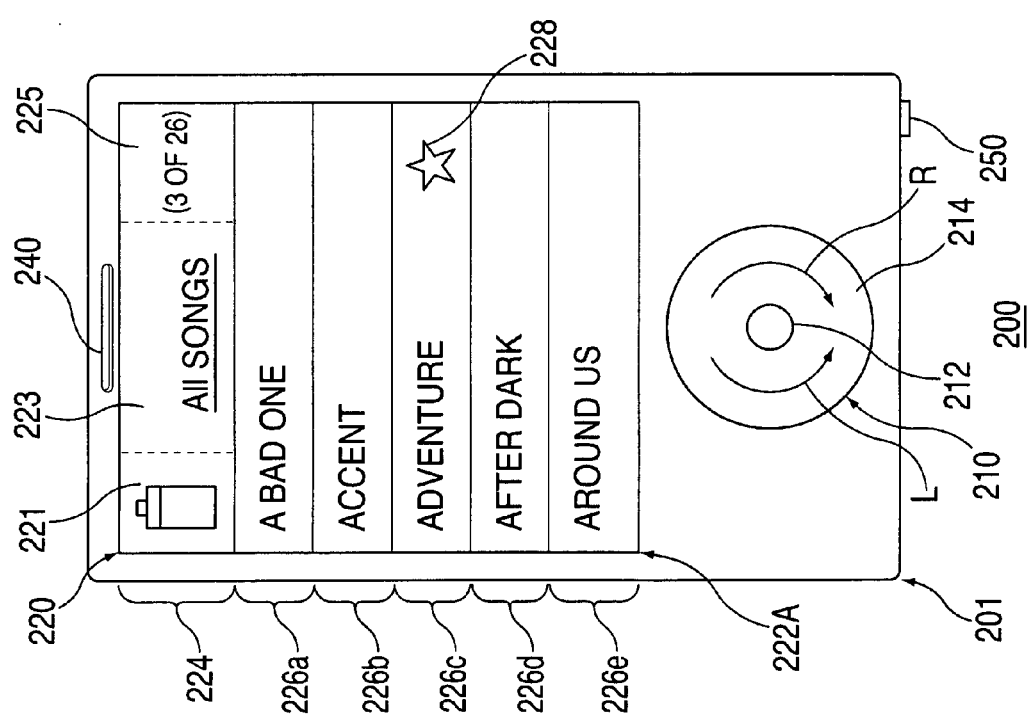

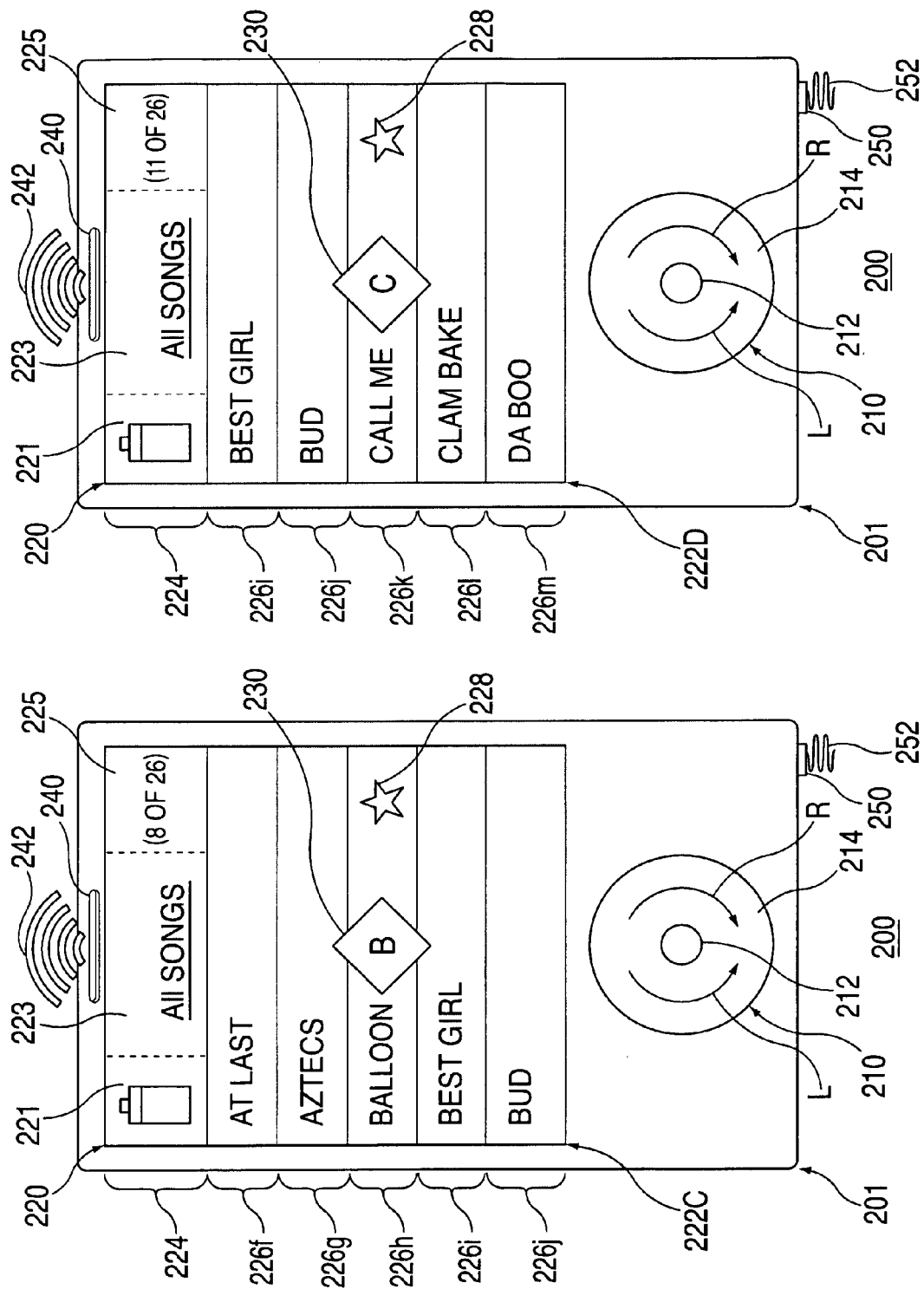

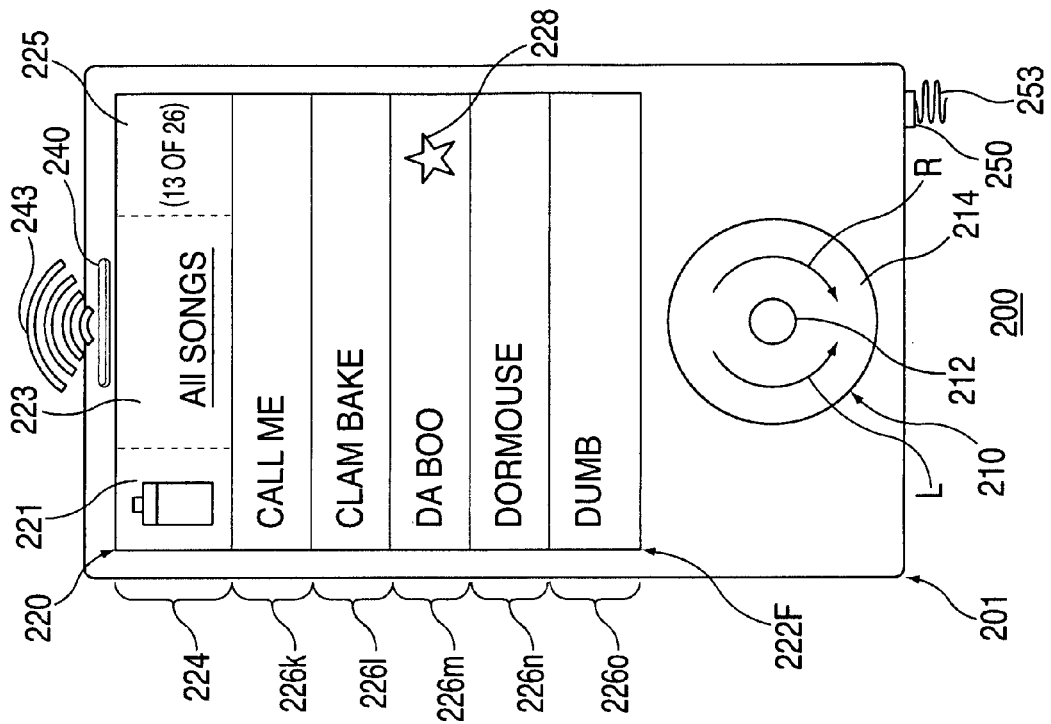
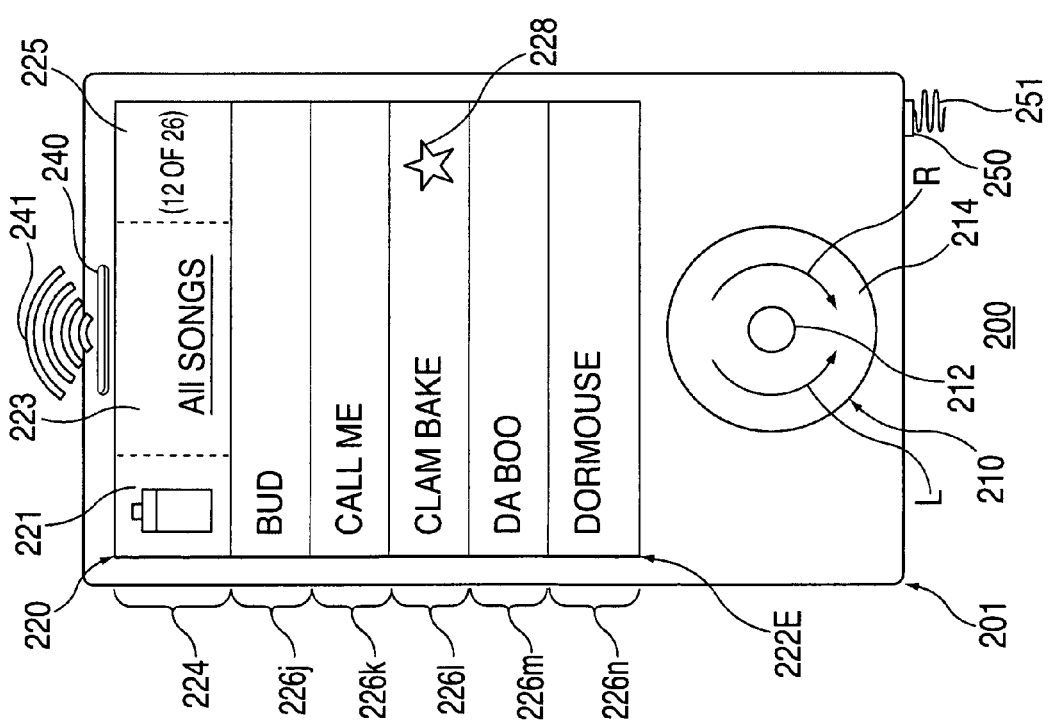

| | Song File | Title | Length | Artist | Album | Cover Art | Audio Clip | Miscellaneous |
|---|---|---|---|---|---|---|---|---|
| 326a | <SONG_a> | A BAD ONE | 03:22 | ARTIST_a | ALBUM_a | <ART_a> | <CLIP_a> | <MISC_a> |
| 326b | <SONG_b> | ACCENT | 04:18 | ARTIST_b | ALBUM_b | <ART_b> | <CLIP_b> | <MISC_b> |
| 326c | <SONG_c> | ADVENTURE | 01:19 | ARTIST_c | ALBUM_c | <ART_c> | <CLIP_c> | <MISC_c> |
| 326d | <SONG_d> | AFTER DARK | 10:26 | ARTIST_d | ALBUM_d | <ART_d> | <CLIP_d> | <MISC_d> |
| 326e | <SONG_e> | AROUND US | 06:14 | ARTIST_e | ALBUM_e | <ART_e> | <CLIP_e> | <MISC_e> |
| 326f | <SONG_f> | AT LAST | 05:12 | ARTIST_f | ALBUM_f | <ART_f> | <CLIP_f> | <MISC_f> |
| 326g | <SONG_g> | AZTECS | 05:09 | ARTIST_g | ALBUM_g | <ART_g> | <CLIP_g> | <MISC_g> |
| 326h | <SONG_h> | BALLOON | 04:18 | ARTIST_h | ALBUM_h | <ART_h> | <CLIP_h> | <MISC_h> |
| 326i | <SONG_i> | BEST GIRL | 04:56 | ARTIST_i | ALBUM_i | <ART_i> | <CLIP_i> | <MISC_i> |
| 326j | <SONG_j> | BUD | 03:21 | ARTIST_j | ALBUM_j | <ART_j> | <CLIP_j> | <MISC_j> |
| 326k | <SONG_k> | CALL ME | 02:56 | ARTIST_k | ALBUM_k | <ART_k> | <CLIP_k> | <MISC_k> |
| 326l | <SONG_l> | CLAM BAKE | 07:01 | ARTIST_l | ALBUM_l | <ART_l> | <CLIP_l> | <MISC_l> |
| 326m | <SONG_m> | DA BOO | 04:00 | ARTIST_m | ALBUM_m | <ART_m> | <CLIP_m> | <MISC_m> |
| 326n | <SONG_n> | DORMOUSE | 05:09 | ARTIST_n | ALBUM_n | <ART_n> | <CLIP_n> | <MISC_n> |
| 326o | <SONG_o> | DUMB | 03:31 | ARTIST_o | ALBUM_o | <ART_o> | <CLIP_o> | <MISC_o> |
| | .. | .. | .. | .. | .. | .. | .. | .. |
| 326z | <SONG_z> | ZEBRA | 06:57 | ARTIST_z | ALBUM_z | <ART_z> | <CLIP_z> | <MISC_z> |

FIG. 3

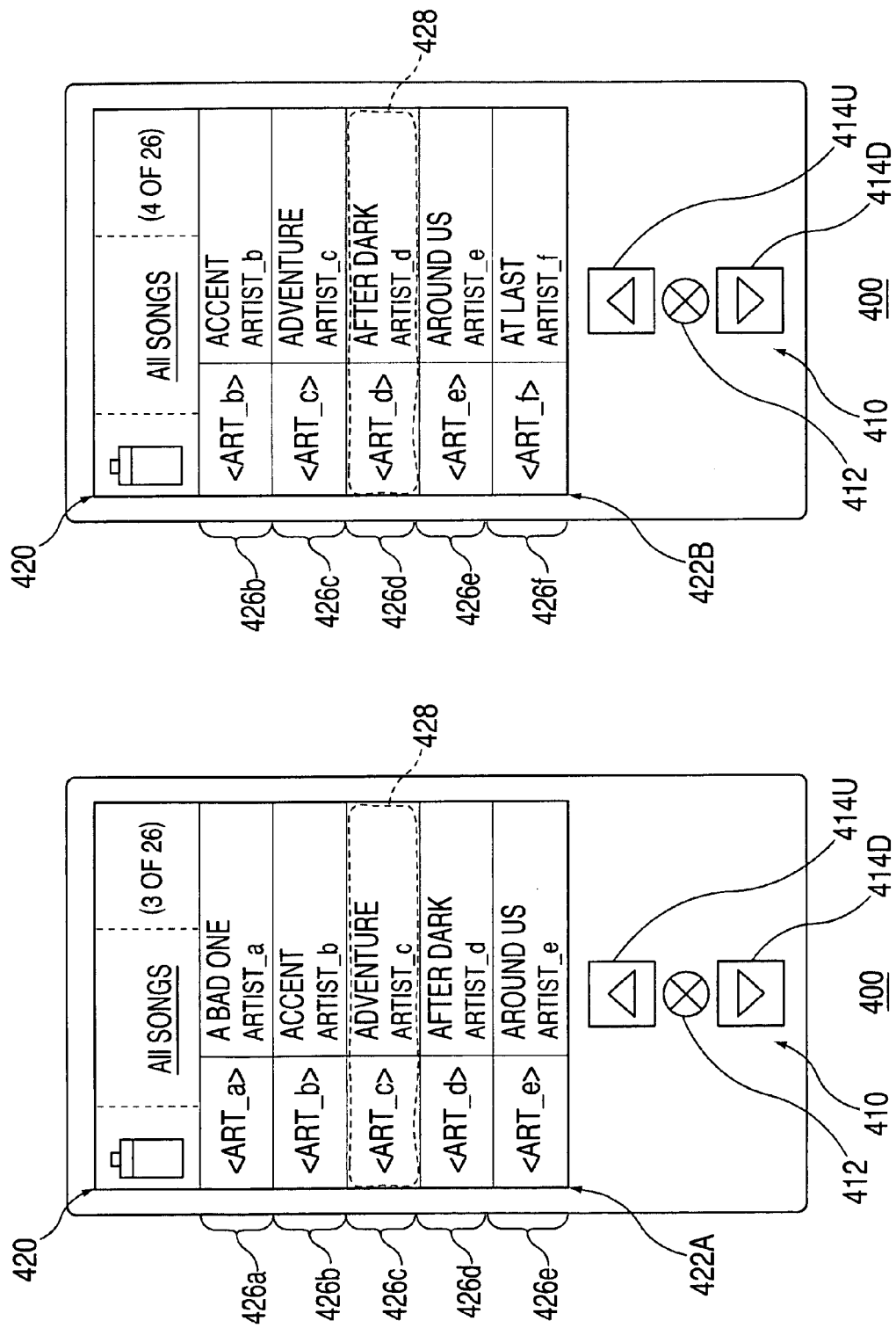

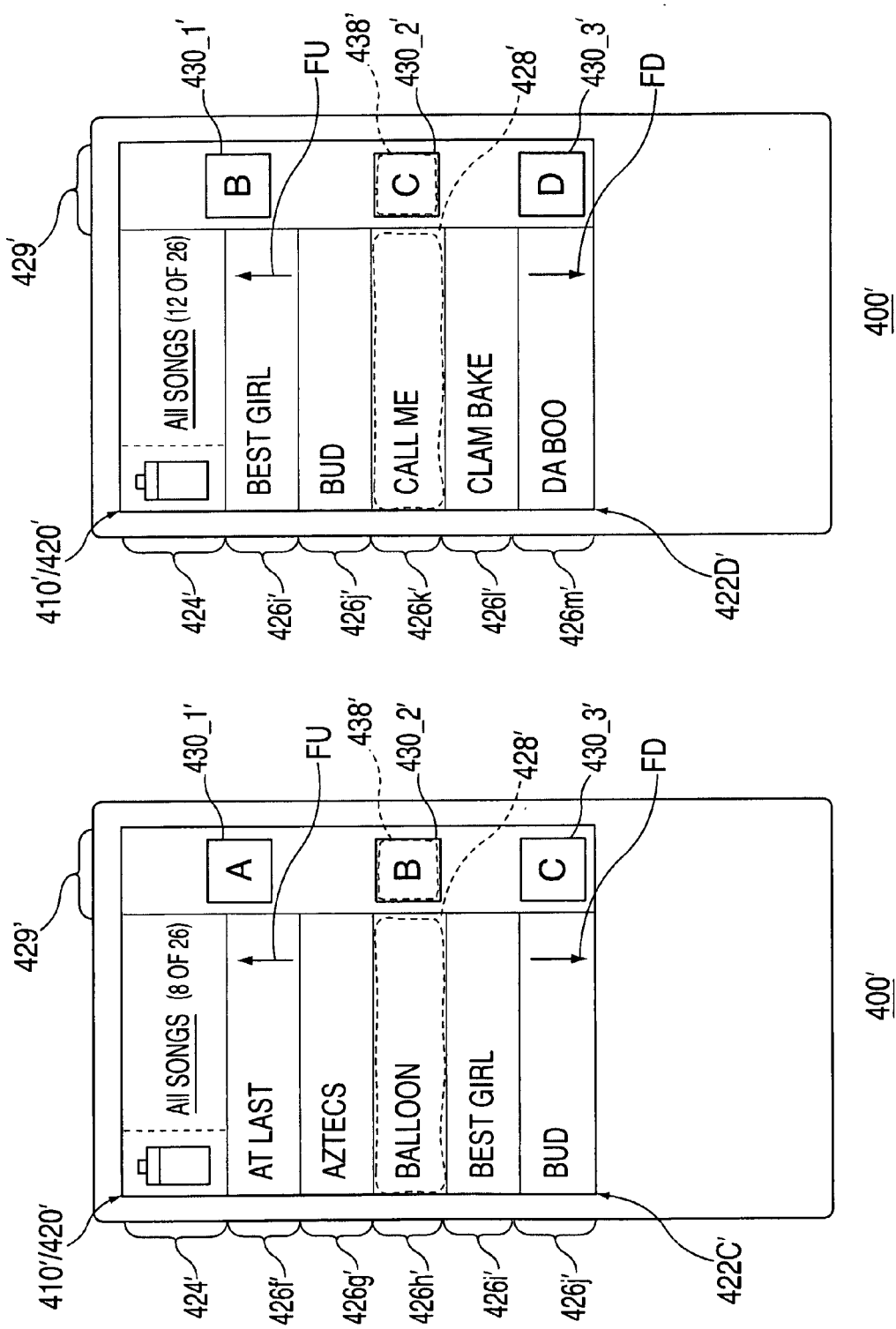

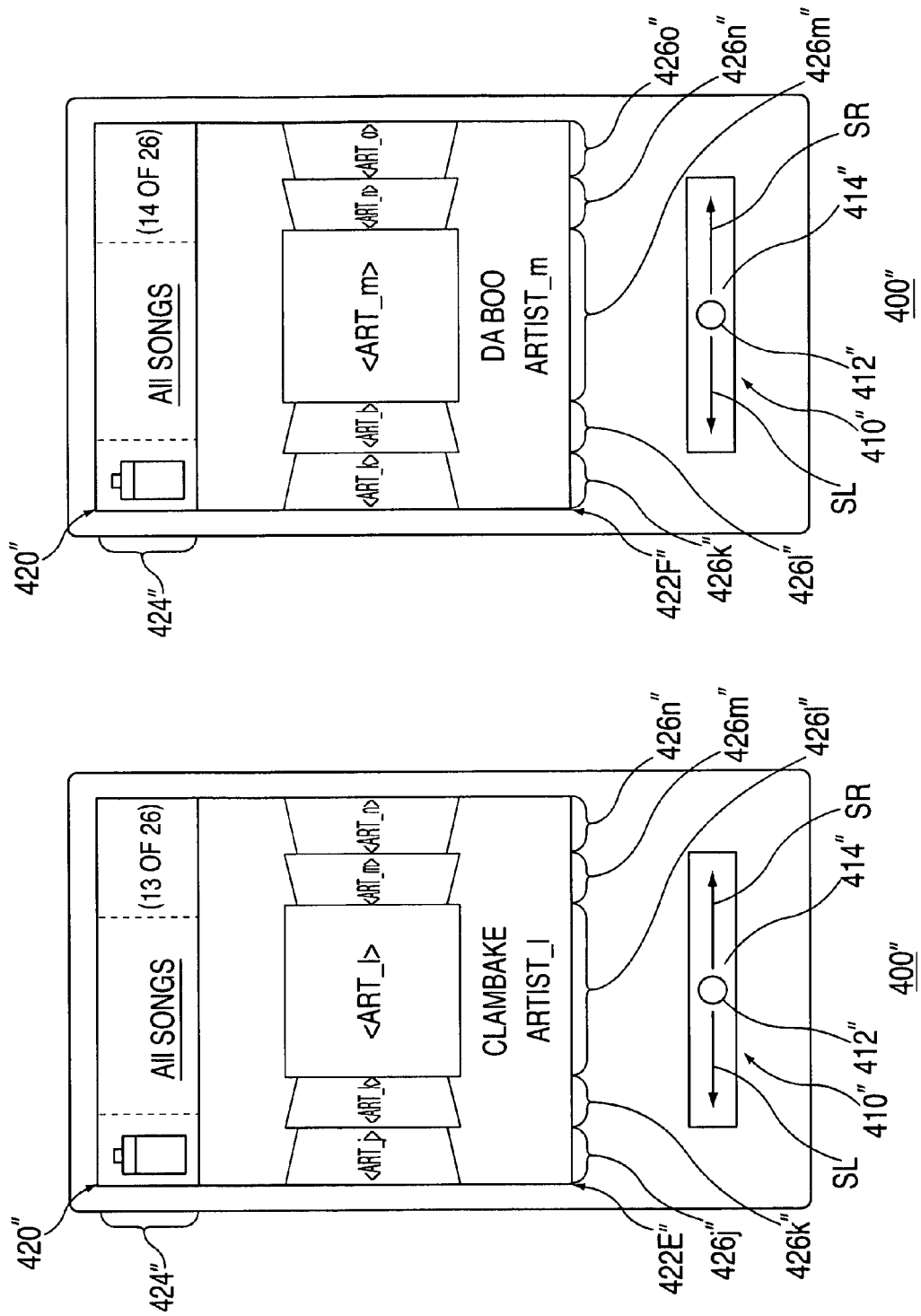

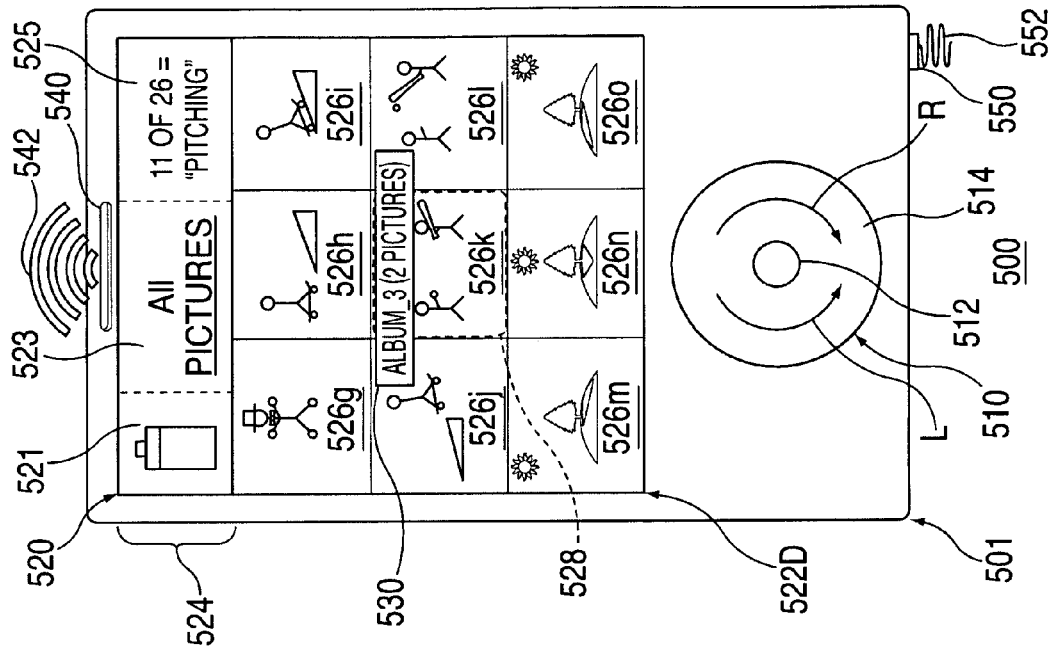
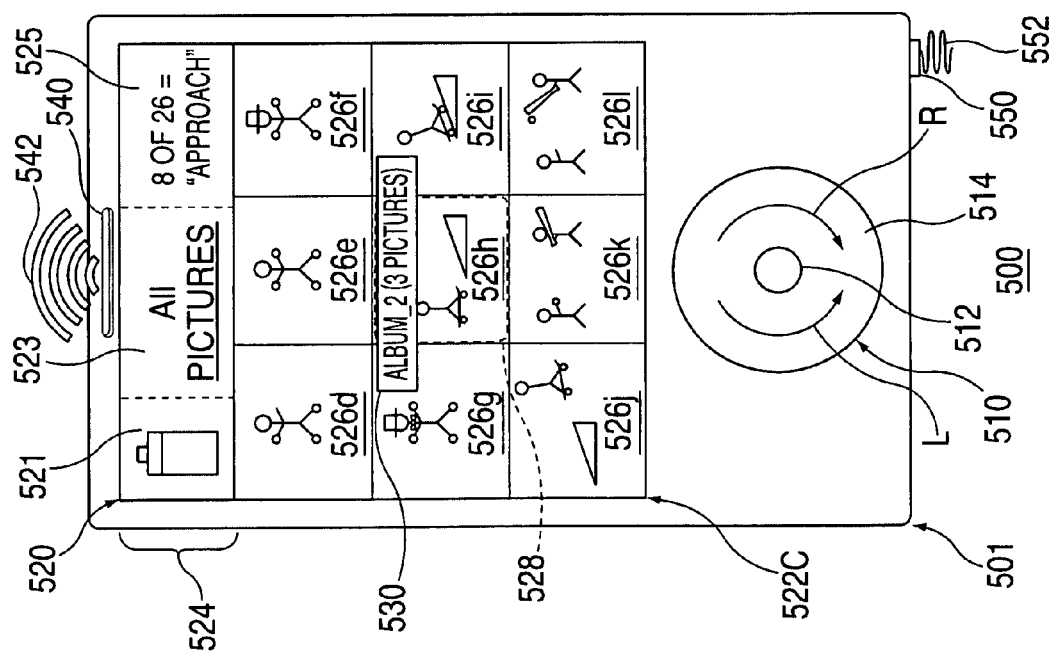

| Picture File | Description | Timestamp | Album | Thumbnail | Audio Clip | Miscellaneous |
|---|---|---|---|---|---|---|
| <PIC_a> | NAKED | 2001-03-01 09:22:06 | ALBUM_1 | <TN_a> | <CLIP_a> | <MISC_a> |
| <PIC_b> | LEFT SHOE | 2001-03-01 09:22:45 | ALBUM_1 | <TN_b> | <CLIP_b> | <MISC_b> |
| <PIC_c> | RIGHT SHOE | 2001-03-01 09:23:16 | ALBUM_1 | <TN_c> | <CLIP_c> | <MISC_c> |
| <PIC_d> | LEFT GLOVE | 2001-03-01 09:23:33 | ALBUM_1 | <TN_d> | <CLIP_d> | <MISC_d> |
| <PIC_e> | RIGHT GLOVE | 2001-03-01 09:24:06 | ALBUM_1 | <TN_e> | <CLIP_e> | <MISC_e> |
| <PIC_f> | TOP HAT | 2001-03-01 09:24:55 | ALBUM_1 | <TN_f> | <CLIP_f> | <MISC_f> |
| <PIC_g> | BOW TIE | 2001-03-01 09:25:39 | ALBUM_1 | <TN_g> | <CLIP_g> | <MISC_g> |
| <PIC_h> | APPROACH | 2002-04-20 12:12:03 | ALBUM_2 | <TN_h> | <CLIP_h> | <MISC_h> |
| <PIC_i> | RAMP | 2002-04-20 12:12:06 | ALBUM_2 | <TN_i> | <CLIP_i> | <MISC_i> |
| <PIC_j> | FLIGHT | 2002-04-20 12:12:09 | ALBUM_2 | <TN_j> | <CLIP_j> | <MISC_j> |
| <PIC_k> | PITCHING | 2003-06-16 08:47:26 | ALBUM_3 | <TN_k> | <CLIP_k> | <MISC_k> |
| <PIC_l> | HITTING | 2003-06-16 08:47:27 | ALBUM_3 | <TN_l> | <CLIP_l> | <MISC_l> |
| <PIC_m> | MORNING | 2004-08-16 07:15:00 | ALBUM_4 | <TN_m> | <CLIP_m> | <MISC_m> |
| <PIC_n> | NOON | 2004-08-16 12:00:00 | ALBUM_4 | <TN_n> | <CLIP_n> | <MISC_n> |
| <PIC_o> | AFTERNOON | 2004-08-16 17:15:00 | ALBUM_4 | <TN_o> | <CLIP_o> | <MISC_o> |
| .. | | | | | | |
| <PIC_z> | FIREWORKS | 2007-07-04 22:12:08 | ALBUM_7 | <TN_z> | <CLIP_z> | <MISC_z> |

FIG. 6

| | Geographic File | Description | Coordinates | Time Zone | Thumbnail | Audio Clip | Miscellaneous |
|---|---|---|---|---|---|---|---|
| 826a | <GEO_a> | VANCOUVER, BC (CAN) | 49°15'N 123°6'W | -08:00 GMT (PST) | <TN_a> | <CLIP_a> | <MISC_a> |
| 826b | <GEO_b> | SEATTLE, WA (USA) | 47°36'N 122°19'W | -08:00 GMT (PST) | <TN_b> | <CLIP_b> | <MISC_b> |
| 826c | <GEO_c> | PORTLAND, OR (USA) | 45°31'12"N 122°40'55"W | -08:00 GMT (PST) | <TN_c> | <CLIP_c> | <MISC_c> |
| 826d | <GEO_d> | SAN FRANCISCO, CA (USA) | 37°46'0"N 122°26'0"W | -08:00 GMT (PST) | <TN_d> | <CLIP_d> | <MISC_d> |
| 826e | <GEO_e> | LOS ANGELES, CA (USA) | 34°3'N 118°15'W | -08:00 GMT (PST) | <TN_e> | <CLIP_e> | <MISC_e> |
| 826f | <GEO_f> | SAN DIEGO, CA (USA) | 32°42'54"N 117°09'45"W | -08:00 GMT (PST) | <TN_f> | <CLIP_f> | <MISC_f> |
| 826g | <GEO_g> | TIJUANA (MEX) | 32°31'30"N 117°2'W | -08:00 GMT (PST) | <TN_g> | <CLIP_g> | <MISC_g> |
| 826h | <GEO_h> | EDMONTON, AB (CAN) | 53°34'N 113°31'W | -07:00 GMT (MST) | <TN_h> | <CLIP_h> | <MISC_h> |
| 826i | <GEO_i> | DENVER, CO (USA) | 39°44'21"N 104°59'5"W | -07:00 GMT (MST) | <TN_i> | <CLIP_i> | <MISC_i> |
| 826j | <GEO_j> | PHOENIX, AZ (USA) | 33°26'54"N 112°04'26"W | -07:00 GMT (MST) | <TN_j> | <CLIP_j> | <MISC_j> |
| 826k | <GEO_k> | CHICAGO, IL (USA) | 41°54'N 87°39'W | -06:00 GMT (CST) | <TN_k> | <CLIP_k> | <MISC_k> |
| 826l | <GEO_l> | MEXICO CITY (MEX) | 19°24'N 99°7'W | -06:00 GMT (CST) | <TN_l> | <CLIP_l> | <MISC_l> |
| 826m | <GEO_m> | NEW YORK, NY (USA) | 40°43'N 74°0'W | -05:00 GMT (EST) | <TN_m> | <CLIP_m> | <MISC_m> |
| 826n | <GEO_n> | WASHINGTON, DC (USA) | 38°53'42.4"N 77°02'12.0"W | -05:00 GMT (EST) | <TN_n> | <CLIP_n> | <MISC_n> |
| 826o | <GEO_o> | BOGOTA (COL) | 4°36'42"N 74°04'34"W | -05:00 GMT (EST) | <TN_o> | <CLIP_o> | <MISC_o> |
| 826z | <GEO_z> | FAIRBANKS, AK (USA) | 64°50'16"N 147°42'59"W | -09:00 GMT (AKST) | <TN_z> | <CLIP_z> | <MISC_z> |

FIG. 8

SCROLLING TECHNIQUES FOR USER INTERFACES

CROSS-REFERENCE TO RELATED APPLICATION

This application claims the benefit of U.S. Provisional Patent Application No. 60/967,457, filed Sep. 4, 2007, which is hereby incorporated by reference herein in its entirety.

FIELD OF THE INVENTION

This can relate to systems and methods for improving the scrolling of user interfaces of electronic devices.

BACKGROUND OF THE DISCLOSURE

There is a need for improving the scrolling of user interfaces of various electronic devices. Specifically, there is a need for improving the ease and speed with which users may scroll through information using user interfaces of various electronic devices.

Some known electronic devices (e.g., personal computers and portable telephones) include a user interface that manipulates data transmitted via an output component based on instructions received from a user input component. Some known input components are conventional keyboards, mice, and the like that allow a user to move a selector and/or information displayed on a visual output component, such as a video monitor, for scrolling through a set of data.

However, the amount of data to be scrolled through is typically extensive as compared to the amount of data able to be easily displayed on the output component at any given time. Accordingly, what is needed are systems and methods for improving the ease and speed with which users may scroll through data using user interfaces of various electronic devices.

SUMMARY OF THE DISCLOSURE

Systems and methods for improving the scrolling of user interfaces of electronic devices are provided.

In some embodiments, a system for controlling the scrolling of information includes a first output component configured to display at least a portion of a list of listings, wherein the list of listings includes a plurality of sublists of listings. The system also includes an input component configured to receive a user movement, and an interface coupled to the input component and the first output component, wherein the interface is configured to monitor a first attribute of the user movement, and wherein the interface is configured to scroll through the list of listings on the first output component from an originating listing to a first scroll listing when the first attribute is below a first threshold. The originating listing is contained within an originating sublist of the plurality of sublists, wherein the first scroll listing is consecutive with the originating listing in the list, wherein the interface is configured to scroll through the list of listings on the first output component from the originating listing to a second scroll listing when the first attribute is above the first threshold, wherein the second scroll listing is the initial listing in a second scroll sublist of the plurality of sublists, and wherein the second scroll sublist is one of the sublists from the following group of sublists: (1) the originating sublist and (2) a sublist consecutive with the originating sublist in the list of listings.

In some embodiments, a method for controlling the scrolling of a list of listings on a first output component with an input component, wherein the list of listings includes a plurality of sublists of listings, includes monitoring a first attribute of a user movement of the input component. The method also includes scrolling on the first output component from an originating listing to a first scroll listing when the monitored first attribute is below a first threshold, wherein the originating listing is contained within an originating sublist of the plurality of sublists, and wherein the first scroll listing is consecutive with the originating listing in the list. The method also includes scrolling on the first output component from the originating listing to a second scroll listing when the monitored first attribute is above the first threshold, wherein the second scroll listing is the initial listing in a second scroll sublist of the plurality of sublists, and wherein the second scroll-sublist is one of the sublists from the following group of sublists: (1) the originating sublist and (2) a sublist consecutive with the originating sublist in the list.

In some embodiments, a method includes detecting an accelerated navigation through a listing of assets and, while the accelerated navigation is detected, providing an asset list identifier along with the listing of assets to indicate where within the listing of assets a user is currently navigating, wherein the providing an asset list identifier comprises generating a first audible signal associated with the accelerated navigation.

In some embodiments, a method includes detecting an accelerated navigation through a listing of assets and, while the accelerated navigation is detected, providing an asset list identifier along with the listing of assets to indicate where within the listing of assets a user is currently navigating, wherein each asset in the listing of assets is related to an image file.

In some embodiments, a method includes detecting an accelerated navigation through a listing of assets and, while the accelerated navigation is detected, providing an asset list identifier along with the listing of assets to indicate where within the listing of assets a user is currently navigating, wherein each asset in the listing of assets is related to a geographic location file.

In some embodiments, a system for controlling the navigation of assets includes a first output component configured to provide a list of assets, a second output component, and an input component coupled to the first and second output components, wherein the input component is configured to detect an accelerated navigation through the list of assets, and wherein the second output component is configured to provide an audible asset list identifier to indicate where within the list of assets provided by the first output component a user is currently navigating when the accelerated navigation is detected.

In some embodiments, a system for controlling the navigation of assets includes an output component configured to provide a list of assets and an input component coupled to the output component, wherein the input component is configured to detect an accelerated navigation through the list of assets, wherein the output component is configured to provide an asset list identifier to indicate where within the list of assets a user is currently navigating when the accelerated navigation is detected, and wherein each asset in the list of assets is related to an image file.

In some embodiments, a system for controlling the navigation of assets includes an output component configured to provide a list of assets and an input component coupled to the output component, wherein the input component is configured to detect an accelerated navigation through the list of assets, wherein the output component is configured to provide an asset list identifier to indicate where within the list of assets a user is currently navigating when the accelerated navigation is detected, and wherein each asset in the list of assets is related to a geographic location file.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIGS. 2A-2F show electronic devices with simplified interfaces at various stages according to some embodiments of the invention;

FIG. 3 shows a media library according to some embodiments of the invention;

FIGS. 4A-4F show electronic devices with simplified interfaces at various stages according to some embodiments of the invention;

FIGS. 5A-5F show electronic devices with simplified interfaces at various stages according to some embodiments of the invention;

FIG. 6 shows a media library according to some embodiments of the invention;

FIG. 8 shows a data library according to some embodiments of the invention.

DETAILED DESCRIPTION OF THE DISCLOSURE

Systems and methods for improving the scrolling of user interfaces of electronic devices are provided and described with reference to FIGS. 1-8.

Figure 1:
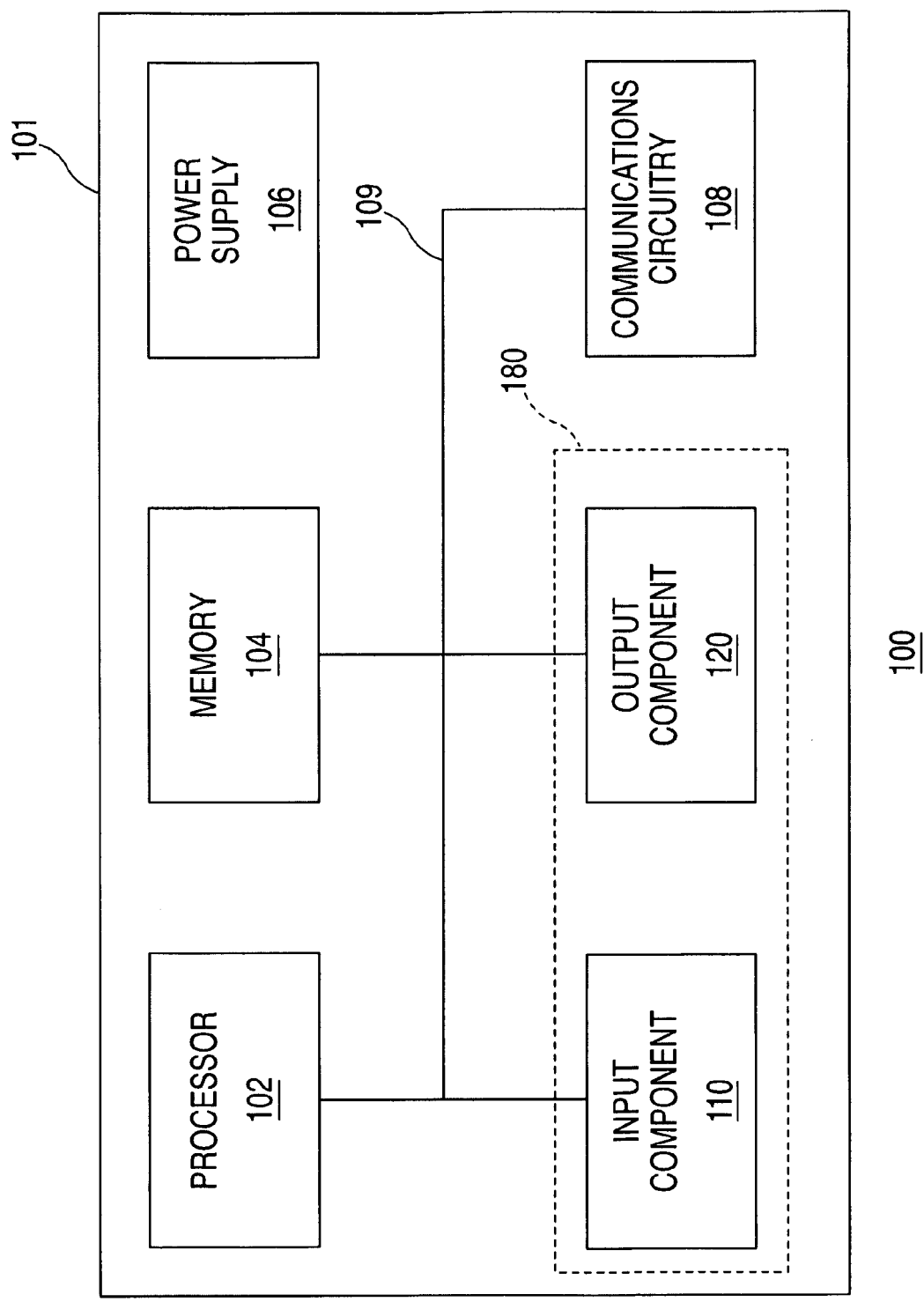
FIG. 1 shows a simplified schematic diagram of an electronic device according to some embodiments of the invention.

FIG. 1 shows an embodiment of electronic device 100 including a user interface in accordance with an embodiment of the invention. The term "electronic device" can include, but is not limited to, music players, video players, still image players, game players, other media players, music recorders, video recorders, cameras, other media recorders, radios, medical equipment, domestic appliances, transportation vehicle instruments, calculators, cellular telephones, other wireless communication devices, personal digital assistants, programmable remote controls, pagers, laptop computers, desktop computers, printers, and combinations thereof. In some cases, the electronic devices may perform a single function (e.g., a device dedicated to playing music) and, in other cases, the electronic devices may perform multiple functions (e.g., a device that plays music, displays video, stores pictures, and receives and transmits telephone calls).

Moreover, in some cases, these electronic devices may be any portable, mobile, hand-held, or miniature electronic device having a user interface constructed according to an embodiment of the invention that allows a user to use the device wherever the user travels. Miniature electronic devices may have a form factor that is smaller than that of hand-held electronic devices, such as an iPod™ available by Apple Inc. of Cupertino, Calif. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, and combinations thereof. Alternatively, electronic devices that incorporate a user interface of the invention may not be portable at all, but may instead be generally stationary, such as a desktop computer or television.

As shown in FIG. 1, electronic device 100 may include housing 101, processor 102, memory 104, power supply 106, communications circuitry 108, bus 109, input component 110, and output component 120. Bus 109 may provide a data transfer path for transferring data, to, from, or between at least processor 102, memory 104, communications circuitry 108, input component 110, and output component 120.

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, and combinations thereof. Input component 110 may include a multi-touch screen, such as that described in U.S. Pat. No. 6,323,846, which is incorporated by reference herein in its entirety. Input component 110 may emulate a rotary phone or a multi-button electronic device pad, which may be implemented on a touch screen or the combination of a click wheel or other user input device and a screen. A more detailed discussion of such a rotary phone interface may be found, for example, in U.S. patent application publication No. 2007/0152983, filed Nov. 1, 2006, entitled "Touch Pad With Symbols Based On Mode," which is incorporated by reference herein in its entirety. Each input component 110 can be configured to provide one or more dedicated control functions for making selections or issuing commands associated with operating device 100.

One or more output components 120 can be provided to present information (e.g., textual, graphical, audible, and/or tactile information) to a user of device 100. Output component 120 may take various forms, including, but not limited, to audio speakers, headphones, audio line-outs, visual displays, antennas, infrared ports, rumblers, vibrators, or combinations thereof.

It should be noted that one or more input components and one or more output components may sometimes be referred to collectively herein as an I/O interface (e.g., input component 110 and output component 120 as I/O interface 180). It should also be noted that input component 110 and output component 120 may sometimes be a single I/O component, such as a touch screen that may receive input information through a user's touch of a display screen and that may also provide visual information to a user via that same display screen.

Communications circuitry 108 may be provided to allow device 100 to communicate with one or more other electronic devices using any suitable communications protocol. For example, communications circuitry 108 may support Wi-Fi (e.g., an 802.11 protocol), Ethernet, Bluetooth™, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 108 can also include circuitry that enables device 100 to be electrically coupled to another device (e.g., a computer or an accessory device) and communicate with that other device.

Memory 104 may include one or more storage mediums, including for example, a hard-drive, flash memory, permanent memory such as ROM, semi-permanent memory such as RAM, any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and email addresses), calendar information, any other suitable data, or any combination thereof.

Power supply 106 may provide power to the components of device 100. In some embodiments, power supply 106 can be coupled to a power grid (e.g., when device 100 is not a portable device, such as a desktop computer). In some embodiments, power supply 106 can include one or more batteries for providing power (e.g., when device 100 is a portable device, such as a cellular telephone). As another example, power supply 106 can be configured to generate power from a natural source (e.g., solar power using solar cells).

Housing 101 may at least partially enclose one or more of the components of device 100 for protecting them from debris and other degrading forces external to the device. In some embodiments, one or more of the components may be provided within its own housing (e.g., input component 110 may be an independent keyboard or mouse within its own housing that may wirelessly or through a wire communicate with processor 102, which may be provided within its own housing).

Processor 102 of device 100 may control the operation of many functions and other circuitry included in the device. For example, processor 102 can receive input signals from input component 110 and/or drive output signals through output component 120. Processor 102 may load a user interface program (e.g., a program stored in memory 104 or another device or server) to determine how instructions received via an input component 110 may manipulate the way in which information (e.g., information stored in memory 104 or another device or server) is provided to the user via an output component 120.

As described above, a disadvantage of conventional electronic device user interfaces is that the amount of data that may be manipulated by a user via an input component is typically quite large as compared to the amount of data that may be easily provided to the user via an output component at any one point in time. Therefore, according to embodiments of the invention, systems and methods are provided for improving the ease and speed with which users may scroll through a large amount of data using user interfaces of various electronic devices.

FIGS. 2A-2F show an electronic device 200 having a user interface that can selectively scroll through information in accordance with an embodiment of the invention. Device 200 may be a self-contained media player with an I/O interface that may include an input component 210 and an output component 220. Device 200 may also include a housing 201 for at least partially surrounding input component 210 and output component 220. In one embodiment, as shown, input component 210 may be a rotational input device, such as a click wheel, and output component 220 may be a video display, each of which may be found on certain iPods™ available by Apple Inc. of Cupertino, Calif.

In accordance with one embodiment of the invention, device 200 can permit a user to load and browse through one or more large libraries of media or data. Each library may be stored in a memory component of the device (e.g., memory 104 of FIG. 1) or may be downloaded to device 200 from another device or server (e.g., via communications circuitry 108 of FIG. 1), for example. A library can contain a plurality of library entries and each library entry can include payload data and associated metadata.

FIG. 3, for example, illustrates a media library 300 in accordance with an embodiment of the invention. As shown, library 300 may be a library of songs. Library 300 may contain a plurality of song entries 326 (e.g., entries 326a-326z). Each library entry 326 may include payload data 340 (e.g., the actual audio recording of the song) and associated metadata 350 (e.g., textual information and/or graphical information related to that audio recording). As shown, each library entry 326 of library 300 includes payload data 340. Payload data 340 for each entry 326 may be an audio recording or song file <SONG_> (e.g., as shown in FIG. 3, entry 326a may include an associated piece of payload data 340 that is song file <SONG_a>). This file may be a WAV file, an MP3 file, or any other type of audio file. All metadata 350 for each entry 326 is information associated with payload data 340 of that entry 326.

For example, a particular piece of metadata 350 that may be associated with an audio recording file 340 of a particular song entry 326 in library 300 is textual information metadata. Such textual information may be a string of one or more alphanumeric characters representative or descriptive of the title of the song (e.g., song title metadata 351), the length of the song (e.g., song length metadata 352), the name of the song's artist (e.g., song artist metadata 353), the name of the album on which the song originally appears (e.g., song album metadata 354), or any other facet of the song, such as the lyrics of the song, for example. As shown, song title metadata 351 for each entry 326 may be a string of one or more alphanumeric characters representative or descriptive of the title of the song (e.g., as shown in FIG. 3, <SONG_a> of entry 326a may have an associated piece of song title metadata 351 that is alphanumeric string "A BAD ONE").

Similarly, song length metadata 352 for each entry 326 may be a string of one or more alphanumeric characters representative or descriptive of the length of the song (e.g., as shown in FIG. 3, <SONG_a> of entry 326a may have an associated piece of song length metadata 352 that is alphanumeric string "03:22"). Likewise, song artist metadata 353 for each entry 326 may be a string of one or more alphanumeric characters representative or descriptive of the song's artist (e.g., as shown in FIG. 3, <SONG_a> of entry 326a may have an associated piece of song artist metadata 353 that is alphanumeric string "ARTIST_a"), while song album metadata 354 for each entry 326 may be a string of one or more alphanumeric characters representative or descriptive of the song's album (e.g., as shown in FIG. 3, <SONG_a> of entry 326a may have an associated piece of song album metadata 354 that is alphanumeric string "ALBUM_a").

Another particular piece of metadata 350 that may be associated with an audio recording file 340 of a particular song entry 326 in library 300 is graphical information. Such graphical information may be an image or video file depicting or descriptive of the cover art of the album on which the song originally appears (e.g., cover art metadata 355) or any other facet of the song, such as a picture of the song's artist, for example. As shown, cover art metadata 355 for each entry 326 may be an image file representing or descriptive of the cover art of the song's album (e.g., as shown in FIG. 3, <SONG_a> of entry 326a may have an associated piece of cover art metadata 355 that is image file <ART_a>).

Yet another particular piece of metadata 350 that may be associated with an audio recording file 340 of a particular song entry 326 in library 300 is additional audio information. Such additional audio information may be an additional audio file representative of at least a portion of the associated payload audio recording file 340. For example, the additional audio information may be a condensed or smaller or shorter version of the payload audio recording file, such as a thirty-second clip of a much longer payload audio recording file, or a short recording enunciating the name of the song's title or first alphanumeric character of the song's album (e.g., audio clip metadata 356). As shown, audio clip metadata 356 for each entry 326 may be an audio file representative of a short portion of the associated payload audio recording file 340 (e.g., as shown in FIG. 3, <SONG_a> of entry 326a may have an associated piece of audio clip metadata 356 that is audio file <CLIP_a>).

There are many other various types of metadata 350 that can be associated with a particular payload audio file 340 of a particular song entry 326 in library 300. For example, such a particular piece of metadata may include preference information (e.g., media playback preferences), exercise information (e.g., information obtained by exercise monitoring equipment), transaction information (e.g., information such as credit card information), subscription information (e.g., information that keeps track of podcasts or television shows or other media a user subscribes to), contact information (e.g., telephone numbers and email addresses), calendar information, or any other suitable type of information that a user or other entity may wish to associate with a particular payload audio file of a particular song entry in a library of songs (e.g., miscellaneous metadata 357). As shown, miscellaneous metadata 357 for each entry 326 may be any type of file or alphanumeric string representative of any facet of the associated payload audio recording file 340 (e.g., as shown in FIG. 3, <SONG_a> of entry 326a may have an associated piece of miscellaneous metadata 357 that is miscellaneous <MISC_a>).

As mentioned, each library (e.g., library 300) or any particular portions of a library (e.g., cover art metadata 355) may be stored in any memory component of device 200 (e.g., memory 104 of FIG. 1) or may be downloaded to device 200 from any another device or server (e.g., via communications circuitry 108 of FIG. 1), for example. In one embodiment, most of library 300 may be stored locally on device 200 (e.g., in memory 104 of FIG. 1) but cover art metadata 355 for each entry 326 may be an image file (e.g., image file <ART_a>) stored on a separate server or device. When some portion of the library is stored locally on device 200 and other portions are stored on a separate server, the library portion on the device may store pointers (e.g., URLs) to the corresponding portions of the library stored on remote servers, for example.

According to an embodiment of the invention, device 200 may include a user interface that allows a user to quickly and easily alternate between two or more modes of scrolling through a list of library entries. For example, the user interface of device 200 may quickly and easily switch between first and second scrolling modes in response to a particular type of user command generated by input component 210. This can improve the speed and ease with which a user may search for a particular entry within an extensive library of entries.

FIGS. 2A-2F illustrate a user interface 222 that may be displayed on output component 220 when a user is accessing a library of entries (e.g., library 300 of song entries 326) in accordance with an embodiment of the invention. A user interface can present the library of entries to the user as a list of descriptive entry listings, each of which may be associated with a particular entry of the library being accessed. For example, as shown in FIG. 2A, user interface 222A can present a set of five (5) descriptive entry listings 226 (e.g., entry listings 226a, 226b, 226c, 226d, and 226e). Each particular listing 226 may be associated with a particular entry of the library and can include at least a portion of at least one piece of metadata associated with that particular library entry.

For example, in the embodiment where a user is accessing library 300 of song entries 326 (see, e.g., FIG. 3), user interface 222A can present the set of five (5) descriptive entry listings 226a-226e such that each particular listing 226 may be associated with a particular song entry 326 of library 300. As shown in FIG. 2A, for example, each particular listing 226 may include at least a portion of at least one piece of metadata 350 associated with the particular library entry 326 being presented by that listing 226. Particularly, in the embodiment of FIG. 2A, each one of descriptive entry listings 226a-226e includes song title metadata 351 for each of respective song entries 326a-326e. Therefore, the alphanumeric string representative of the title of the song file 340 associated with each of entries 326a-326e to be displayed by user interface 222A is included in a respective one of descriptive entry listings 226a-226e. As shown in FIG. 2A, for example, listing 226a may include the title metadata 351 associated with library entry 326a (i.e., "A BAD ONE"), listing 226b may include the title metadata 351 associated with library entry 326b (i.e., "ACCENT"), listing 226c may include the title metadata 351 associated with library entry 326c (i.e., "ADVENTURE"), listing 226d may include the title metadata 351 associated with library entry 326d (i.e., "AFTER DARK"), and listing 226e may include the title metadata 351 associated with library entry 326e (i.e., "AROUND US").

User interface 222 may also include a highlighter or selector indicator 228 that can differentiate one or more specific descriptive entry listings 226 from the other listings 226 displayed on output component 220 at any given time (e.g., listing 226c in user interface 222A of FIG. 2A). Indicator 228 may help to identify the listing that can be selected by the user using input component 210. Indicator 228 may be a star-like icon, as shown, or it may simply be a different shading or coloring over part or all of the one or more listings to be differentiated, for example.

User interface 222 may also include a status portion 224 that can describe the status of device 200. For example, as show in FIG. 2A, status portion 224 of user interface 222A can include a battery status indicator portion 221 that may present information indicative of the charge of the battery powering device 200 (e.g., power supply 106 of FIG. 1). Status portion 224 of user interface 222A can also include a library status indicator 223 that may be descriptive of the specific library being accessed by the user (e.g., "All Songs" when all the song entries 326 of library 300 are being accessed). Moreover, status portion 224 of user interface 222A can include a scrolling status indicator 225 that may be descriptive of the specific library entry being highlighted relative to the entire library being accessed (e.g., "(3 of 26)" when listing 226c associated with third entry 326c of twenty-six (26) entries 326a-326z is being highlighted, as shown in FIG. 2A). Various other types of information may be provided by status portion 224 of user interface 222 according to the invention.

Rotational input component 210 may include a selector 212 surrounded by a curved track 214, as shown in FIG. 2A, for example. A user may interact with input component 210 to send various types of input signals to the user interface of device 200. For example, a user may interact with input component 210 by gesturing in a rotational manner along curved track 214, either in the direction of arrow L or in the direction of arrow R, or by clicking on selector 212. In one embodiment, if the user desires to select the library entry associated with the descriptive entry listing 226 distinguished by indicator 228 of the user interface 222 on output component 220, he or she may click on selector 212. However, if the user desires to select a descriptive entry listing 226 other than the one distinguished by indicator 228, he or she may gesture in a rotational manner along curved track 214 to scroll through the listings, for example.

FIGS. 2A-2F illustrate how user interface 222 of device 200 can allow a user to scroll through listings 226 such that new listings may be distinguished by indicator 228 on display 220. As a user indicates the desire to browse or scroll through the displayed listings 226 of a particular library (e.g., library 300), device 200 can update the user interface 222 on output component 220 by displaying one or more new listings 226 and/or by moving indicator 228 with respect to the displayed listings.

For example, a user may gesture or impart a movement in the direction of arrow R along track 214 in such a way that user interface 222 scrolls downwardly through one additional listing 226. For example, user interface 222 may monitor an attribute of the user movement and update user interface 222A of FIG. 2A on output component 220 such that a single new listing 226f is displayed at the bottom of the interface, as shown in updated user interface 222B of FIG. 2B. As shown, this also may shift indicator 228 with respect to the listings such that a new listing (e.g., listing 226d of FIG. 2B) is highlighted. Alternatively, a user may gesture in the direction of arrow L along track 214 in such a way that user interface 222 scrolls upwardly through one additional listing 226. For example, user interface 222 may monitor an attribute of the user movement and update user interface 222B of FIG. 2B on output component 220 such that a single new listing 226a is displayed at the top of the list, as shown in user interface 222A of FIG. 2A. As shown, this also may shift indicator 228 with respect to the listings such that a new listing (e.g., listing 226c of FIG. 2A) is highlighted.

As well as handling various gesture types (e.g., user movement in the direction of arrows L and R), input component 210 may generate different instructions to the user interface of device 200 based on various attributes of a particular gesture type. The user interface may monitor at least a first attribute of a particular type of user movement received by the input component and thereby vary the way in which listings are scrolled. For example, user interface 222 may monitor an attribute of a user's movement on input component 210, such as the speed, length, or frequency of a user's movement in the direction of arrow R along track 214, and may vary the way in which listings 226 are scrolled with respect to indicator 228 based on that monitored attribute. In one embodiment, the listings 226 may be scrolled upwardly or downwardly one listing at a time when a monitored attribute of a user movement is below a certain threshold (e.g., when the speed of the movement is below a certain threshold velocity) and may be scrolled differently than one listing at a time when the monitored attribute of the user movement is above a certain threshold (e.g., when the speed of the movement is above a certain threshold velocity).

As described, a user may gesture in the direction of arrow R along track 214 in such a way that user interface 222 is updated with a single new listing 226 displayed at the bottom of the list (e.g., as shown in the update of user interface 222 between interface 222A of FIG. 2A and interface 222B of FIG. 2B). This may occur, for example, if a monitored attribute of the user movement is below a certain threshold. Alternatively, the user may gesture in the direction of arrow R along track 214 in such a way that user interface 222 may be updated differently than with just a single new listing at the bottom of the list (e.g., as shown in the update of user interface 222 between interface 222B of FIG. 2B and interface 222C of FIG. 2C). This may occur, for example, if a monitored attribute of the user movement is above a certain threshold.

There are various ways in which a user interface may scroll through a list of listings other than one listing at a time. For example, rather than simply scrolling from an original listing to a new listing that is consecutive with the original listing in the list, the list may be broken down into several sublists and a user interface may scroll from an original listing in a first sublist of the list to a new listing that is either the initial listing in the first sublist or the initial listing in a sublist that is consecutive with the first sublist in the list.

In one embodiment, as shown in FIGS. 2A-3, for example, user interface 222 may provide a list of listings 226 on output component 220. This list of listings 226 may include a plurality of sublists of listings 226, as described in more detail below. Moreover, as described above, each one of listings 226 in the list of listings may be associated with an entry 326 in library 300, and each entry 326 in library 300 may include at least a first piece of metadata 350, such as song title metadata 351.

Each listing 226 in the list of listings on user interface 222 may be included in one of the plurality of sublists of listings 226 based on a first characteristic of this first piece of metadata. For example, each listing 226 in the list of listings on user interface 222 may be included in one of a plurality of sublists of listings 226 based on a first characteristic of the song title metadata 351 associated with that listing. Song title metadata 351 may be a string of one or more alphanumeric characters (e.g., "A BAD ONE" or "ACCENT" or "BALLOON" or "CLAM BAKE"). Therefore, each listing 226 in the list of listings on user interface 222 may be included in one of a plurality of sublists of listings 226 based on a first characteristic of the alphanumeric string, such as the first alphanumeric character of the string (e.g., "A" for "A BAD ONE", or "A" for "ACCENT", or "B" for "BALLOON", or "C" for "CLAM BAKE"). As shown in FIGS. 2A-2C, for example, each one of listings 226a-226g may therefore be considered to be in a first sublist of the plurality of sublists in the list of listings 226 on user interface 222 because the first alphanumeric character of the song title metadata 351 for each of those listings 226a-226g is an "A". Similarly, as shown in FIGS. 2C and 2D, for example, each one of listings 226h-226j may therefore be considered to be in a second sublist of the plurality of sublists in the list of listings 226 on user interface 222 because the first alphanumeric character of the song title metadata 351 for each of those listings 226h-226j is a "B".

The listings 226 in each one of the plurality of sublists may be ordered within a particular sublist based on a second characteristic of the first piece of metadata. For example, each one of listings 226a-g in the first sublist on user interface 222 may be ordered within that sublist based on a second characteristic of the song title metadata 351. Song title metadata 351 may be a string of one or more alphanumeric characters. Therefore, each one of listings 226a-g in the first sublist on user interface 222 may be ordered within that sublist based on a second characteristic of the alphanumeric string, such as the alphanumerical order of the string. For example, each one of listings 226a-g in the first sublist on user interface 222 may therefore be ordered within that sublist as shown in FIGS. 2A-2C because "A BAD ONE" alphanumerically precedes "ACCENT", which alphanumerically precedes "ADVENTURE", which alphanumerically precedes "AFTER DARK", which alphanumerically precedes "AROUND US", which alphanumerically precedes "AT LAST", which alphanumerically precedes "AZTECS". Similarly, each one of listings 226h-j in the second sublist on user interface 222 may therefore be ordered within that sublist as shown in FIGS. 2D and 2E because "BALLOON" alphanumerically precedes "BEST GIRL", which alphanumerically precedes "BUD".

Finally, the plurality of sublists of listings 226 may be ordered within the list of listings 226 provided by user interface 222 based on the first characteristic of the first piece of metadata. For example, the first sublist containing listings 226a-g and the second sublist containing listings 226h-j may be ordered within the list of listings 226 provided by user interface 222 based on the first characteristic of the first piece of metadata (e.g., based on the alphanumerical order of the first alphanumeric character of the song title metadata 351). For example, the first sublist containing listings 226a-g and the second sublist containing listings 226h-j may be ordered within the list of listings 226 provided by user interface 222 as shown in FIGS. 2A-2C because the first alphanumeric character "A" of the song title metadata 351 associated with the first sublist alphanumerically precedes the first alphanumeric character "B" of the song title metadata 351 associated with the second sublist. Similarly, the second sublist containing listings 226h-j and a third sublist containing listings 226k-l may be ordered within the list of listings 226 provided by user interface 222 as shown in FIGS. 2C-2F because the first alphanumeric character "B" of the song title metadata 351 associated with the second sublist alphanumerically precedes the first alphanumeric character "C" of the song title metadata 351 associated with the third sublist.

A list of listings that is broken down into several sublists of listings, such as listings 226 of FIGS. 2A-3, may be scrolled by a user interface in various ways. In one embodiment, user interface 222 may simply scroll from an original listing to a new listing that is consecutive with the original listing in the list, regardless of the original listing's sublist (i.e., "elementally-scroll"). For example, as described above, user interface 222 may simply scroll downwardly from an original listing 226c in user interface 222A of FIG. 2A to a new listing 226d that is downwardly consecutive with original listing 226c in the list of listings 226, as shown in user interface 222B of FIG. 2B. User interface 222 may provide this downward "elemental-scrolling" from original listing 226c to downwardly consecutive new listing 226d by monitoring an attribute of a user movement in the direction of arrow R along track 214 that is below a certain threshold, for example. Likewise, as described above, user interface 222 may simply scroll upwardly from an original listing 226d in user interface 222B of FIG. 2B to a new listing 226c that is upwardly consecutive with original listing 226d in the list of listings 226, as shown in user interface 222A of FIG. 2A. User interface 222 may provide this upward "elemental-scrolling" from original listing 226d to upwardly consecutive new listing 226c by monitoring an attribute of a user movement in the direction of arrow L along track 214 that is below a certain threshold, for example.

Alternatively, user interface 222 may scroll from an original listing in a first sublist of the list to a new listing that is either (1) the initial listing in a second sublist that is consecutive with the first sublist in the list or (2) the initial listing in the first sublist (i.e., "quickly-scroll"). For example, user interface 222 may scroll downwardly from an original listing 226d in a first sublist containing listings 226a-g, as shown in user interface 222B of FIG. 2B, to a new listing 226h that is the initial listing in a second sublist (e.g., the initial listing in the sublist containing listings 226h-j) that is downwardly consecutive with the first sublist in the list, as shown in user interface 222C of FIG. 2C. User interface 222 may provide this downward "quick-scrolling" from original listing 226d to new listing 226h by monitoring an attribute of a user movement in the direction of arrow [[L]] R along track 214 that is above a certain threshold, for example.

Somewhat likewise, user interface 222 may scroll upwardly from an original listing 226l in a first sublist containing listings 226k and 226l, as shown in user interface 222E of FIG. 2E, to a new listing 226k that is the initial listing in the first sublist, as shown in user interface 222D of FIG. 2D. User interface 222 may provide this upward "quick-scrolling" from original listing 226l to new listing 226k by monitoring an attribute of a user movement in the direction of arrow L along track 214 that is above a certain threshold, for example. Although it is to be noted that user interface 222 may also provide this upward scrolling from original listing 226l to new listing 226k through "elemental-scrolling," by monitoring an attribute of a user movement in the direction of arrow L along track 214 that is below a certain threshold, for example, because listings 226k and 226l are the only two listings in their sublist. User interface 222 of the invention may provide quick-scrolling or any other mode of scrolling independently of any sublists that may categorize certain listings of a list of listings being accessed by a user. For example, a first mode of scrolling may be "elemental" in that it scrolls from one listing to a new consecutive listing, while a second mode of scrolling may jump to a new listing that is ten (10) listings removed from the original listing.

These thresholds of various attributes of various user movements that may be monitored by user interface 222 to determine whether to "elementally-scroll" or "quickly-scroll" through the listings 226 provided on output component 220 may be determined by a user of device 200 or the manufacturer of device 200. For example, a user may select a threshold based on how many entries are in the library through which he or she wishes to scroll. Alternatively, a user may select a threshold based on his or her dexterity using the input component. These thresholds may be stored locally on the device (e.g., memory 104 of FIG. 1), for example.

Therefore, according to an embodiment of the invention, user interface 222 of device 200 may quickly and easily switch between a first "elemental-scrolling" mode and a second "quick-scrolling" mode for updating the displayed portion of a list of descriptive entry listings 226 on output component 220 in response to a monitored attribute of a particular type of user movement of input component 210. This can improve the speed and ease with which a user may search for a particular entry within an extensive library of entries. The user interface of the invention may provide more than two modes of scrolling by monitoring an attribute of a user movement with respect to more than one threshold or by monitoring more than one attribute of a user movement. Moreover, a quick-scrolling mode of the user interface may scroll through a list of listings in various other ways, such as immediately to the end of the list, or immediately to the middle of the list, for example.

In addition to changing the way in which descriptive entry listings 226 are scrolled on output component 220 in response to a particular type of user movement of input component 210, user interface 222 may also change the type of information transmitted to the user in response to a particular type of user movement of input component 210. For example, when user interface 222 quick-scrolls downwardly from an original listing 226d in a first sublist to a new listing 226h that is the initial listing in a downwardly consecutive second sublist, user interface 222 may also enhance itself by providing a visual enhancer 230 along with the updated set of listings 226 (e.g., as shown in the update from user interface 222B of FIG. 2B to user interface 222C of FIG. 2C).

Visual enhancer 230 may be any additional information, such as an icon or image or string of one or more alphanumerical characters, that is descriptive of or related to at least one characteristic of the new listing or the second sublist (i.e., the sublist that contains the new listing). For example, as shown in FIG. 2C, visual enhancer 230 may be a block of textual information superimposed over the rest of user interface 222C so that it may be easily seen by the user. Visual enhancer 230 may include a string of one or more alphanumerical characters representative of the characteristic of the piece of metadata that is the basis for the differentiation between sublists in the list of listings 226 (e.g., the first alphanumeric character of the song title metadata 351, which is "B" for the sublist containing new listing 226h), as shown in FIG. 2C, for example. Alternatively, visual enhancer 230 may include an image representative of the new listing (e.g., image file <ART_h> of cover art metadata 355 associated with library entry 326 h, and thus new listing 226 h).

In one embodiment, user interface 222 may continuously show visual enhancer 230 as long as the user interface continues to quick-scroll through the listings. For example, if user interface 222 continues to quick-scroll downwardly from listing 226h in a first sublist to a new listing 226k that is the initial listing in a downwardly consecutive second sublist, as shown in the update from user interface 222C of FIG. 2C to user interface 222D of FIG. 2D, user interface 222 may continue to provide visual enhancer 230 along with the updated set of listings 226. However, the textual information within visual enhancer 230 may be changed to reflect the new sublist containing the new listing (e.g., "C" for the sublist containing new listing 226k).

When user interface 222 terminates quick-scrolling and begins elemental-scrolling, for example, visual enhancer 230 may also be terminated. For example, if user interface 222 stops quick-scrolling but continues to update the listings 226 displayed on output component 220 by elementally-scrolling downwardly from listing 226k to downwardly consecutive listing 226l, as shown in the update from user interface 222D of FIG. 2D to user interface 222E of FIG. 2E, user interface 222 may stop providing visual enhancer 230. User interface 222 may continue to not provide visual enhancer 230 as the interface continues to elementally-scroll through the listings, as shown in the update from user interface 222E of FIG. 2E to user interface 222F of FIG. 2F.

It is to be noted, however, that in accordance with an embodiment of the invention, user interface 222 may provide visual enhancer 230 along with an updated set of listings 226 even when it is not quick-scrolling. For example, user interface 222 may once again provide visual enhancer 230 if the interface elementally-scrolls upwardly through the listings from listing 226l to listing 226k, as shown in the update from user interface 222E of FIG. 2E to user interface 222D of FIG. 2D.

The situations in which user interface 222 may provide a visual enhancer, such as visual enhancer 230 of FIGS. 2C and 2D, may be determined by a user of device 200 or the manufacturer of device 200. For example, a user may wish to be provided with a visual enhancer only when he or she is quick-scrolling. Alternatively, a user may wish to be provided with a visual enhancer whenever he or she scrolls to a listing that is an initial listing in a sublist of the list of listings. These preferences may be fully customizable and may be stored locally on the device (e.g., memory 104 of FIG. 1), for example.

As an alternative or in addition to visually enhancing an updated set of listings 226 with a visual enhancer 230, user interface 222 may enhance itself aurally. As shown in FIGS. 2A-2F, device 200 may also include an audio output component 240. Audio output component 240 may be any output component suitable for transmitting audible information to a user, such as a speaker, headphones, or the like. In addition to changing the way in which descriptive entry listings 226 are scrolled on output component 220 in response to a particular type of user movement of input component 210, user interface 222 may also change the type of audio information transmitted to the user via output component 240 in response to a particular type of user movement of input component 210.

For example, when user interface 222 elementally-scrolls downwardly from an original listing 226c to downwardly consecutive listing 226d in the list of listings, user interface 222 may enhance itself aurally by transmitting a first sound 241 via output component 240 while also updating the set of listings 226 on output component 220 (e.g., as shown in the update from user interface 222A of FIG. 2A to user interface 222B of FIG. 2B). On the other hand, when user interface 222 quick-scrolls downwardly from an original listing 226d to a new listing 226h that is the initial listing in a downwardly consecutive sublist, user interface 222 may enhance itself aurally by transmitting a second sound 242 via output component 240 while also updating the set of listings 226 on output component 220 (e.g., as shown in the update from user interface 222B of FIG. 2B to user interface 222C of FIG. 2C), for example.

First sound 241 and second sound 242 may each be a single tone or a much more complex sound, such as a song. In one embodiment, first sound 241 may be a single short "clicking" sound indicative of the short scrolling between consecutive listings 226c and 226d (e.g., as shown in the update from user interface 222A of FIG. 2A to user interface 222B of FIG. 2B), while second sound 242 may be a longer "clunking" sound indicative of the quick-scrolling between listings 226d and 226h of different sublists (e.g., as shown in the update from user interface 222B of FIG. 2B to user interface 222C of FIG. 2C). The same first sound 241 may be transmitted by user interface 222 every time it elementally-scrolls between two listings and the same second sound 242 may be transmitted by user interface 222 every time it quickly-scrolls between two listings. This may help a user to more quickly and more easily realize how he or she is scrolling through the listings.

For example, when user interface 222 continues to quick-scroll downwardly from an original listing 226h to a new listing 226k that is the initial listing in a downwardly consecutive sublist, user interface 222 may enhance itself aurally by once again transmitting second sound 242 via output component 240 while also updating the set of listings 226 on output component 220 (e.g., as shown in the update from user interface 222C of FIG. 2C to user interface 222D of FIG. 2D).

Then, when user interface 222 begins to once again elementally-scroll downwardly, such as from an original listing 226k to downwardly consecutive listing 226l, the user interface may enhance itself aurally by once again transmitting the first sound 241 via output component 240 while also updating the set of listings 226 on output component 220 (e.g., as shown in the update from user interface 222D of FIG. 2D to user interface 222E of FIG. 2E).

However, there are various other ways in which user interface 222 can transmit different sounds via output component 240 for increasing the ease and speed with which a user may scroll through a list of listings 226. For example, in another embodiment, the sound transmitted by user interface 222 via output component 240 may be specifically associated with the listing being highlighted by indicator 228. For example, when user interface 222 scrolls to a new listing 226m (e.g., by elementally scrolling downwardly from an original listing 226l), the user interface may enhance itself aurally by transmitting via output 240 a third sound 243 that is in some way related to new listing 226m (e.g., as shown in the update from user interface 222E of FIG. 2E to user interface 222F of FIG. 2F). Therefore, according to one embodiment, when interface 222 is updated to highlight listing 226m, third sound 243 may be audio clip <CLIP_m> (i.e., audio clip metadata 356 associated with library entry 326m).

The situations in which user interface 222 may provide an aural enhancement via output component 240, may be determined by a user of device 200 or the manufacturer of device 200. For example, a user may wish to be provided with aural enhancement only when he or she is quick-scrolling. Alternatively, a user may wish to be provided with aural enhancement whenever he or she scrolls to a listing that is an initial listing in a sublist of the list of listings. These preferences may be fully customizable and may be stored locally on the device (e.g., memory 104 of FIG. 1), for example.

As an alternative or in addition to visually enhancing an updated set of listings 226 with a visual enhancer 230 and/or aurally enhancing an updated set of listings 226 with sounds via an audio output component 240, user interface 222 may enhance itself haptically or tactilely. As shown in FIGS. 2A-2F, device 200 may also include a haptic output component 250. Haptic output component 250 may be any output component suitable for transmitting haptic or tactile information to a user, such as a rumble pack, vibration generator, or the like. In addition to changing the way in which descriptive entry listings 226 are scrolled on output component 220 in response to a particular type of user movement of input component 210, user interface 222 may also change the type of haptic information transmitted to the user via output component 250 in response to a particular type of user movement of input component 210.

For example, when user interface 222 elementally-scrolls downwardly from an original listing 226c to downwardly consecutive listing 226d, user interface 222 may enhance itself haptically by transmitting a first haptic signal 251 via output component 250 while also updating the set of listings 226 on output component 220 (e.g., as shown in the update from user interface 222A of FIG. 2A to user interface 222B of FIG. 2B). On the other hand, when user interface 222 quick-scrolls downwardly from an original listing 226d to a new listing 226h that is the initial listing in a downwardly consecutive sublist, user interface 222 may enhance itself haptically by transmitting a second haptic signal 252 via output component 250 while also updating the set of listings 226 on output component 220 (e.g., as shown in the update from user interface 222B of FIG. 2B to user interface 222C of FIG. 2C), for example.

First haptic signal 251 and second haptic signal 252 may each be a single force or a much more complex motion, such as a steady beat. In one embodiment, first haptic signal 251 may provide a single short vibrating sensation to the user that is indicative of the short scrolling between consecutive listings 226c and 226d, while second haptic signal 252 may provide a longer and more powerful vibrating sensation to the user that is indicative of the quick-scrolling between listings 226d and 226h of different sublists. The same first haptic signal 251 may be transmitted by user interface 222 every time it elementally-scrolls between two listings and the same second haptic signal 252 may be transmitted by user interface 222 every time it quickly-scrolls between two listings. This may help a user to more quickly and more easily realize how he or she is scrolling through the listings.

For example, when user interface 222 continues to quick-scroll downwardly from an original listing 226h to a new listing 226k that is the initial listing in a downwardly consecutive sublist, user interface 222 may enhance itself haptically by once again transmitting second haptic signal 252 via output component 250 while also updating the set of listings 226 on output component 220 (e.g., as shown in the update from user interface 222C of FIG. 2C to user interface 222D of FIG. 2D). Then, when user interface 222 begins to once again elementally-scroll downwardly, such as from an original listing 226k to downwardly consecutive listing 226l, the user interface may enhance itself haptically by once again transmitting the first haptic signal 251 via output component 250 while also updating the set of listings 226 on output component 220 (e.g., as shown in the update from user interface 222D of FIG. 2D to user interface 222E of FIG. 2E).

However, there are various other ways in which user interface 222 can transmit different haptic signals via output component 250 for increasing the ease and speed with which a user may scroll through a list of listings 226. For example, in another embodiment, the haptic signal transmitted by user interface 222 via output component 250 may be specifically associated with the listing being highlighted by indicator 228. For example, when user interface 222 scrolls to a new listing 226m (e.g., by elementally scrolling downwardly from an original listing 226l), the user interface may enhance itself haptically by transmitting via output 250 a third haptic signal 253 that is in some way related to new listing 226m (e.g., as shown in the update from user interface 222E of FIG. 2E to user interface 222F of FIG. 2F). Therefore, according to one embodiment, when interface 222 is updated to highlight listing 226m, third haptic signal 253 may be miscellaneous signal <MISC_m> (i.e., miscellaneous metadata 357 associated with library entry 326m).

The situations in which user interface 222 may provide haptic or tactile enhancement via output component 250, may be determined by a user of device 200 or the manufacturer of device 200. For example, a user may wish to be provided with haptic enhancement only when he or she is quick-scrolling. Alternatively, a user may wish to be provided with haptic enhancement whenever he or she scrolls to a listing that is an initial listing in a sublist of the list of listings. These preferences may be fully customizable and may be stored locally on the device (e.g., memory 104 of FIG. 1), for example.

There are various other ways in which descriptive entry listings may be provided on a user interface to allow a user to scroll through library 300 of song entries 326 than as shown in FIGS. 2A-2F. For example, FIGS. 4A-4F illustrate various other ways in which a user interface may provide descriptive entry listings when a user is accessing library 300 in accordance with various embodiments of the invention.

As shown in FIGS. 4A and 4B, user interface 422 of device 400 can present a set of five (5) descriptive entry listings 426, each of which may be associated with a particular entry 326 of library 300, similarly to user interface 222 of FIGS. 2A and 2B. However, as shown in FIGS. 4A and 4B, each one of descriptive entry listings 426a-426f may include not only song title metadata 351, but also song artist metadata 353 and cover art metadata 355 for each of respective song entries 326a-326f (e.g. song title metadata 351 "ADVENTURE", song artist metadata 353 "ARTIST_c", and cover art metadata 355 <ART_c> for listing 2 426c of FIGS. 4A and 4B).

Moreover, user interface 422 of device 400 may also include a highlighter or selector indicator 428 that can differentiate one or more specific descriptive entry listings 426 from the other listings 426 displayed on output component 420 at any given time (e.g., listing 426c in user interface 422A of FIG. 4A). Indicator 428 may help to identify the listing that can be selected by the user using input component 410, similarly to indicator 228 of FIG. 2A. However, as shown in FIGS. 4A and 4B, indicator 428 may be a highlighted border about the listing to be differentiated.

Device 400 may include an input component 410 with which a user may interact to send various types of input signals to the user interface, similarly to input component 210 of FIGS. 2A and 2B. However, as shown in FIGS. 4A and 4B, input component 410 may be a set of buttons including upward button 414U, downward button 414D, and selector button 412. A user may interact with input component 410 to send various types of input signals to the user interface of device 400. In one embodiment, if the user desires to select the library entry associated with the descriptive entry listing 426 distinguished by indicator 428 of the user interface 422 on output component 420, he or she may click on selector button 412. However, if the user desires to select a descriptive entry listing 426 other than the one distinguished by indicator 428, he or she may provide a user input by pressing upward button 414U or downward button 414D to scroll through the listings, for example. One or more attributes of a user's interaction with buttons 414U and 414D may be monitored with respect to one or more thresholds to vary the way in which user interface 422 scrolls through listings 426 (e.g., the frequency of button presses within a certain period of time or the duration of a button push).

As shown in FIGS. 4C and 4D, for example, a user interface 422' of a device 400' can present a set of five (5) descriptive entry listings 426', each of which may be associated with a particular entry 326 of library 300, similarly to user interface 222 of FIGS. 2C and 2D. However, as shown in FIGS. 4C and 4D, user interface 422' may provide on output component 420' not only the set of listings 426' and a status portion 424', but also a visual enhancement portion 429'.

Visual enhancement portion 429' may include one or more visual enhancers 430l. Each of the one or more visual enhancers 430' may be any additional information, such as an icon or image or string of one or more alphanumerical characters, that is descriptive of or related to at least one characteristic of a listing 426' or its sublist. For example, as shown in FIGS. 4C and 4D, visual enhancement portion 429' may include a vertical list of visual enhancers 430' running parallel to the set of listings 426' on output component 420' of user interface 422'. This list may include a top visual enhancer 430_1', a middle visual enhancer 430_2', and a bottom visual enhancer 430_3'.

Middle visual enhancer 430_2' may be any additional information that is descriptive of or related to at least one characteristic of the highlighted listing or the sublist containing that highlighted listing (e.g., listing 426h' of FIG. 4C and listing 426k' of FIG. 4D, as highlighted by indicator 428'). For example, as shown in FIG. 4C, middle visual enhancer 430_2' may be a block of textual information within visual enhancement portion 429' of user interface 422C'. Middle visual enhancer 430_2' may include a string of one or more alphanumeric characters representative of the characteristic of the piece of metadata that is the basis for the differentiation between sublists in the list of listings 426' (e.g., the first alphanumeric character of the song title metadata 351, which is "B" for the sublist containing highlighted listing 426h' of user interface 422C'), as shown in FIG. 4C, for example.

In one embodiment, top visual enhancer 430_1' may be any additional information that is descriptive of or related to at least one characteristic of the sublist upwardly consecutive from the sublist containing the highlighted listing. For example, as shown in FIG. 4C, top visual enhancer 430_1' may include a string of one or more alphanumeric characters representative of the characteristic of the piece of metadata that is the basis for the differentiation between sublists in the list of listings 426' (e.g., the first alphanumeric character of the song title metadata 351, which is "A" for the sublist upwardly consecutive from the sublist containing highlighted listing 426h' of user interface 422C'). Similarly, bottom visual enhancer 430_3' may be any additional information that is descriptive of or related to at least one characteristic of the sublist downwardly consecutive from the sublist containing the highlighted listing. For example, as shown in FIG. 4D, bottom visual enhancer 430_3' may include a string of one or more alphanumeric characters representative of the characteristic of the piece of metadata that is the basis for the differentiation between sublists in the list of listings 426' (e.g., the first alphanumeric character of the song title metadata 351, which is "D" for the sublist downwardly consecutive from the sublist containing highlighted listing 426k' of user interface 422D'). In one embodiment, the visual enhancer 430' that is associated with the listing 426' highlighted by indicator 428' may also be highlighted by its own indicator. For example, as shown in FIGS. 4C and 4D, middle visual enhancer 430_2' may be highlighted by an indicator 438' such that it is differentiated from top visual enhancer 430_1' and bottom visual enhancer 430_3'.

Device 400' may include an input component 410' with which a user may interact to send various types of input signals to the user interface, similarly to input component 210 of FIGS. 2A and 2B. However, as shown in FIGS. 4C and 4D, input component 410' may be combined with output component 420' to be a touch screen display that can provide textual and graphic information to the user as well as accept input instructions from the user.

In one embodiment, if the user desires to select the library entry associated with any of the descriptive entry listings 426' of user interface 422' displayed on output component 420', he or she may simply tap that portion of the interface 422'. However, if the user desires to select a descriptive entry listing 426' other than the ones currently displayed on output component 420', he or she may impart either an upward flicking motion on the display in the direction of arrow FU (e.g., for scrolling from the listings of user interface 422C' of FIG. 4C to the listings of user interface 422D' of FIG. 4D) or a downward flicking motion on the display in the direction of arrow FD (e.g., for scrolling from the listings of user interface 422D' of FIG. 4D to the listings of user interface 422C' of FIG. 4C). One or more attributes of a user's interaction with interface 422' for sending input signals (e.g., flicking motions on the display in the direction of arrows FU or FD) may be monitored with respect to one or more thresholds to vary the way in which user interface 422' scrolls through listings 426' (e.g., the frequency of flicking motions within a certain period of time or the duration of a flicking motion).

FIGS. 4E and 4F illustrate yet another example of the various ways in which descriptive entry listings may be provided on a user interface to allow a user to scroll through library 300 of song entries 326. A user interface 422" of a device 400" can present a status portion 424" and a set of five (5) descriptive entry listings 426", each of which may be associated with a particular entry 326 of library 300, similarly to user interface 222 of FIGS. 2E and 2F. However, as shown in FIGS. 4E and 4F, user interface 422" may provide each one of descriptive entry listings 426*j*"-426*o*" to include cover art metadata 355 and may display listings 426" in an apparently three-dimensional environment on output component 420". For example, in one embodiment, listings 426" may be provided in a horizontal array such that an innermost listing in the array is facing the user and is partially superimposed over other listings extending away from the innermost listing.

As shown in FIG. 4E, innermost listing 426*l*" may include image <ART_l> (i.e., the piece of cover art metadata 355 associated with library entry 326l) as well as the title metadata 351 (i.e., "CLAM BAKE") and the artist metadata 353 (i.e., "ARTIST_l") associated with library entry 326l. However, each of the other listings 426" of user interface 422E" of FIG. 4E may only include the cover art metadata 355 image file of its associated library entry 326.

Moreover, user interface 422' of device 400"' may not include a highlighter or selector indicator, such as indicator 228 of FIGS. 2A-2F. Instead, the placement or orientation of a particular listing 426" as the innermost listing of the horizontal array of listings on output component 420" may be enough to adequately differentiate that listing from the others. Alternatively or additionally, the inclusion of the title metadata 351 and/or artist metadata 353 along with the cover art metadata 355 for a single particular listing 426" in the three-dimensional array of listings may be enough to adequately differentiate that listing from the others.

Device 400" may include an input component 410" with which a user may interact in order to send various types of input signals to the user interface, similarly to input component 210 of FIGS. 2E and 2F. However, as shown in FIGS. 4E and 4F, input component 410" may be a rectangular trackpad. A user may interact with trackpad 410" to send various types of input signals to user interface 422" of device 400". In one embodiment, if the user desires to select the library entry associated with the innermost descriptive entry listing 426" of the horizontal array on output component 420", he or she may tap on the middle 412" of the trackpad, for example. However, if the user desires to select a descriptive entry listing 426" other than the innermost listing currently displayed by user interface 422", he or she may impart a leftward user movement along the track pad in the direction of arrow SL (e.g., for scrolling from the listings of user interface 422E" of FIG. 4E to the listings of user interface 422F" of FIG. 4F) or a rightward user movement along the track pad in the direction of arrow SR (e.g., for scrolling from the listings of user interface 422F" of FIG. 4F to the listings of user interface 422E" of FIG. 4E).

FIGS. 5A-5F show an electronic device 500, which may be similar to device 200 of FIGS. 2A-2F, that has a user interface for selectively scrolling through information in accordance with an embodiment of the invention. Device 500 may be a self-contained media player with an I/O interface that may include an input component 510 and an output component 520. Device 500 may also include a housing 501 for at least partially surrounding input component 510 and output component 520. In one embodiment, as shown, input component 510 may be a rotational input device, such as a click wheel, and output component 520 may be a video display, each of which may be found on certain iPods™ available by Apple Inc. of Cupertino, Calif.

In accordance with one embodiment of the invention, device 500 can permit a user to load and browse through one or more large libraries of media or data. Each library may be stored in a memory component of the device (e.g., memory 104 of FIG. 1) or may be downloaded to device 500 from another device or server (e.g., via communications circuitry 108 of FIG. 1), for example. A library can contain a plurality of library entries and each library entry can include payload data and associated metadata.

FIG. 6, for example, illustrates a media library 600 in accordance with an embodiment of the invention. Library 600 may be somewhat similar to library 300 of FIG. 3, however, library 600 may be a library of pictures. Library 600 may contain a plurality of picture entries 626 (e.g., entries 626*a*-626*z*). Each library entry 626 may include payload data 640 (e.g., the actual full image of the picture) and associated metadata 650 (e.g., textual information and/or graphical information related to that picture). As shown, each library entry 626 of library 600 includes payload data 640. Payload data 640 for each entry 626 may be an image or picture file <PIC_> (e.g., as shown in FIG. 6, entry 626*a* may include an associated piece of payload data 640 that is picture file <PIC_a>). This file may be a JPEG file, a PNG file, or any other type of image file. All metadata 650 for each entry 626 is information associated with payload data 640 of that entry 626. Alternatively, the library may be a library of video files rather than image files.

For example, a particular piece of metadata 650 that may be associated with a picture file 640 of a particular picture entry 626 in library 600 is textual information metadata. Such textual information may be a string of one or more alphanumeric characters representative or descriptive of the picture (e.g., picture description metadata 651), the date and time at which the picture was captured (e.g., timestamp metadata 652), the name of the photo album to which the picture belongs (e.g., photo album metadata 654), or any other facet of the picture, such as a journal entry describing any events surrounding the picture, for example. As shown, picture description metadata 651 for each entry 626 may be a string of one or more alphanumeric characters representative or descriptive of the picture (e.g., as shown in FIG. 6, <PIC_a> of entry 626*a* may have an associated piece of picture description metadata 651 that is alphanumeric string "NAKED").

Similarly, timestamp metadata 652 for each entry 626 may be a string of one or more alphanumeric characters representative or descriptive of the date and time at which the picture was captured (e.g., as shown in FIG. 6, <PIC_a> of entry 626*a* may have an associated piece of timestamp metadata 652 that is alphanumeric string "2001-03-01 09:22:06"). Likewise, photo album metadata 654 for each entry 626 may be a string of one or more alphanumeric characters representative or descriptive of the picture's album (e.g., as shown in FIG. 6, <PIC_a> of entry 626*a* may have an associated piece of photo album metadata 654 that is alphanumeric string "ALBUM_1").

Another particular piece of metadata 650 that may be associated with an image file 640 of a particular picture entry 626 in library 600 is additional graphical information. Such graphical information may be a thumbnail (i.e., compressed) version of the image file (e.g., thumbnail metadata 655) or may be related to any other facet of the picture, such as a picture of the photographer, for example. As shown, thumbnail metadata 655 for each entry 626 may be a thumbnail of the picture (e.g., as shown in FIG. 6, <PIC_a> of entry 626a may have an associated piece of thumbnail metadata 655 that is image file <TN_a>). Alternatively, if payload data file 640 is a video file, thumbnail metadata 655 for each video entry 626 may be a thumbnail picture of a frame of the video.

Yet another particular piece of metadata 650 that may be associated with an image file 640 of a particular picture entry 626 in library 600 is audio information. Such audio information may be an audio file related to the associated payload image file 640, such as a recorded account of the events surrounding the picture (e.g., audio clip metadata 656). As shown, audio clip metadata 656 for each entry 626 may be an audio file related to the associated payload picture file 640 (e.g., as shown in FIG. 6, <PIC_a> of entry 626a may have an associated piece of audio clip metadata 656 that is audio file <CLIP_a>).

As described above with respect to song library 300 of FIG. 3, there are many other various types of metadata 650 that can be associated with a particular payload image file 640 of a particular picture entry 626 in library 600. For example, such a particular piece of metadata may include preference information (e.g., media viewing preferences), contact information (e.g., telephone numbers and email addresses), calendar information, or any other suitable type of information that a user or other entity may wish to associate with a particular payload image file of a particular picture entry in a library of pictures (e.g., miscellaneous metadata 657). As shown, miscellaneous metadata 657 for each entry 626 may be any type of file or alphanumeric string representative of any facet of the associated payload picture file 640 (e.g., as shown in FIG. 6, <PIC_a> of entry 626a may have an associated piece of miscellaneous metadata 657 that is miscellaneous <MISC_a>).

As mentioned, each library (e.g., library 600) or any particular portions of a library (e.g., thumbnail metadata 655) may be stored in any memory component of device 500 (e.g., memory 104 of FIG. 1) or may be downloaded to device 500 from any another device or server (e.g., via communications circuitry 108 of FIG. 1), for example. In one embodiment, most of library 600 may be stored locally on device 500 (e.g., in memory 104 of FIG. 1) but thumbnail metadata 655 for each entry 626 may be an image file (e.g., image file <TN_a>) stored on a separate server or device. When some portion of the library is stored locally on device 500 and other portions are stored on a separate server, the library portion on the device may store pointers (e.g., URLs) to the corresponding portions of the library stored on remote servers, for example.

According to an embodiment of the invention, device 500 may include a user interface that allows a user to quickly and easily alternate between two or more modes of scrolling through a list of library entries. For example, like electronic device 200 of FIGS. 2A-2F, the user interface of device 500 may quickly and easily switch between first and second scrolling modes in response to a particular type of user command generated by input component 510. This can improve the speed and ease with which a user may search for a particular entry within an extensive library of entries.

Figure 5B:
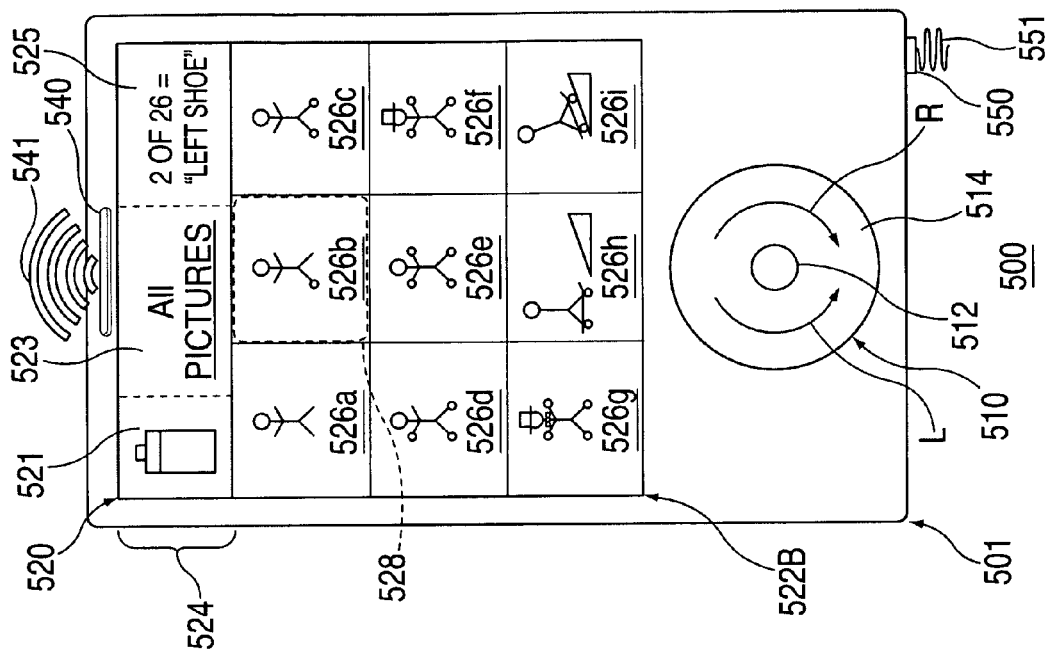
Figure 5A:
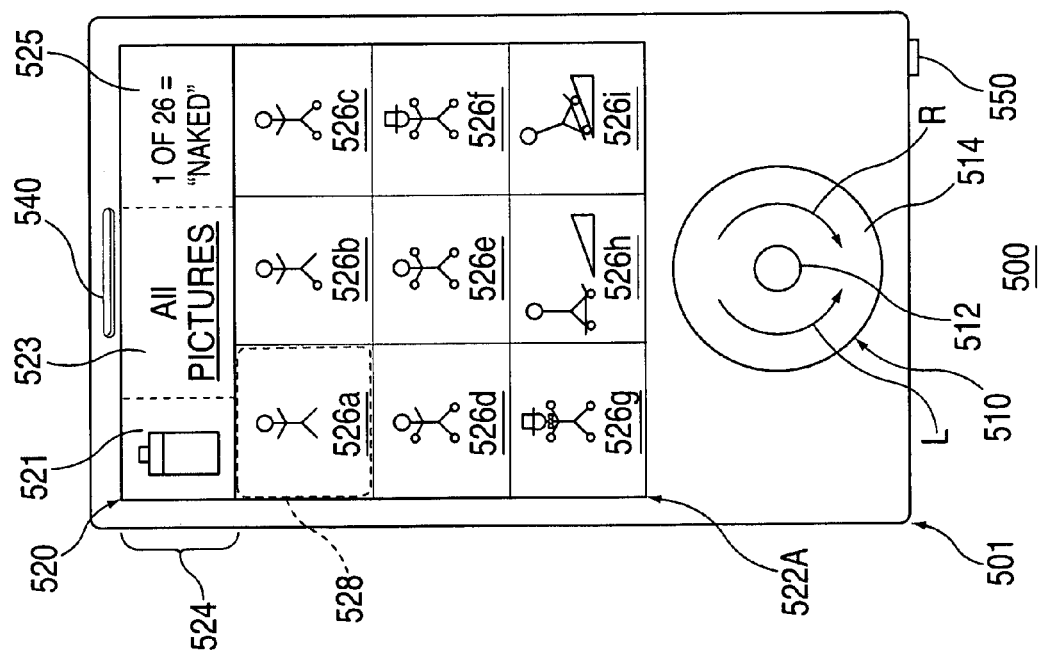
Figure 5F:
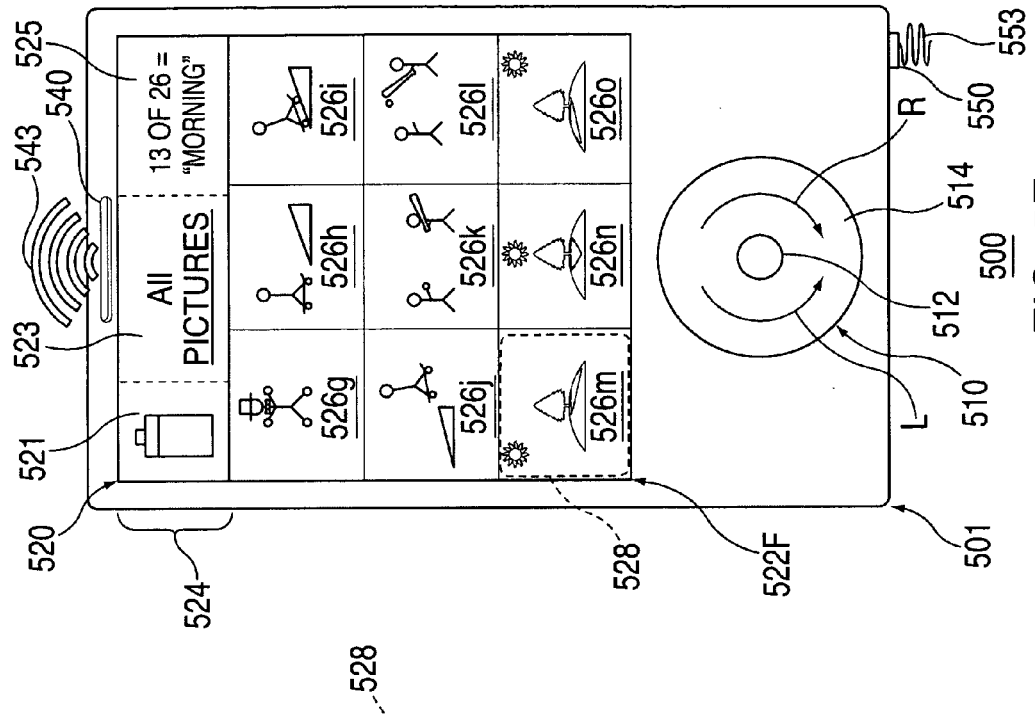

FIGS. 5A-5F illustrate a user interface 522 that may be displayed on output component 520 when a user is accessing library 600 of picture entries 626 in accordance with an embodiment of the invention. A user interface can present the library of entries to the user as a grid of descriptive entry listings, each of which may be associated with a particular entry of the library being accessed. For example, as shown in FIG. 5A, user interface 522A can present a set of nine (9) descriptive entry listings 526 (e.g., entry listings 526a-526i). Each particular listing 526 may be associated with a particular picture entry 626 of library 600 and can include at least a portion of at least one piece of metadata associated with that particular library entry.

As shown in FIG. 5A, for example, each particular listing 526 may include at least a portion of at least one piece of metadata 650 associated with the particular library entry 626 being presented by that listing 526. Particularly, in the embodiment of FIG. 5A, each one of descriptive entry listings 526a-526i may display the condensed image file of thumbnail metadata 655 for each of respective picture entries 626a-626i. Therefore, the condensed thumbnail image representative of the payload data picture file 640 associated with each of entries 626a-626i to be displayed by user interface 522A is included in a respective one of descriptive entry listings 526a-526i.

User interface 522 may also include a highlighter or selector indicator 528 that can differentiate one or more specific descriptive entry listings 526 from the other listings 526 displayed on output component 520 at any given time (e.g., listing 526a in user interface 522A of FIG. 5A). Indicator 528 may help to identify the listing that can be selected by the user using input component 510. Indicator 528 may be a thick border, as shown, or it may simply be an icon (see, e.g., indicator 228 of FIG. 2A).

User interface 522 may also include a status portion 524 that can describe the status of device 500. For example, as show in FIG. 5A, status portion 524 of user interface 522A can include a battery status indicator portion 521 that may present information indicative of the charge of the battery powering device 500 (e.g., power supply 106 of FIG. 1). Status portion 524 of user interface 522A can also include a library status indicator 523 that may be descriptive of the specific library being accessed by the user (e.g., "All Pictures" when all the picture entries 626 of library 600 are being accessed). Moreover, status portion 524 of user interface 522A can include a scrolling status indicator 525 that may be descriptive of the specific library entry being highlighted relative to the entire library being accessed (e.g., "1 of 26="NAKED"" when listing 526a associated with first entry 626a of twenty-six (26) entries 626a-626z entitled "NAKED" is being highlighted, as shown in FIG. 5A). Various other types of information may be provided by status portion 524 of user interface 522 according to the invention.

As described above with respect to rotational input component 210 of FIGS. 2A-2F, rotational input component 510 may include a selector 512 surrounded by a curved track 514, as shown in FIG. 5A, for example. A user may interact with input component 510 to send various types of input signals to the user interface of device 500. For example, a user may interact with input component 510 by gesturing in a rotational manner along curved track 514, either in the direction of arrow L or in the direction of arrow R, or by clicking on selector 512. In one embodiment, if the user desires to select the library entry associated with the descriptive entry listing 526 distinguished by indicator 528 of the user interface 522 on output component 520, he or she may click on selector 512. However, if the user desires to select a descriptive entry listing 526 other than the one distinguished by indicator 528, he or she may gesture in a rotational manner along curved track 514 to scroll through the listings, for example.

FIGS. 5A-5F illustrate how user interface 522 of device 500 can allow a user to scroll through listings 526 such that new listings may be distinguished by indicator 528 on display 520. As a user indicates the desire to browse or scroll through the displayed listings 526 of a particular library (e.g., library 600), device 500 can update the user interface 522 on output component 520 by displaying one or more new listings 526.

For example, a user may gesture or impart a movement in the direction of arrow R along track 514 in such a way that user interface 522 scrolls forward through one additional listing 526 in the grid of listings 526. For example, user interface 522 may monitor an attribute of the user movement and update user interface 522A of FIG. 5A on output component 520 such that indicator 528 highlights a new listing 526b of the interface, as shown in updated user interface 522B of FIG. 5B. As shown, in this example, this may not shift listings 526 with respect to display 520. Alternatively, a user may gesture in the direction of arrow L along track 514 in such a way that user interface 522 scrolls backward through one additional listing 526. For example, user interface 522 may monitor an attribute of the user movement and update user interface 522B of FIG. 5B on output component 520 such that indicator 528 highlights a new listing 526a of the interface, as shown in user interface 522A of FIG. 5A.

As well as handling various gesture types (e.g., user movement in the direction of arrows L and R), input component 510 may generate different instructions to the user interface of device 500 based on various attributes of a particular gesture type, similarly to device 200. The user interface may monitor at least a first attribute of a particular type of user movement received by the input component and thereby vary the way in which listings are scrolled. For example, user interface 522 may monitor an attribute of a user's movement on input component 510, such as the speed, length, or frequency of a user's movement in the direction of arrow R along track 514, and may vary the way in which listings 526 are scrolled with respect to indicator 528 based on that monitored attribute. In one embodiment, the listings 526 may be scrolled forwards or backwards one listing at a time (e.g., "elementally") when a monitored attribute of a user movement is below a certain threshold (e.g., the speed of the movement is below a certain velocity) and may be scrolled differently than one listing at a time when the monitored attribute of the user movement is above a certain threshold.

As described, a user may gesture in the direction of arrow R along track 514 in such a way that user interface 522 is updated with indicator 528 highlighting the forwardly consecutive listing 526 (e.g., as shown in the update of user interface 522 between interface 522A of FIG. 5A and interface 522B of FIG. 5B). This may occur, for example, if a monitored attribute of the user movement is below a certain threshold. Alternatively, the user may gesture in the direction of arrow R along track 514 in such a way that user interface 522 may be updated differently than with indicator 528 simply highlighting the forwardly consecutive listing 526 (e.g., as shown in the update of user interface 522 between interface 522B of FIG. 5B and interface 522C of FIG. 5C). This may occur, for example, if a monitored attribute of the user movement is above a certain threshold.

There are various ways in which a user interface may scroll through a list of listings other than one listing at a time. For example, rather than simply scrolling from an original listing to a new listing that is consecutive with the original listing in the list, the list may be broken down into several sublists and a user interface may scroll from an original listing in a first sublist of the list to a new listing that is either the initial listing in the first sublist or the initial listing in a sublist that is consecutive with the first sublist in the list.

In one embodiment, as shown in FIGS. 5A-6, for example, user interface 522 may provide a list of listings 526 on output component 520. This list of listings 526 may include a plurality of sublists of listings 526, as described in more detail below. Moreover, as described above, each one of listings 526 in the list of listings may be associated with an entry 626 in library 600, and each entry 626 in library 600 may include at least a first piece of metadata 650, such as photo album title metadata 654.

Each listing 526 in the list of listings on user interface 522 may be included in one of the plurality of sublists of listings 526 based on a first characteristic of this first piece of metadata. For example, each listing 526 in the list of listings on user interface 522 may be included in one of a plurality of sublists of listings 526 based on a first characteristic of the photo album title metadata 654 associated with that listing. Photo album title metadata 654 may be a string of one or more alphanumeric characters (e.g., "ALBUM_1" or "ALBUM_2" or "ALBUM_3" or "ALBUM_4"). Therefore, each listing 526 in the list of listings on user interface 522 may be included in one of a plurality of sublists of listings 526 based on a first characteristic of the alphanumeric string, such as the entire string itself. As may be seen in FIG. 5A in conjunction with library 600 of FIG. 6, each one of the first seven (7) listings 526 displayed in the grid of interface 522A (e.g., listings 526a-526g) may therefore be considered to be in a first sublist of the plurality of sublists in the list of listings 526 on user interface 522. This is because the entire alphanumeric string of the photo album title metadata 654 for each of those listings 526a-526g is an "ALBUM_1". Similarly, as may be seen in FIG. 5C in conjunction with library 600 of FIG. 6, each one of the fifth, sixth, and seventh listings 526 displayed in the grid of interface 522C (e.g., listings 526h-526j) may therefore be considered to be in a second sublist of the plurality of sublists in the list of listings 526 on user interface 522. This is because the entire alphanumeric string of the photo album title metadata 654 for each of those listings 526h-526j is an "ALBUM_2".

The listings 526 in each one of the plurality of sublists may be ordered within that sublist based on a first characteristic of a second piece of metadata. For example, each one of listings 526a-526g in the first sublist on user interface 522 may be ordered within that sublist based on a first characteristic of timestamp metadata 652. Timestamp metadata 652 may be a string of one or more alphanumeric characters. Therefore, each one of listings 526a-526g in the first sublist on user interface 522 may be ordered within that sublist based on a first characteristic of the alphanumeric string, such as the alphanumerical order of the string. For example, each one of listings 526a-526g in the first sublist on user interface 522 may therefore be ordered within that sublist as shown in FIG. 5A because the alphanumeric string of timestamp metadata 652 associated with listing 526a (i.e., "2001-03-01 09:22:06") alphanumerically precedes the alphanumeric string of timestamp metadata 652 associated with listing 526b (i.e., "2001-03-01 09:22:45"), and so on with respect to each of listings 526a-526g. Similarly, each one of listings 526h-526j in the second sublist on user interface 522 may therefore be ordered within that sublist as shown in FIG. 5C because the alphanumeric string of timestamp metadata 652 associated with listing 526h (i.e., "2002-04-20 12:12:03") alphanumerically precedes the alphanumeric string of timestamp metadata 652 associated with listing 526i (i.e., "2002-04-20 12:12:06"), which alphanumerically precedes the alphanumeric string of timestamp metadata 652 associated with listing 526j (i.e., "2002-04-20 12:12:09").

Finally, the plurality of sublists of listings 526 may be ordered within the list of listings 526 provided by user interface 522 based on the first characteristic of the first piece of metadata. For example, the first sublist containing listings 526a-526g and the second sublist containing listings 526h-526j may be ordered within the list of listings 526 provided by user interface 522 based on the first characteristic of the first piece of metadata (e.g., based on the alphanumerical order of the entire alphanumeric string of the photo album title metadata 654). For example, the first sublist containing listings 526a-526g and the second sublist containing listings 526h-526j may be ordered within the list of listings 526 provided by user interface 522 as shown in FIGS. 5A-5C because the entire alphanumeric string "ALBUM_1" of the photo album title metadata 654 associated with the first sublist alphanumerically precedes the entire alphanumeric string "ALBUM_2" of the photo album title metadata 654 associated with the second sublist. Similarly, the second sublist containing listings 526h-526j and a third sublist containing listings 526k-526l may be ordered within the list of listings 526 provided by user interface 522 as shown in FIG. 5C because the entire alphanumeric string "ALBUM_2" of the photo album title metadata 654 associated with the second sublist alphanumerically precedes the entire alphanumeric string "ALBUM_3" of the photo album title metadata 654 associated with the third sublist.

A list of listings, such as listings 526 of FIGS. 5A-6, may be scrolled by a user interface in various ways. In one embodiment, user interface 522 may simply scroll from an original listing to a new listing that is consecutive with the original listing in the gridded list, regardless of the original listing's sublist (i.e., "elementally-scroll"). For example, as described above, user interface 522 may simply scroll forwardly from an original listing 526a in user interface 522A of FIG. 5A to a new listing 526b that is forwardly consecutive with original listing 526a in the gridded list, as shown in user interface 522B of FIG. 5B. User interface 522 may provide this forward "elemental-scrolling" from original listing 526a to forwardly consecutive new listing 526b by monitoring an attribute of a user movement in the direction of arrow R along track 514 that is below a certain threshold, for example. Likewise, as described above, user interface 522 may simply scroll backwardly from an original listing 526b in user interface 522B of FIG. 5B to a new listing 526a that is backwardly consecutive with original listing 526a in the gridded list, as shown in user interface 522A of FIG. 5A. User interface 522 may provide this backward "elemental-scrolling" from original listing 526b to backwardly consecutive new listing 526a by monitoring an attribute of a user movement in the direction of arrow L along track 514 that is below a certain threshold, for example.

Alternatively, user interface 522 may scroll from an original listing in a first sublist of the list to a new listing that is either (1) the initial listing in a second sublist that is consecutive with the first sublist in the list or (2) the initial listing in the first sublist (i.e., "quickly-scroll"). For example, user interface 522 may scroll forwardly from an original listing 526b in a first sublist containing listings 526a-526g, as shown in user interface 522B of FIG. 5B, to a new listing 526h that is the initial listing in a second sublist (e.g., the initial listing in the sublist containing listings 526h-526j), which is forwardly consecutive with the first sublist in the list, as shown in user interface 522C of FIG. 5C. User interface 522 may provide this forward "quick-scrolling" from original listing 526b to new listing 526h by monitoring an attribute of a user movement in the direction of arrow [[L]] R along track 514 that is above a certain threshold, for example.

Figure 5E:
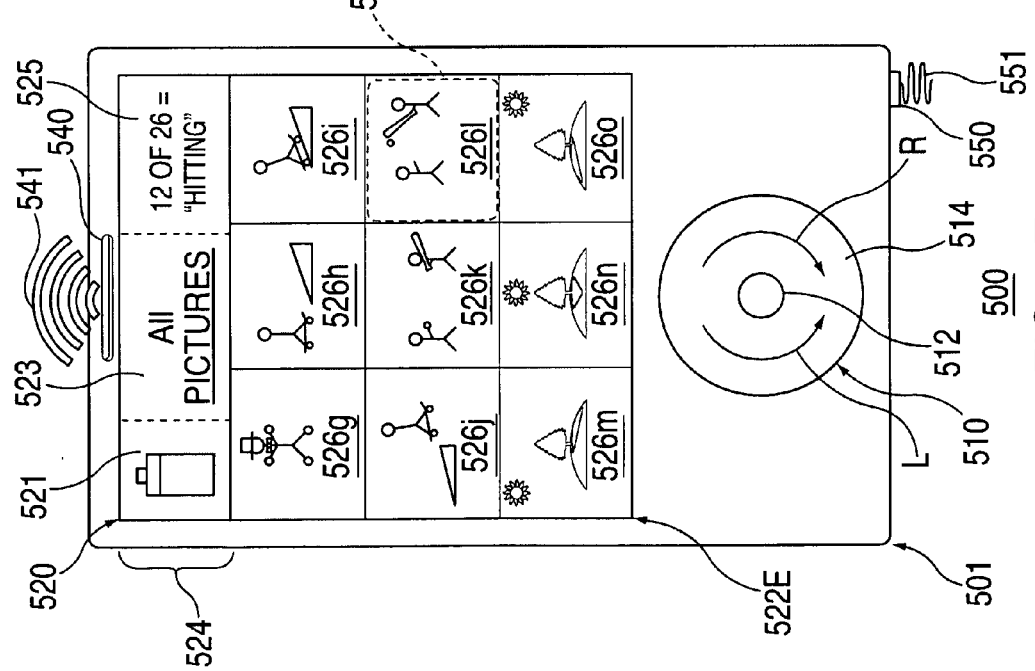

Somewhat likewise, user interface 522 may scroll backwardly from an original listing 526l in a first sublist containing listings 526k and 526l, as shown in user interface 522E of FIG. 5E, to a new listing 526k that is the initial listing in the first sublist, as shown in user interface 522D of FIG. 5D. User interface 522 may provide this backward "quick-scrolling" from original listing 526l to new listing 526k by monitoring an attribute of a user movement in the direction of arrow L along track 514 that is above a certain threshold, for example. Although it is to be noted that user interface 522 may also provide this backward scrolling from original listing 526l to new listing 526k through "elemental-scrolling," by monitoring an attribute of a user movement in the direction of arrow L along track 514 that is below a certain threshold, for example, because listings 526k and 526l are the only two listings in their sublist. User interface 522 of the invention may provide quick-scrolling or any other mode of scrolling independently of any sublists that may categorize certain listings of a list of listings being accessed by a user. For example, a first mode of scrolling may be "elemental" in that it scrolls from one listing to a new consecutive listing, while a second mode of scrolling may jump to a new listing that is ten (10) listings removed from the original listing.

These thresholds of various attributes of various user movements that may be monitored by user interface 522 to determine whether to "elementally-scroll" or "quickly-scroll" through the listings 526 provided on output component 520 may be determined by a user of device 500 or the manufacturer of device 500. For example, a user may select a threshold based on how many entries are in the library through which he or she wishes to scroll. Alternatively, a user may select a threshold based on his or her dexterity using the input component. These thresholds may be stored locally on the device (e.g., memory 104 of FIG. 1), for example.

Therefore, according to an embodiment of the invention, user interface 522 of device 500 may quickly and easily switch between a first "elemental-scrolling" mode and a second "quick-scrolling" mode for updating the displayed portion of a list of descriptive entry listings 526 on output component 520 in response to a particular type of user movement of input component 510. This can improve the speed and ease with which a user may search for a particular entry within an extensive library of entries.

In addition to changing the way in which descriptive entry listings 526 are scrolled on output component 520 in response to a particular type of user movement of input component 510, user interface 522 may also change the type of information transmitted to the user in response to a particular type of user movement of input component 510, similarly to user interface 222 of FIGS. 2A-2F. For example, when user interface 522 quick-scrolls forwardly from an original listing 526b in a first sublist to a new listing 526h that is the initial listing in a forwardly consecutive second sublist, user interface 522 may also enhance itself by providing a visual enhancer 530 along with the updated set of listings 526 (e.g., as shown in the update from user interface 522B of FIG. 5B to user interface 522C of FIG. 5C).

Visual enhancer 530 may be any additional information, such as an icon or image or string of one or more alphanumerical characters, that is descriptive of or related to at least one characteristic of the new listing or the second sublist (i.e., the sublist that contains the new listing). For example, as shown in FIG. 5C, visual enhancer 530 may be a block of textual information superimposed over the rest of user interface 522C so that it may be easily seen by the user. Visual enhancer 530 may include a string of one or more alphanumerical characters representative of the characteristic of the piece of metadata that is the basis for the differentiation between sublists in the list of listings 526 (e.g., the entire alphanumeric string of the photo album title metadata 654, which is "ALBUM_2" for the sublist containing new listing 526h), as shown in FIG. 5C, for example. Additionally, visual enhancer 530 may include additional information descriptive of or related to at least one other characteristic of the new listing or the second sublist. As shown in FIG. 5C, for example, visual enhancer 530 may also include description of how many listings are in the second sublist (e.g., "(3 Pictures)").

In one embodiment, user interface 522 may continuously show visual enhancer 530 as long as the user interface continues to quick-scroll through the listings. For example, if user interface 522 continues to quick-scroll forwardly from listing 526h in a first sublist to a new listing 526k that is the initial listing in a forwardly consecutive second sublist, as shown in the update from user interface 522C of FIG. 5C to user interface 522D of FIG. 5D, user interface 522 may continue to provide visual enhancer 530 along with the updated set of listings 526 and indicator 528. However, the information within visual enhancer 530 may be changed to reflect the new sublist containing the new listing (e.g., "ALBUM_3" for the sublist containing new listing 526k).

When user interface 522 terminates quick-scrolling and begins elemental-scrolling, for example, visual enhancer 530 may also be terminated. For example, if user interface 522 stops quick-scrolling but continues to update the listings 526 displayed on output component 520 by elementally-scrolling forwardly from listing 526k to downwardly consecutive listing 526l, as shown in the update from user interface 522D of FIG. 5D to user interface 522E of FIG. 5E, user interface 522 may stop providing visual enhancer 530. User interface 522 may continue to not provide visual enhancer 530 as the interface continues to elementally-scroll through the listings, as shown in the update from user interface 522E of FIG. 5E to user interface 522F of FIG. 5F.

It is to be noted, however, that in accordance with an embodiment of the invention, user interface 522 may provide visual enhancer 530 along with an updated set of listings 526 even when it is not quick-scrolling. For example, user interface 522 may once again provide visual enhancer 530 if the interface elementally-scrolls forwardly through the listings from listing 526l to listing 526k, as shown in the update from user interface 522E of FIG. 5E to user interface 522D of FIG. 5D.

The situations in which user interface may provide a visual enhancer, such as visual enhancer 530 of FIGS. 5C and 5D, may be determined by a user of device 500 or the manufacturer of device 500. For example, a user may wish to be provided with a visual enhancer only when he or she is quick-scrolling. Alternatively, a user may wish to be provided with a visual enhancer whenever he or she scrolls to a listing that is an initial listing in a sublist of the list of listings. These preferences may be fully customizable and may be stored locally on the device (e.g., memory 104 of FIG. 1), for example.

As an alternative or in addition to visually enhancing an updated set of listings 526 with a visual enhancer 530, user interface may enhance itself aurally. As shown in FIGS. 5A-5F, device 500 may also include an audio output component 540. Audio output component 540 may be any output component suitable for transmitting audible information to a user, such as a speaker, headphones, or the like. In addition to changing the way in which descriptive entry listings 526 are scrolled on output component 520 in response to a particular type of user movement of input component 510, user interface 522 may also change the type of audio information transmitted to the user via output component 540 in response to a particular type of user movement of input component 510 or to a particular change in a characteristic of the highlighted listing, as described above with respect to user interface 222 and audio output component 240 of FIGS. 2A-2F.

For example, when user interface 522 elementally-scrolls forwardly from an original listing 526a to forwardly consecutive listing 526b, user interface may enhance itself aurally by transmitting a first sound 541 via output component 540 while also updating the set of listings 526 on output component 520 (e.g., as shown in the update from user interface 522A of FIG. 5A to user interface 522B of FIG. 5B). On the other hand, when user interface 522 quick-scrolls forwardly from an original listing 526b to a new listing 526h that is the initial listing in a forwardly consecutive sublist, user interface 522 may enhance itself aurally by transmitting a second sound 542 via output component 540 while also updating the set of listings 526 on output component 530 (e.g., as shown in the update from user interface 522B of FIG. 5B to user interface 522C of FIG. 5C), for example.

First sound 541 and second sound 542 may each be a single tone or a much more complex sound, such as a song. In one embodiment, first sound 541 may be a single short clicking sound indicative of the short scrolling between consecutive listings 526a and 526b, while second sound 542 may be a longer clunking sound indicative of the quick-scrolling between listings 526b and 526h of different sublists. The same first sound 541 may be transmitted by user interface 522 every time it elementally-scrolls between two listings and the same second sound 542 may be transmitted by user interface 522 every time it quickly-scrolls between two listings. This may help a user to more quickly and more easily realize how he or she is scrolling through the listings.

For example, when user interface 522 continues to quick-scroll downwardly from an original listing 526h to a new listing 526k that is the initial listing in a downwardly consecutive sublist, user interface 522 may enhance itself aurally by once again transmitting second sound 542 via output component 540 while also updating the set of listings 526 on output component 520 (e.g., as shown in the update from user interface 522C of FIG. 5C to user interface 522D of FIG. 5D). Then, when user interface 522 begins to once again elementally-scroll forwardly, such as from an original listing 526k to forwardly consecutive listing 526l, the user interface may enhance itself aurally by once again transmitting the first sound 541 via output component 540 while also updating the set of listings 526 on output component 520 (e.g., as shown in the update from user interface 522D of FIG. 5D to user interface 522E of FIG. 5E).

However, there are various other ways in which user interface 522 can transmit different sounds via output component 540 for increasing the ease and speed with which a user may scroll through a list of listings 526. For example, in another embodiment, the sound transmitted by user interface 522 via output component 540 may be specifically associated with the listing being highlighted by indicator 528. For example, when user interface 522 scrolls to a new listing 526m (e.g., by elementally scrolling forwardly from an original listing 526l), the user interface may enhance itself aurally by transmitting via output 540 a third sound 543 that is in some way related to new listing 526m (e.g., as shown in the update from user interface 522E of FIG. 5E to user interface 522F of FIG. 5F). Therefore, according to one embodiment, when interface 522 is updated to highlight listing 526m, third sound 543 may be audio clip <CLIP_m> (i.e., audio clip metadata 656 associated with library entry 626m).

The situations in which user interface 522 may provide an aural enhancement via output component 540, may be determined by a user of device 500 or the manufacturer of device 500. For example, a user may wish to be provided with aural enhancement only when he or she is quick-scrolling. Alternatively, a user may wish to be provided with aural enhancement whenever he or she scrolls to a listing that is an initial listing in a sublist of the list of listings. These preferences may be fully customizable and may be stored locally on the device (e.g., memory 104 of FIG. 1), for example.

As an alternative or in addition to visually enhancing an updated set of listings 526 with a visual enhancer 530 and/or aurally enhancing an updated set of listings 526 with sounds via an audio output component 540, user interface 522 may enhance itself haptically or tactilely. As shown in FIGS. 5A-5F, device 500 may also include a haptic output component 550. Haptic output component 550 may be any output component suitable for transmitting haptic or tactile information to a user, such as a rumble pack, vibration generator, or the like. In addition to changing the way in which descriptive entry listings 526 are scrolled on output component 520 in response to a particular type of user movement of input component 510, user interface 522 may also change the type of haptic information transmitted to the user via output component 550 in response to a particular type of user movement of input component 510.

For example, when user interface 522 elementally-scrolls downwardly from an original listing 526a to forwardly consecutive listing 526b, user interface 522 may enhance itself haptically by transmitting a first haptic signal 551 via output component 550 while also updating the set of listings 526 on output component 520 (e.g., as shown in the update from user interface 522A of FIG. 5A to user interface 522B of FIG. 5B). On the other hand, when user interface 522 quick-scrolls downwardly from an original listing 526b to a new listing 526h that is the initial listing in a downwardly consecutive sublist, user interface 522 may enhance itself haptically by transmitting a second haptic signal 552 via output component 550 while also updating the set of listings 526 on output component 520 (e.g., as shown in the update from user interface 522B of FIG. 5B to user interface 522C of FIG. 5C), for example.

First haptic signal 551 and second haptic signal 552 may each be a single force or a much more complex motion, such as a steady beat. In one embodiment, first haptic signal 551 may provide a single short vibrating sensation to the user that is indicative of the short scrolling between consecutive listings 526a and 526b, while second haptic signal 552 may provide a longer and more powerful vibrating sensation to the user that is indicative of the quick-scrolling between listings 526b and 526h of different sublists. The same first haptic signal 551 may be transmitted by user interface 522 every time it elementally-scrolls between two listings and the same second haptic signal 552 may be transmitted by user interface 522 every time it quickly-scrolls between two listings. This may help a user to more quickly and more easily realize how he or she is scrolling through the listings.

For example, when user interface 522 continues to quick-scroll downwardly from an original listing 526h to a new listing 526k that is the initial listing in a forwardly consecutive sublist, user interface 522 may enhance itself haptically by once again transmitting second haptic signal 552 via output component 550 while also updating the set of listings 526 on output component 520 (e.g., as shown in the update from user interface 522C of FIG. 5C to user interface 522D of FIG. 5D). Then, when user interface 522 begins to once again elementally-scroll downwardly, such as from an original listing 526k to forwardly consecutive listing 526l, the user interface may enhance itself haptically by once again transmitting the first haptic signal 551 via output component 550 while also updating the set of listings 526 on output component 520 (e.g., as shown in the update from user interface 522D of FIG. 5D to user interface 522E of FIG. 5E).

However, there are various other ways in which user interface 522 can transmit different haptic signals via output component 550 for increasing the ease and speed with which a user may scroll through a list of listings 526. For example, in another embodiment, the haptic signal transmitted by user interface 522 via output component 550 may be specifically associated with the listing being highlighted by indicator 528. For example, when user interface 522 scrolls to a new listing 526m (e.g., by elementally scrolling forwardly from an original listing 526l), the user interface may enhance itself haptically by transmitting via output 550 a third haptic signal 553 that is in some way related to new listing 526m (e.g., as shown in the update from user interface 522E of FIG. 5E to user interface 522F of FIG. 5F). Therefore, according to one embodiment, when interface 522 is updated to highlight listing 526m, third haptic signal 553 may be miscellaneous signal <MISC_m> (i.e., miscellaneous metadata 657 associated with library entry 626m).

The situations in which user interface 522 may provide haptic or tactile enhancement via output component 550, may be determined by a user of device 500 or the manufacturer of device 500. For example, a user may wish to be provided with haptic enhancement only when he or she is quick-scrolling. Alternatively, a user may wish to be provided with haptic enhancement whenever he or she scrolls to a listing that is an initial listing in a sublist of the list of listings. These preferences may be fully customizable and may be stored locally on the device (e.g., memory 104 of FIG. 1), for example.

FIGS. 7A-7F show an electronic device 700, which may be similar to device 500 of FIGS. 5A-5F, that has a user interface for selectively scrolling through information in accordance with an embodiment of the invention. Device 700 may be a self-contained media player with an I/O interface that may include an input component 710 and an output component 720. Device 700 may also include a housing 701 for at least partially surrounding input component 710 and output component 720. In one embodiment, as shown, input component 710 may be a rotational input device, such as a click wheel, and output component 720 may be a video display, each of which may be found on certain iPods™ available by Apple Inc. of Cupertino, Calif.

In accordance with one embodiment of the invention, device 700 can permit a user to load and browse through one or more large libraries of media or data. Each library may be stored in a memory component of the device (e.g., memory 104 of FIG. 1) or may be downloaded to device 700 from another device or server (e.g., via communications circuitry 108 of FIG. 1), for example. A library can contain a plurality of library entries and each library entry can include payload data and associated metadata.

FIG. 8, for example, illustrates a data library 800 in accordance with an embodiment of the invention. Library 800 may be somewhat similar to library 600 of FIG. 6, however, library 800 may be a library of geographical data. Library 800 may contain a plurality of geographical entries 826 (e.g., entries 826a-826z). Each library entry 826 may include geographical payload data 840 (e.g., the actual file containing specific data of interest for a particular geographical location) and associated metadata 850 (e.g., supplemental textual information and/or graphical information related to that geographical location). Payload data 840 for each entry 826 may be a geographical location file <GEO_> (e.g., as shown in FIG. 8, entry 826a may include an associated piece of payload data 840 that is geographic file <GEO_a>). This file may be any type of data file containing specific data of interest for a particular geographical location. All metadata 850 for each entry 826 is information associated with payload data 840 of that entry 826.

For example, a particular piece of metadata 850 that may be associated with a geographic file 840 of a particular geographic entry 826 in library 800 is textual information metadata. Such textual information may be a string of one or more alphanumeric characters representative or descriptive of the geographic location (e.g., geographic description metadata 851), the latitudinal and longitudinal coordinates of the geographic location (e.g., coordinate metadata 852), the local standard time of the geographic location (e.g., time zone metadata 854), or any other facet of the location, such as the name of the dominant language spoken in that location, for example. As shown, geographic description metadata 851 for each entry 826 may be a string of one or more alphanumeric characters representative or descriptive of the geographic location (e.g., as shown in FIG. 8, <GEO_a> of entry 826*a* may have an associated piece of geographic description metadata 851 that is alphanumeric string "VANCOUVER, BC (CAN)").

Similarly, coordinate metadata 852 for each entry 826 may be a string of one or more alphanumeric characters representative or descriptive of the latitudinal and longitudinal coordinates of the geographic location (e.g., as shown in FIG. 8, <GEO_a> of entry 826*a* may have an associated piece of coordinate metadata 852 that is alphanumeric string "49°15'"N 123°6'"W"). Likewise, time zone metadata 854 for each entry 826 may be a string of one or more alphanumeric characters representative or descriptive of the local standard time of the geographic location (e.g., as shown in FIG. 8, <GEO_a> of entry 826*a* may have an associated piece of time zone metadata 854 that is alphanumeric string "–08:00 GMT (PST)").

Another particular piece of metadata 850 that may be associated with a geographic location file 840 of a particular geographic entry 826 in library 800 is graphical information. Such graphical information may be a small image file (e.g., thumbnail metadata 855) related to any facet of the location, such as a picture of that location, for example. As shown, thumbnail metadata 855 for each entry 826 may be a thumbnail image file (e.g., as shown in FIG. 8, <GEO_a> of entry 826*a* may have an associated piece of thumbnail metadata 855 that is image file <TN_a>).

Yet another particular piece of metadata 850 that may be associated with a geographic location file 840 of a particular geographic entry 826 in library 800 is audio information. Such audio information may be an audio file related to the associated payload geographic location file 840, such as a recorded description of the location or a pronunciation of the location in its native tongue (e.g., audio clip metadata 856). As shown, audio clip metadata 856 for each entry 826 may be an audio file related to the associated payload geographic location file 840 (e.g., as shown in FIG. 8, <GEO_a> of entry 826*a* may have an associated piece of audio clip metadata 856 that is audio file <CLIP_a>).

As described above with respect to picture library 500 of FIG. 5, there are many other various types of metadata 850 that can be associated with a particular payload geographic location file 840 of a particular geographic entry 826 in library 800. For example, such a particular piece of metadata may include preference information (e.g., language viewing preferences), contact information (e.g., telephone-numbers and email addresses), calendar information, or any other suitable type of information that a user or other entity may wish to associate with a particular payload geographic location file of a particular geographic entry in a library of geographic entries (e.g., miscellaneous metadata 857). As shown, miscellaneous metadata 857 for each entry 826 may be any type of file or alphanumeric string representative of any facet of the associated payload geographic location file 840 (e.g., as shown in FIG. 8, <GEO_a> of entry 826*a* may have an associated piece of miscellaneous metadata 857 that is miscellaneous <MISC_a>).

As mentioned, each library (e.g., library 800) or any particular portions of a library (e.g., metadata 855) may be stored in any memory component of device 700 (e.g., memory 104 of FIG. 1) or may be downloaded to device 700 from any another device or server (e.g., via communications circuitry 108 of FIG. 1), for example. In one embodiment, most of library 800 may be stored locally on device 700 (e.g., in memory 104 of FIG. 1) but thumbnail metadata 855 for each entry 826 may be an image file (e.g., image file <TN_a>) stored on a separate server or device. When some portion of the library is stored locally on device 700 and other portions are stored on a separate server, the library portion on the device may store pointers (e.g., URLs) to the corresponding portions of the library stored on remote servers, for example.

According to an embodiment of the invention, device 700 may include a user interface that allows a user to quickly and easily alternate between two or more modes of scrolling through a list of library entries. For example, like electronic device 500 of FIGS. 5A-5F, the user interface of device 700 may quickly and easily switch between first and second scrolling modes in response to a particular type of user command generated by input component 710. This can improve the speed and ease with which a user may search for a particular entry within an extensive library of entries.

Figure 7B:
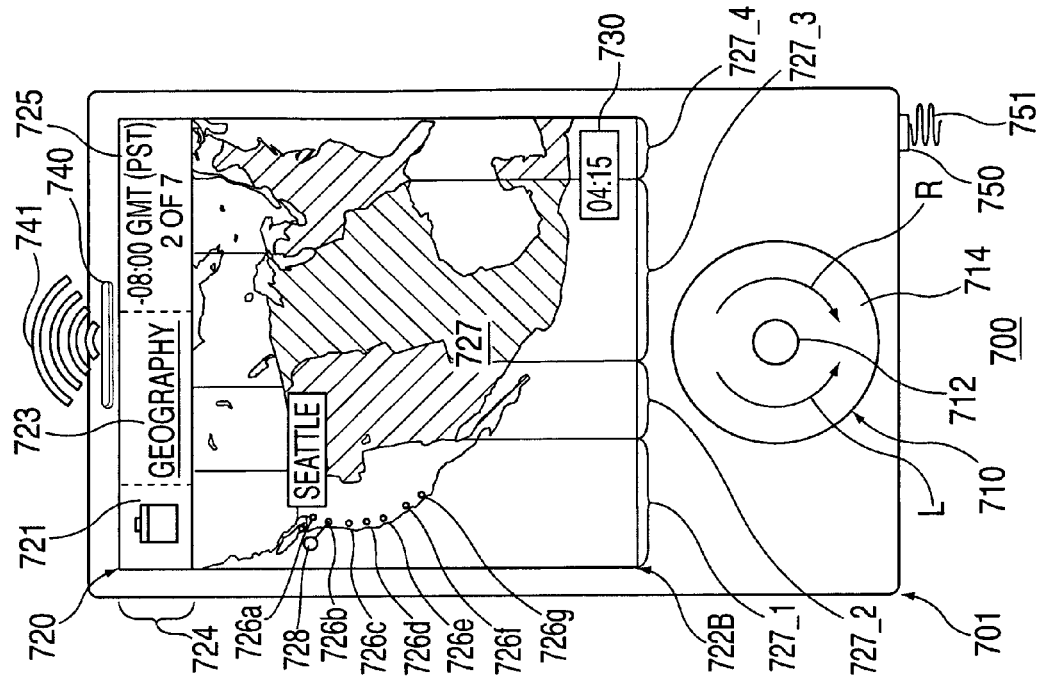
FIGS. 7A-7F show electronic devices with simplified interfaces at various stages according to some embodiments of the invention.
Figure 7A:
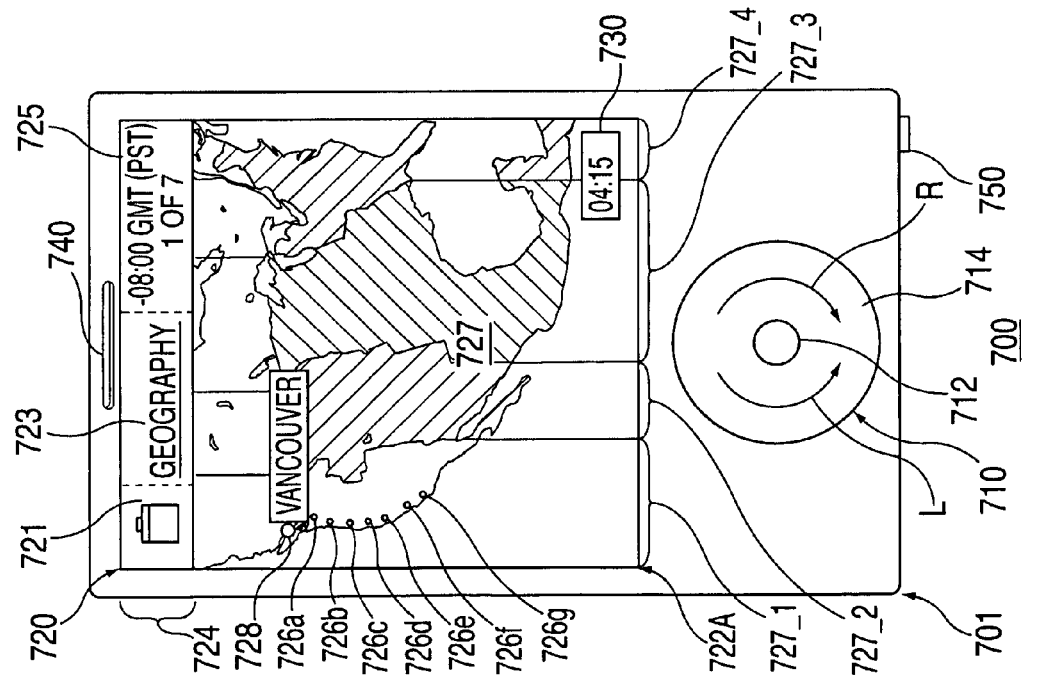

FIGS. 7A-7F illustrate a user interface 722 that may be displayed on output component 720 when a user is accessing library 800 of geographic entries 826 in accordance with an embodiment of the invention. A user interface can present the library of entries to the user as location-based map of descriptive entry listings, each of which may be associated with a particular entry of the library being accessed. For example, as shown in FIG. 7A, user interface 722A can present on output component 720 a map 727 of an area related to at least a portion of the geographic entries 826 of library 800. Moreover, user interface 722A can also present on output component 720 (e.g., superimposed on map 727) a set of seven (7) descriptive entry listings 726 (e.g., entry listings 726*a*-726*g*). Each particular listing 726 may be associated with a particular geographic entry 826 of library 800 and can include at least a portion of at least one piece of metadata associated with that particular library entry.

Particularly, in the embodiment of FIG. 7A, each one of descriptive entry listings 726*a*-726*g* may be displayed as a dot or any other symbol at an appropriate spot on map 727 as based on the latitudinal and longitudinal coordinates of coordinate metadata 852 associated with the listing's respective geographic entry 826. Therefore, the coordinate metadata 852 representative of the payload geographic file 840 associated with each of entries 826*a*-826*g* to be displayed by user interface 722A is determinative of the placement of descriptive entry listings 726*a*-726*g* on map 727, as shown in FIG. 7A.

User interface 722 may also include a highlighter or selector indicator 728 that can differentiate one or more specific descriptive entry listings 726 from the other listings 726 displayed on output component 720 at any given time (e.g., listing 726*a* in user interface 722A of FIG. 7A). Indicator 728 may help to identify the listing that can be selected by the user using input component 710. Indicator 728 may be a push pin or thumbtack icon, as shown, or it may any other differentiating technique (see, e.g., indicator 228 of FIG. 2A). Moreover, indicator 728 may also provide additional information related to the highlighted listing. For example, as shown in FIGS. 7A-7F, indicator 728 may display at least a portion of location description metadata 851 that is associated with the highlighted listing 726.

User interface 722 may also include a status portion 724 that can describe the status of device 700. For example, as show in FIG. 7A, status portion 724 of user interface 722A can include a battery status indicator portion 721 that may present information indicative of the charge of the battery powering device 700 (e.g., power supply 106 of FIG. 1). Status portion 724 of user interface 722A can also include a library status indicator 723 that may be descriptive of the specific library being accessed by the user (e.g., "Geography" when all the geographic entries 826 of library 800 are being accessed). Moreover, status portion 724 of user interface 722A can include a scrolling status indicator 725 that may be descriptive of the specific library entry being highlighted relative to the entire library being accessed or a portion thereof (e.g., "-08:00 GMT (PST) 1 of 7" when listing 726a associated with first entry 826a of seven (7) displayed entries 826a-826g time zone metadata 854 "-08:00 GMT (PST)", as shown in FIG. 7A). Various other types of information may be provided by status portion 724 of user interface 722 according to the invention.

As described above with respect to rotational input component 510 of FIGS. 5A-5F, rotational input component 710 may include a selector 712 surrounded by a curved track 714, as shown in FIG. 7A, for example. A user may interact with input component 710 to send various types of input signals to the user interface of device 700. For example, a user may interact with input component 710 by gesturing in a rotational manner along curved track 714, either in the direction of arrow L or in the direction of arrow R, or by clicking on selector 712. In one embodiment, if the user desires to select the library entry associated with the descriptive entry listing 726 distinguished by indicator 728 of the user interface 722 on output component 720, he or she may click on selector 712. However, if the user desires to select a descriptive entry listing 726 other than the one distinguished by indicator 728, he or she may gesture in a rotational manner along curved track 714 to scroll through the listings, for example.

FIGS. 7A-7F illustrate how user interface 722 of device 700 can allow a user to scroll through listings 726 such that new listings may be distinguished by indicator 728 on display 720. As a user indicates the desire to browse or scroll through listings 726 associated with a particular library (e.g., library 800), device 700 can update the user interface 722 on output component 720 by displaying one or more new listings 726.

For example, a user may gesture or impart a movement in the direction of arrow R along track 714 in such a way that user interface 722 scrolls downward through one additional listing 726 of the location-based map of listings 726. For example, user interface 722 may monitor an attribute of the user movement and update user interface 722A of FIG. 7A on output component 720 such that indicator 728 highlights a new listing 726b of the interface, as shown in updated user interface 722B of FIG. 7B. As shown, in this example, this may not shift or add new listings 726 with respect to display 720. Alternatively, a user may gesture in the direction of arrow L along track 714 in such a way that user interface 722 scrolls upward through one additional listing 726. For example, user interface 722 may monitor an attribute of the user movement and update user interface 722B of FIG. 7B on output component 720 such that indicator 728 highlights a new listing 726a of the interface, as shown in user interface 722A of FIG. 7A.

As well as handling various gesture types (e.g., user movement in the direction of arrows L and R), input component 710 may generate different instructions to the user interface of device 700 based on various attributes of a particular gesture type, similarly to device 500. The user interface may monitor at least a first attribute of a particular type of user movement received by the input component and thereby vary the way in which listings are scrolled. For example, user interface 722 may monitor an attribute of a user's movement on input component 710, such as the speed, length, or frequency of a user's movement in the direction of arrow R along track 714, and may vary the way in which listings 726 are scrolled with respect to indicator 728 based on that monitored attribute. In one embodiment, listings 726 may be scrolled downwards or upwards one listing at a time (e.g., "elementally") when a monitored attribute of a user movement is below a certain threshold (e.g., the speed of the movement is below a certain velocity) and may be scrolled differently than one listing at a time when the monitored attribute of the user movement is above a certain threshold.

As described, a user may gesture in the direction of arrow R along track 714 in such a way that user interface 722 is updated with indicator 728 highlighting the downwardly consecutive listing 726 (e.g., as shown in the update of user interface 722 between interface 722A of FIG. 7A and interface 722B of FIG. 7B). This may occur, for example, if a monitored attribute of the user movement is below a certain threshold. Alternatively, the user may gesture in the direction of arrow R along track 714 in such a way that user interface 722 may be updated differently than with indicator 728 simply highlighting the downwardly consecutive listing 726 (e.g., as shown in the update of user interface 722 between interface 722B of FIG. 7B and interface 722C of FIG. 7C). This may occur, for example, if a monitored attribute of the user movement is above a certain threshold.

There are various ways in which a user interface may scroll through a list of listings other than one listing at a time. For example, rather than simply scrolling from an original listing to a new listing that is consecutive with the original listing in the list, the list may be broken down into several sublists and a user interface may scroll from an original listing in a first sublist of the list to a new listing that is either the initial listing in the first sublist or the initial listing in a sublist that is consecutive with the first sublist in the list.

In one embodiment, as shown in FIGS. 7A-8, for example, user interface 722 may provide a list of listings 726 on output component 720. This list of listings 726 may include a plurality of sublists of listings 726, as described in more detail below. Moreover, as described above, each one of listings 726 in the list of listings may be associated with an entry 826 in library 800, and each entry 826 in library 800 may include at least a first piece of metadata 850, such as time zone metadata 854.

Each listing 726 in the list of listings on user interface 722 may be included in one of the plurality of sublists of listings 726 based on a first characteristic of this first piece of metadata. For example, each listing 726 in the list of listings on user interface 722 may be included in one of a plurality of sublists of listings 726 based on a first characteristic of the time zone metadata 854 associated with that listing. Time zone metadata 854 may be a string of one or more alphanumeric characters (e.g., "-08:00 GMT (PST)" or "-07:00 GMT (MST)" or "-06:00 GMT (CST)" or "-05:00 GMT (EST)"). Therefore, each listing 726 in the list of listings on user interface 722 may be included in one of a plurality of sublists of listings 726 based on a first characteristic of the alphanumeric string, such as the entire string itself. As may be seen in FIG. 7A in conjunction with library 800 of FIG. 8, each one of the seven (7) listings 726 displayed in the location-based map of interface 722A (e.g., listings 726a-726g) may therefore be considered to be in a first sublist of the plurality of sublists in the list of listings 726 on user interface 722. This is because the entire alphanumeric string of the time zone metadata 854 for each of those listings 726a-726g is "−08:00 GMT (PST)". Similarly, as may be seen in FIG. 7C in conjunction with library 800 of FIG. 8, each one of the three (3) listings 726 displayed in the location-based map of interface 722C (e.g., listings 726h-726j) may therefore be considered to be in a second sublist of the plurality of sublists in the list of listings 726 on user interface 722. This is because the entire alphanumeric string of the time zone metadata 854 for each of those listings 726h-726j is "−07:00 GMT (MST)".

Figure 7D:
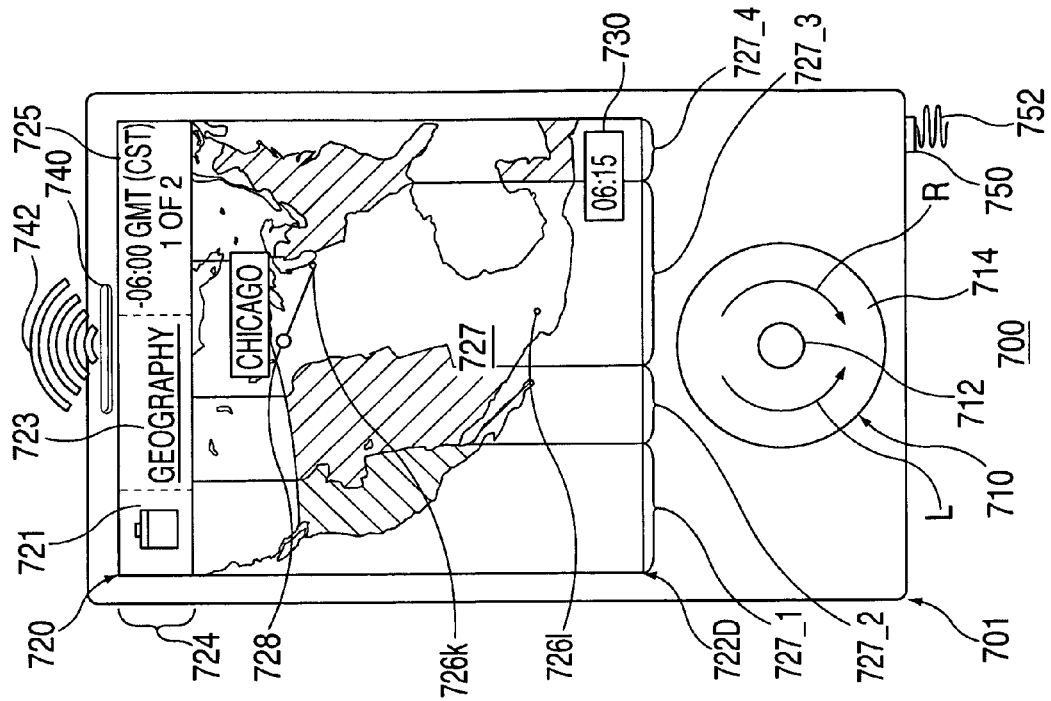
Figure 7C:
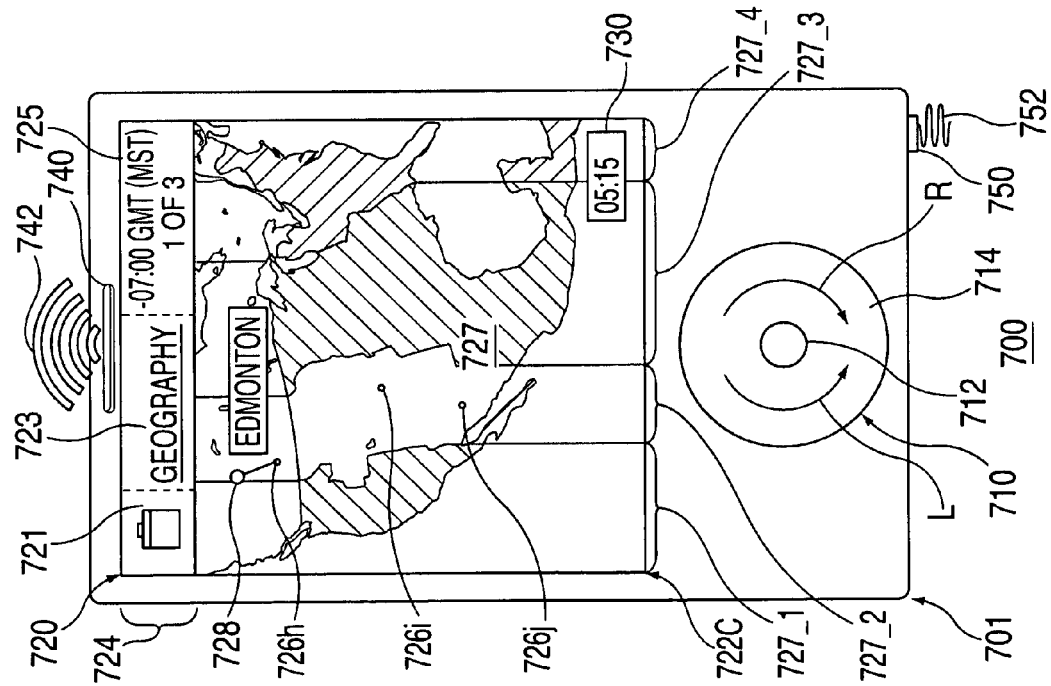
Figure 7F:
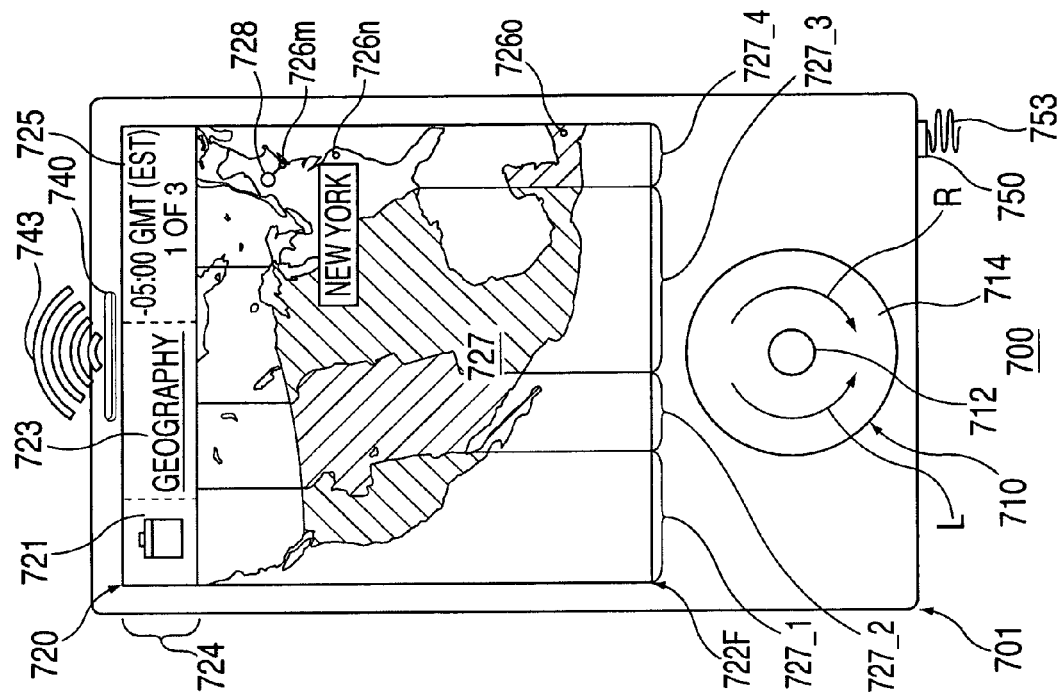

Listings 726 in each one of the plurality of sublists may be ordered within that sublist based on a first characteristic of a second piece of metadata. For example, each one of listings 726a-726g in the first sublist on user interface 722 may be ordered within that sublist based on a first characteristic of coordinates metadata 852. Coordinates metadata 852 may be a string of one or more alphanumeric characters. Therefore, each one of listings 726a-726g in the first sublist on user interface 722A may be ordered within that sublist based on a first characteristic of the alphanumeric string, such as the alphanumerical order of the string. For example, each one of listings 726a-726g in the first sublist on user interface 722A may therefore be ordered within that sublist as shown in FIG. 7A because the alphanumeric string of coordinates metadata 852 associated with listing 726a (i.e., "49°15'''N 123°6'''W") alphanumerically precedes the alphanumeric string of coordinates metadata 852 associated with listing 726b (i.e., "47°36'''N 122°19'''W"), and so on with respect to each of listings 726a-726g. Similarly, each one of listings 726h-726j in the second sublist on user interface 722 may therefore be ordered within that sublist as shown in FIG. 7C because the alphanumeric string of coordinates metadata 852 associated with listing 726h (i.e., "53°34'''N 113°32'''W") alphanumerically precedes the alphanumeric string of coordinates metadata 852 associated with listing 726i (i.e., "39°44'21''N 104°59'5''W"), which alphanumerically precedes the alphanumeric string of coordinates metadata 852 associated with listing 726j (i.e., "33°26'54''N 112°04'26''W").

Finally, the plurality of sublists of listings 726 may be ordered within the list of listings 726 provided by user interface 722 based on the first characteristic of the first piece of metadata. For example, the first sublist containing listings 726a-726g and the second sublist containing listings 726h-726j may be ordered within the location-based map of listings 726 provided by user interface 722 based on the first characteristic of the first piece of metadata (e.g., based on the alphanumerical order of the entire alphanumeric string of the time zone metadata 854). For example, the first sublist containing listings 726a-726g and the second sublist containing listings 726h-726j may be ordered within the location-based map of listings 726 provided by user interface 722 as shown in FIGS. 7A-7C because the entire alphanumeric string "−08:00 GMT (PST)" of the time zone metadata 854 associated with the first sublist alphanumerically precedes the entire alphanumeric string "−07:00 GMT (MST)" of the time zone title metadata 854 associated with the second sublist. Similarly, the second sublist containing listings 726h-726j and a third sublist containing listings 726k-726l may be ordered within the location-based map of listings 726 provided by user interface 722 as shown in FIGS. 7C-7D because the entire alphanumeric string "−07:00 GMT (MST)" of the time zone metadata 854 associated with the second sublist alphanumerically precedes the entire alphanumeric string "−06:00 GMT (CST)" of the time zone metadata 854 associated with the third sublist.

As shown, this location-based map of listings 726 provided by user interface 722 may display each sublist within a separate substantially vertical column on map 727 (e.g., one of columns 727_1, 727_2, 727_3, and 727_4 of FIGS. 7A-7F). These columns may be appropriately defined based on the location of time zone boundaries of the geographical area represented by the map. More generally, these distinct portions 727_ of background 727 of user interface 722 may be chosen based at least in part on information serving as the basis for distinguishing between sublists in a list of entries to be displayed. In one embodiment, the particular one of columns 727_1, 727_2, 727_3, and 727_4 containing the currently highlighted listing (e.g., the listing 726 highlighted by indicator 728) may be differentiated from the other columns. As shown in FIGS. 7A-7F, the columns 727_ not containing the highlighted listing are darker than the column 727_ containing the highlighted listing. This may allow the user to more quickly and more easily determine where on user interface 722 the currently highlighted listing 726 is located.

A list of listings that is broken down into several sublists of listings, such as listings 726 of FIGS. 7A-8, may be scrolled by a user interface in various ways, similarly to listings 526 of FIGS. 5A-6. In one embodiment, user interface 722 may simply scroll from an original listing to a new listing that is consecutive with the original listing in the gridded list, regardless of the original listing's sublist (i.e., "elementally-scroll"). For example, as described above, user interface 722 may simply scroll downwardly from an original listing 726a in user interface 722A of FIG. 7A to a new listing 726b that is downwardly consecutive with original listing 726a in the location-based map of listings, as shown in user interface 722B of FIG. 7B. User interface 722 may provide this downward "elemental-scrolling" from original listing 726a to downwardly consecutive new listing 726b by monitoring an attribute of a user movement in the direction of arrow R along track 714 that is below a certain threshold, for example. Likewise, as described above, user interface 722 may simply scroll upwardly from an original listing 726b in user interface 722B of FIG. 7B to a new listing 726a that is upwardly consecutive with original listing 726a in the location-based map of listings, as shown in user interface 722A of FIG. 7A. User interface 722 may provide this upward "elemental-scrolling" from original listing 726b to upwardly consecutive new listing 726a by monitoring an attribute of a user movement in the direction of arrow L along track 714 that is below a certain threshold, for example.

Alternatively, user interface 722 may scroll from an original listing in a first sublist of the list to a new listing that is either (1) the initial listing in a second sublist that is consecutive with the first sublist in the list or (2) the initial listing in the first sublist (i.e., "quickly-scroll"). For example, user interface 722 may scroll forwardly from an original listing 726b in a first sublist containing listings 726a-726g, as shown in user interface 722B of FIG. 7B, to a new listing 726h that is the initial listing in a second sublist (e.g., the initial listing in the sublist containing listings 726h-726j), which is forwardly consecutive with the first sublist in the list, as shown in user interface 722C of FIG. 7C. User interface 722 may provide this forward "quick-scrolling" from original listing 726b to new listing 726h by monitoring an attribute of a user movement in the direction of arrow R along track 714 that is above a certain threshold, for example.

Figure 7E:
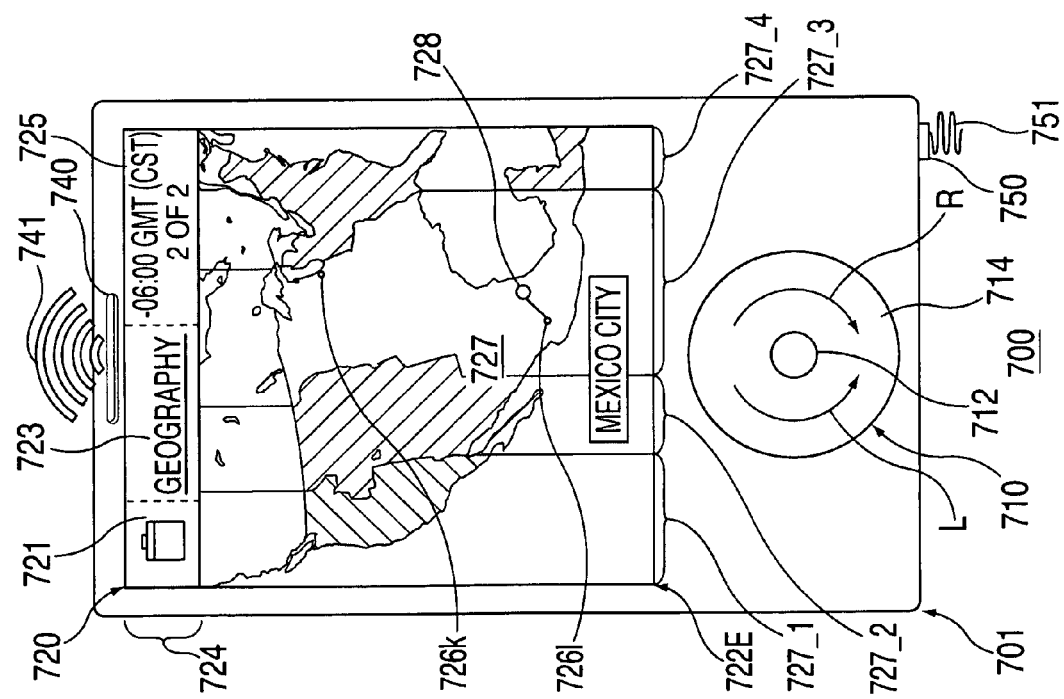

Somewhat likewise, user interface 722 may scroll backwardly from an original listing 726*l* in a first sublist containing listings 726*k* and 726*l*, as shown in user interface 722E of FIG. 7E, to a new listing 726*k* that is the initial listing in the first sublist, as shown in user interface 722D of FIG. 7D. User interface 722 may provide this backward "quick-scrolling" from original listing 726*l* to new listing 726*k* by monitoring an attribute of a user movement in the direction of arrow L along track 714 that is above a certain threshold, for example. Although it is to be noted that user interface 722 may also provide this backward scrolling from original listing 726*l* to new listing 726*k* through "elemental-scrolling," by monitoring an attribute of a user movement in the direction of arrow L along track 714 that is below a certain threshold, for example, because listings 726*k* and 726*l* are the only two listings in their sublist. A user interface of the invention may provide quick-scrolling or any other mode of scrolling independently of any sublists that may categorize certain listings of a list of listings being accessed by a user. For example, a first mode of scrolling may be "elemental" in that it scrolls from one listing to a new consecutive listing, while a second mode of scrolling may jump to a new listing that is ten (10) listings removed from the original listing.

These thresholds of various attributes of various user movements that may be monitored by user interface 722 to determine whether to "elementally-scroll" or "quickly-scroll" through the listings 726 provided on output component 720 may be determined by a user of device 700 or the manufacturer of device 700. For example, a user may select a threshold based on how many entries are in the library through which he or she wishes to scroll. Alternatively, a user may select a threshold based on his or her dexterity using the input component. These thresholds may be stored locally on the device (e.g., memory 104 of FIG. 1), for example.

Therefore, according to an embodiment of the invention, user interface 722 of device 700 may quickly and easily switch between a first "elemental-scrolling" mode and a second "quick-scrolling" mode for updating the displayed portion of a list of descriptive entry listings 726 on output component 720 in response to a particular type of user movement of input component 710. This can improve the speed and ease with which a user may search for a particular entry within an extensive library of entries.

In addition to changing the way in which descriptive entry listings 726 are scrolled on output component 720 in response to a particular type of user movement of input component 710, user interface 722 may also change the type of information transmitted to the user in response to a particular type of user movement of input component 710, similarly to user interface 222 of FIGS. 2A-2F. For example, when user interface 722 quick-scrolls forwardly from an original listing 726*b* in a first sublist to a new listing 726*h* that is the initial listing in a forwardly consecutive second sublist, user interface 722 may also enhance itself by providing a new or updated visual enhancer 730 along with the updated set of listings 726 (e.g., as shown in the update of a device clock 730 from "04:15" within user interface 722B of FIG. 7B to "05:15" within user interface 722C of FIG. 7C).

Visual enhancer 730 may be any additional or updated information, such as an icon or image or string of one or more alphanumerical characters, that is descriptive of or related to at least one characteristic of the new listing or the second sublist (i.e., the sublist that contains the new listing). For example, as shown in FIG. 7C, visual enhancer 730 may be a block of textual information superimposed over the rest of user interface 722C so that it may be easily seen by the user. Visual enhancer 730 may include a string of one or more alphanumerical characters representative of the characteristic of the piece of metadata that is the basis for the differentiation between sublists in the list of listings 726 (e.g., time zone metadata 854, which is "−07:00 GMT (MST)" for the sublist containing new listing 726*h*), as shown in FIG. 7C, for example. As shown in this embodiment, visual enhancer 730 may be representative of a clock of device 700 and may be updated to represent what the time would be if the user were to select one of the listings contained in the sublist of the newly highlighted listing (e.g., one of the listings in the second sublist that has an associated piece of time zone metadata 854 equal to "−07:00 GMT (MST)").

In one embodiment, user interface 722 may continuously show visual enhancer 730 as long as the user interface continues to quick-scroll through the listings. For example, if user interface 722 continues to quick-scroll forwardly from listing 726*h* in a first sublist to a new listing 726*k* that is the initial listing in a forwardly consecutive second sublist, as shown in the update from user interface 722C of FIG. 7C to user interface 722D of FIG. 7D, user interface 722 may continue to update visual enhancer 730 along with the updated set of listings 726 and indicator 728. However, the information within visual enhancer 730 may be changed to reflect the new sublist containing the new listing (e.g., device clock may be updated to read "06:15" to reflect "−06:00 GMT (CST)" for the sublist containing new listing 726*k*).

When user interface 722 terminates quick-scrolling and begins elemental-scrolling, for example, visual enhancer 730 may also be terminated. For example, if user interface 722 stops quick-scrolling but continues to update the listings 726 displayed on output component 720 by elementally-scrolling forwardly from listing 726*k* to downwardly consecutive listing 726*l*, as shown in the update from user interface 722D of FIG. 7D to user interface 722E of FIG. 7E, user interface 722 may stop providing visual enhancer 730. User interface 722 may continue to not provide visual enhancer 730 as the interface continues to elementally-scroll through the listings, as shown in the update from user interface 722E of FIG. 7E to user interface 722F of FIG. 7F.

It is to be noted, however, that in accordance with an embodiment of the invention, user interface 722 may provide visual enhancer 730 along with an updated set of listings 726 even when it is not quick-scrolling. For example, user interface 722 may once again provide visual enhancer 730 if the interface elementally-scrolls backwardly through the listings from listing 726*l* to listing 726*k*, as shown in the update from user interface 722E of FIG. 7E to user interface 722D of FIG. 7D.

The situations in which user interface 722 may provide a visual enhancer, such as visual enhancer 730 of FIGS. 7C and 7D, may be determined by a user of device 700 or the manufacturer of device 700. For example, a user may wish to be provided with a visual enhancer only when he or she is quick-scrolling. Alternatively, a user may wish to be provided with a visual enhancer whenever he or she scrolls to a listing that is an initial listing in a sublist of the list of listings. These preferences may be fully customizable and may be stored locally on the device (e.g., memory 104 of FIG. 1), for example.

As an alternative or in addition to visually enhancing an updated set of listings 726 with a visual enhancer 730, user interface 722 may enhance itself aurally. As shown in FIGS. 7A-7F, device 700 may also include an audio output component 740. Audio output component 740 may be any output component suitable for transmitting audible information to a user, such as a speaker, headphones, or the like. In addition to changing the way in which descriptive entry listings 726 are scrolled on output component 720 in response to a particular type of user movement of input component 710, user interface 722 may also change the type of audio information transmitted to the user via output component 740 in response to a particular type of user movement of input component 710 or to a particular change in a characteristic of the highlighted listing, as described above with respect to user interface 522 and audio output component 540 of FIGS. 5A-5F.

For example, when user interface 722 elementally-scrolls forwardly from an original listing 726*a* to forwardly consecutive listing 726*b*, user interface 722 may enhance itself aurally by transmitting a first sound 741 via output component 740 while also updating the set of listings 726 on output component 720 (e.g., as shown in the update from user interface 722A of FIG. 7A to user interface 722B of FIG. 7B). On the other hand, when user interface 722 quick-scrolls forwardly from an original listing 726*b* to a new listing 726*h* that is the initial listing in a forwardly consecutive sublist, user interface 722 may enhance itself aurally by transmitting a second sound 742 via output component 740 while also updating the set of listings 726 on output component 720 (e.g., as shown in the update from user interface 722B of FIG. 7B to user interface 722C of FIG. 7C), for example.

First sound 741 and second sound 742 may each be a single tone or a much more complex sound, such as a song. In one embodiment, first sound 741 may be a single short clicking sound indicative of the short scrolling between consecutive listings 726*a* and 726*b*, while second sound 742 may be a longer clunking sound indicative of the quick-scrolling between listings 726*b* and 726*h* of different sublists. The same first sound 741 may be transmitted by user interface 722 every time it elementally-scrolls between two listings and the same second sound 742 may be transmitted by user interface 722 every time it quickly-scrolls between two listings. This may help a user to more quickly and more easily realize how he or she is scrolling through the listings.

For example, when user interface 722 continues to quick-scroll downwardly from an original listing 726*h* to a new listing 726*k* that is the initial listing in a downwardly consecutive sublist, user interface 722 may enhance itself aurally by once again transmitting second sound 742 via output component 740 while also updating the set of listings 726 on output component 720 (e.g., as shown in the update from user interface 722C of FIG. 7C to user interface 722D of FIG. 7D). Then, when user interface 722 begins to once again elementally-scroll forwardly, such as from an original listing 726*k* to forwardly consecutive listing 726*l*, the user interface may enhance itself aurally by once again transmitting the first sound 741 via output component 740 while also updating the set of listings 726 on output component 720 (e.g., as shown in the update from user interface 722D of FIG. 7D to user interface 722E of FIG. 7E).

However, there are various other ways in which user interface 722 can transmit different sounds via output component 740 for increasing the ease and speed with which a user may scroll through a list of listings 726. For example, in another embodiment, the sound transmitted by user interface 722 via output component 740 may be specifically associated with the listing being highlighted by indicator 728. For example, when user interface 722 scrolls to a new listing 726*m* (e.g., by elementally scrolling forwardly from an original listing 726*l*), the user interface may enhance itself aurally by transmitting via output 740 a third sound 743 that is in some way related to new listing 726*m* (e.g., as shown in the update from user interface 722E of FIG. 7E to user interface 722F of FIG. 7F). Therefore, according to one embodiment, when interface 722 is updated to highlight listing 726*m*, third sound 743 may be audio clip <CLIP_m> (i.e., audio clip metadata 856 associated with library entry 826*m*).

The situations in which user interface 722 may provide an aural enhancement via output component 740, may be determined by a user of device 700 or the manufacturer of device 700. For example, a user may wish to be provided with aural enhancement only when he or she is quick-scrolling. Alternatively, a user may wish to be provided with aural enhancement whenever he or she scrolls to a listing that is an initial listing in a sublist of the list of listings. These preferences may be fully customizable and may be stored locally on the device (e.g., memory 104 of FIG. 1), for example.

As an alternative or in addition to visually enhancing an updated set of listings 726 with a visual enhancer 730 and/or aurally enhancing an updated set of listings 726 with sounds via an audio output component 740, user interface 722 may enhance itself haptically or tactilely. As shown in FIGS. 7A-7F, device 700 may also include a haptic output component 750. Haptic output component 750 may be any output component suitable for transmitting haptic or tactile information to a user, such as a rumble pack, vibration generator, or the like. In addition to changing the way in which descriptive entry listings 726 are scrolled on output component 720 in response to a particular type of user movement of input component 710, user interface 722 may also change the type of haptic information transmitted to the user via output component 750 in response to a particular type of user movement of input component 710.

For example, when user interface 722 elementally-scrolls downwardly from an original listing 726*a* to forwardly consecutive listing 726*b*, user interface 722 may enhance itself haptically by transmitting a first haptic signal 751 via output component 750 while also updating the set of listings 726 on output component 720 (e.g., as shown in the update from user interface 722A of FIG. 7A to user interface 722B of FIG. 7B). On the other hand, when user interface 722 quick-scrolls downwardly from an original listing 726*b* to a new listing 726*h* that is the initial listing in a downwardly consecutive sublist, user interface 722 may enhance itself haptically by transmitting a second haptic signal 752 via output component 750 while also updating the set of listings 726 on output component 720 (e.g., as shown in the update from user interface 722B of FIG. 7B to user interface 722C of FIG. 7C), for example.

First haptic signal 751 and second haptic signal 752 may each be a single force or a much more complex motion, such as a steady beat. In one embodiment, first haptic signal 751 may provide a single short vibrating sensation to the user that is indicative of the short scrolling between consecutive listings 726*a* and 726*b*, while second haptic signal 752 may provide a longer and more powerful vibrating sensation to the user that is indicative of the quick-scrolling between listings 726*b* and 726*h* of different sublists. The same first haptic signal 751 may be transmitted by user interface 722 every time it elementally-scrolls between two listings and the same second haptic signal 752 may be transmitted by user interface 722 every time it quickly-scrolls between two listings. This may help a user to more quickly and more easily realize how he or she is scrolling through the listings.

For example, when user interface 722 continues to quick-scroll downwardly from an original listing 726*h* to a new listing 726*k* that is the initial listing in a forwardly consecutive sublist, user interface 722 may enhance itself haptically by once again transmitting second haptic signal 752 via output component 750 while also updating the set of listings 726 on output component 720 (e.g., as shown in the update from user interface 722C of FIG. 7C to user interface 722D of FIG. 7D).

Then, when user interface 722 begins to once again elementally-scroll downwardly, such as from an original listing 726k to forwardly consecutive listing 726l, the user interface may enhance itself haptically by once again transmitting the first haptic signal 751 via output component 750 while also updating the set of listings 726 on output component 720 (e.g., as shown in the update from user interface 722D of FIG. 7D to user interface 722E of FIG. 7E).

However, there are various other ways in which user interface 722 can transmit different haptic signals via output component 750 for increasing the ease and speed with which a user may scroll through a list of listings 726. For example, in another embodiment, the haptic signal transmitted by user interface 722 via output component 750 may be specifically associated with the listing being highlighted by indicator 728. For example, when user interface 722 scrolls to a new listing 726m (e.g., by elementally scrolling forwardly from an original listing 726l), the user interface may enhance itself haptically by transmitting via output 750 a third haptic signal 753 that is in some way related to new listing 726m (e.g., as shown in the update from user interface 722E of FIG. 7E to user interface 722F of FIG. 7F). Therefore, according to one embodiment, when interface 722 is updated to highlight listing 726m, third haptic signal 753 may be miscellaneous signal <MISC_m> (i.e., miscellaneous metadata 857 associated with library entry 826m).

The situations in which user interface 722 may provide haptic or tactile enhancement via output component 750, may be determined by a user of device 700 or the manufacturer of device 700. For example, a user may wish to be provided with haptic enhancement only when he or she is quick-scrolling. Alternatively, a user may wish to be provided with haptic enhancement whenever he or she scrolls to a listing that is an initial listing in a sublist of the list of listings. These preferences may be fully customizable and may be stored locally on the device (e.g., memory 104 of FIG. 1), for example.

While there have been described systems and methods for improving the scrolling of user interfaces of electronic devices, it is to be understood that many changes may be made therein without departing from the spirit and scope of the present invention. For example, many other types of payload data may be scrolled according to the invention, such as video files, contact information, word processing documents, and the like. It will also be understood that various directional and orientational terms such as "up" and "down," "left" and "right," "top" and "bottom," "side" and "edge" and "corner," "height" and "width" and "depth," "horizontal" and "vertical," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Those skilled in the art will appreciate that the invention can be practiced by other than the described embodiments, which are presented for purposes of illustration rather than of limitation, and the invention is limited only by the claims which follow.

What is claimed is:

1. A system comprising:
    a processor;
    a display in communication with the processor; and
    memory coupled to the processor, the memory encoded with program instructions that, when executed, cause the processor to execute a method for navigating through a list, the method comprising:
        determining a list of descriptive entry listings;
        determining a plurality of sublists within the list, wherein a sublist includes a number of listings;
        receiving input for navigating through the list, the input being associated with an attribute, wherein the attribute has a corresponding threshold value;
        setting a scrolling mode to be an elemental scrolling mode when the attribute associated with the input is below the corresponding threshold value,
        wherein the elemental scrolling mode includes:
            causing a graphical interface displayed on the display to consecutively scroll between subsequent listings in a current sublist of the list; and
            causing the graphical interface to consecutively scroll between a last listing in the current sublist of the list to an initial listing in a next sublist of the list when the current sublist of the list ends; and
        setting the scrolling mode to be a quick scrolling mode when the attribute associated with the input is above the corresponding threshold value,
        wherein the quick scrolling mode includes:
            causing the graphical interface displayed on the display to scroll between an original listing in a current sublist of the list to an initial listing in a subsequent sublist of the list that is consecutive with the current sublist of the list, wherein a plurality of listings in the subsequent sublist of the list is simultaneously displayed with the initial listing in the subsequent sublist of the list.

2. The system of claim 1, wherein the attribute includes at least one of:
    an acceleration of the user input;
    a duration of the user input; or
    a frequency of the user input within a period of time.

3. The system of claim 1, wherein the system further comprises an input component configured to receive the user input, wherein the input component is one of a group consisting of:
    a rotational input device;
    a push button;
    a track pad; and
    a touch screen.

4. The system of claim 1, wherein the system further comprises an output component in communication with the processor, wherein the method further comprises:
    generating a first sound via the output component when the attribute is below the threshold value; and
    generating a second sound via the output component when the attribute is above the threshold value.

5. The system of claim 1, wherein the method further comprises:
    causing the user interface to display a visual enhancer related to each one of the sublists when the attribute is above the threshold value.

6. The system of claim 1, wherein each listing is associated with an item of metadata, and wherein the plurality of sublists is ordered based on a first characteristic of the item of metadata and wherein the number plurality of listings in each sublist is ordered based on a second characteristic of the item of metadata.

7. A computer-implemented method, comprising:
    determining, by a processor, a list of descriptive entry listings;
    determining a plurality of sublists within the list, wherein a sublist includes a number of listings;

receiving input for navigating through the list, the input being associated with an attribute, wherein the attribute has a corresponding threshold value;

setting a scrolling mode to be an elemental scrolling mode when the attribute associated with the input is below the corresponding threshold value, wherein the elemental scrolling mode includes:
causing a graphical interface displayed on the display to consecutively scroll between subsequent listings in a current sublist of the list; and
causing the graphical interface to consecutively scroll between a last listing in the current sublist of the list to an initial listing in a next sublist of the list when the current sublist of the list ends; and
setting the scrolling mode to be a quick scrolling mode when the attribute associated with the input is above the corresponding threshold value, wherein the quick scrolling mode includes:
causing the graphical interface displayed on the display to scroll between an original listing in a current sublist of the list to an initial listing in a subsequent sublist of the list that is consecutive with the current sublist of the list, wherein a plurality of listings in the subsequent sublist of the list is simultaneously displayed with the initial listing in the subsequent sublist of the list.

8. The method of claim 7, wherein each listing is associated with an item of metadata, the method further comprising:
causing the user interface to display information descriptive of a characteristic of the item of metadata associated with the third listing when the scrolling mode is identified as the quick scrolling mode and the first user interface scrolls from the first listing to the third listing.

9. The method of claim 8 further comprising:
receiving another user input for navigating through the list;
identifying the scrolling mode based on the attribute associated with the other user input; and
causing the user interface to stop the display of the information descriptive of the characteristic of the item of metadata associated with the third listing when the scrolling mode is identified as the elemental scrolling mode.

10. The method of claim 7, wherein each listing is associated with a payload file including at least one of an audio file, an image file, and a video file.

11. The method of claim 10, wherein each listing is associated with an item of metadata, wherein the sublists are ordered based on a first characteristic of the item of metadata and wherein the listings in each sublist are ordered based on a second characteristic of the item of metadata.

12. The method of claim 11, wherein the item of metadata is a string of one or more alphanumeric characters descriptive of a title of the payload file, wherein the first characteristic is a first alphanumeric character of the string and the second characteristic is the alphanumerical order of the one or more alphanumeric characters in the string.

13. The method of claim 7, wherein when the graphical interface displayed on the display scrolls between the original listing in the current sublist of the list to the initial listing in the subsequent sublist of the list, at least one or more listings subsequent to the original listing in the current sublist is displayed along with the original listing in the current sublist before the graphical interface scrolls to the initial listing in the subsequent sublist of the list.

14. The method of claim 7, wherein when the graphical interface displayed on the display scrolls between the original listing in the current sublist of the list to the initial listing in the subsequent sublist of the list, the original listing is displayed at a particular portion of the graphical interface along with one or more subsequent listings in the same sublist and then the initial listing is displayed at the particular portion of the graphical interface along with one or more subsequent listings in the same sublist.

15. A system comprising:
a processor;
a display in communication with the processor; and
memory coupled to the processor, the memory encoded with program instructions that, when executed, cause the processor to execute a method for navigating through a list, the method comprising:
determining a list of descriptive entry listings;
determining a plurality of sublists within the list, wherein a sublist includes a number of listings;
receiving input for navigating through the list, the input being associated with an attribute, the attribute being associated with a corresponding threshold value;
activating a quick scrolling mode when the attribute associated with the input exceeds the corresponding threshold value,
wherein the quick scrolling mode includes causing a graphical interface displayed on the display to scroll between an original listing in a current sublist of the list to an initial listing in a subsequent sublist of the list that is consecutive with the current sublist of the list, and wherein a plurality of listings in the subsequent sublist of the list is simultaneously displayed with the initial listing in the subsequent sublist of the list; and
outputting an audio signal when a particular listing in each sublist in the sublists is reached.

16. The system of claim 15, wherein each listing is related to one of an audio file, a video file, a geographical location file, and an image file.

17. The system of claim 15, wherein the listings within each sublist are ordered from first to last and the particular listing is the first one in that order.

18. The system of claim 15, wherein the list includes a first sublist and a second sublist that are differentiated based on metadata associated with one or more listings in each of the first sublist and the second sublist.

19. The system of claim 18, wherein the asset list identifier indicates which one of the first sublist and the second sublist that the user is currently navigating.

20. A computer-implemented method, comprising:
determining, by a processor, a list of descriptive entry listings;
determining a plurality of sublists within the list, wherein a sublist includes a number of listings;
receiving input for navigating through a list, the input being associated with an attribute, the attribute being associated with a corresponding threshold value;
activating a quick scrolling mode when the attribute associated with the input exceeds the corresponding threshold value,
wherein the quick scrolling mode includes causing a graphical interface displayed on the display to scroll between an original listing in a current sublist of the list to an initial listing in a subsequent sublist of the list that is consecutive with the current sublist of the list, and wherein a plurality of listings in the subsequent sublist of the list is simultaneously displayed with the initial listing in the subsequent sublist of the list; and
outputting an audio signal when a particular listing in each sublist in the sublists is reached.

21. The method of claim 20 further comprising:
in response to determining that the attribute exceeds the threshold value, displaying a visual indicator adjacent to another particular listing in each sublist.

22. The method of claim 20, wherein the visual indicator is displayed to indicate to the user where within the list the user is currently navigating.

23. The method of claim 20 further comprising:
in response to determining that the attribute exceeds the threshold value, superimposing a visual indicator over at least a portion of the number of listings in each sublist.

24. A computer-implemented method, comprising:
determining, by a processor, a list of descriptive entry listings;
determining a plurality of sublists within the list, wherein a sublist includes a set of listings;
receiving input for navigating through a list, the input being associated with an attribute, the attribute being associated with a corresponding threshold value;
activating a quick scrolling mode when the attribute associated with the input exceeds the corresponding threshold value,
wherein the quick scrolling mode includes causing a graphical interface displayed on the display to scroll between an original listing in a current sublist of the list to an initial listing in a subsequent sublist of the list that is consecutive with the current sublist of the list, and wherein a plurality of listings in the subsequent sublist of the list is simultaneously displayed with the initial listing in the subsequent sublist of the list; and
providing an asset sublist identifier along with a particular listing in each sublist.

25. The method of claim 24, wherein each listing in the set of listings is related to one of an audio file, an image file, and a geographical location file.

26. The method of claim 24, wherein providing the asset sublist identifier includes generating an audible signal associated with the quick scroll mode.

27. The method of claim 24, wherein each one of at least two sublists is differentiated from the other based on a time zone associated with listings in the sublist.

28. The method of claim 24 further comprising:
in response to determining that the attribute drops below the threshold value, ceasing to provide the asset list identifier along with the listing in each sublist.

* * * * *

UNITED STATES PATENT AND TRADEMARK OFFICE
CERTIFICATE OF CORRECTION

| | | Page 1 of 1 |
|---|---|---|
| PATENT NO. | : 8,683,378 B2 | |
| APPLICATION NO. | : 12/008322 | |
| DATED | : March 25, 2014 | |
| INVENTOR(S) | : William Bull et al. | |

It is certified that error appears in the above-identified patent and that said Letters Patent is hereby corrected as shown below:

In the claims please make the correction as shown below:

Column 42, Line 58, Claim 6: please delete "plurality".

Signed and Sealed this
Twenty-seventh Day of May, 2014

Michelle K. Lee
*Deputy Director of the United States Patent and Trademark Office*